United States Patent [19]

Gulick

[11] Patent Number: 4,809,269
[45] Date of Patent: Feb. 28, 1989

[54] DUAL-PORT TIMING CONTROLLER

[75] Inventor: Dale E. Gulick, Austin, Tex.

[73] Assignee: Advanced Micro Devices, Inc., Sunnyvale, Calif.

[21] Appl. No.: 35,687

[22] Filed: Apr. 2, 1987

[51] Int. Cl.$^4$ .............................................. H04J 3/24
[52] U.S. Cl. ................................................ 370/94
[58] Field of Search ...................... 370/94, 85, 95, 100; 340/825.5, 825.51

[56] References Cited

U.S. PATENT DOCUMENTS

| | | | |
|---|---|---|---|
| 4,290,133 | 9/1981 | Stewart et al. | 370/95 |
| 4,530,093 | 7/1985 | Akram et al. | 370/85 |
| 4,637,015 | 1/1987 | Bobey | 370/85 |
| 4,692,918 | 9/1987 | Elliot et al. | 370/85 |

Primary Examiner—Robert L. Griffin
Assistant Examiner—Wellington Chin
Attorney, Agent, or Firm—Kenneth B. Salomon

[57] ABSTRACT

A dual port timing controller (DPTC) (56) in conjunction with an interprocessor communication register (596) provides a shared random access memory (S-RAM)(22a). The S-RAM can be accessed either by a local processor (18) or a host processor (595) which, in a preferred configuration, controls an integrated circuit integrated services data protocol controller. The DPTC provides control signals allowing an ordinary RAM to be operated as an S-RAM. The DPTC includes a semaphore register (596) that stores bidirectional interprocessor interrupts, enabling passing of high level messages between the local and host processors.

2 Claims, 21 Drawing Sheets

FLAG/ABORT INSERTION UNIT

SBP BLOCK DIAGRAM (TRANSMIT)

SBP TIMING (TRANSMIT)

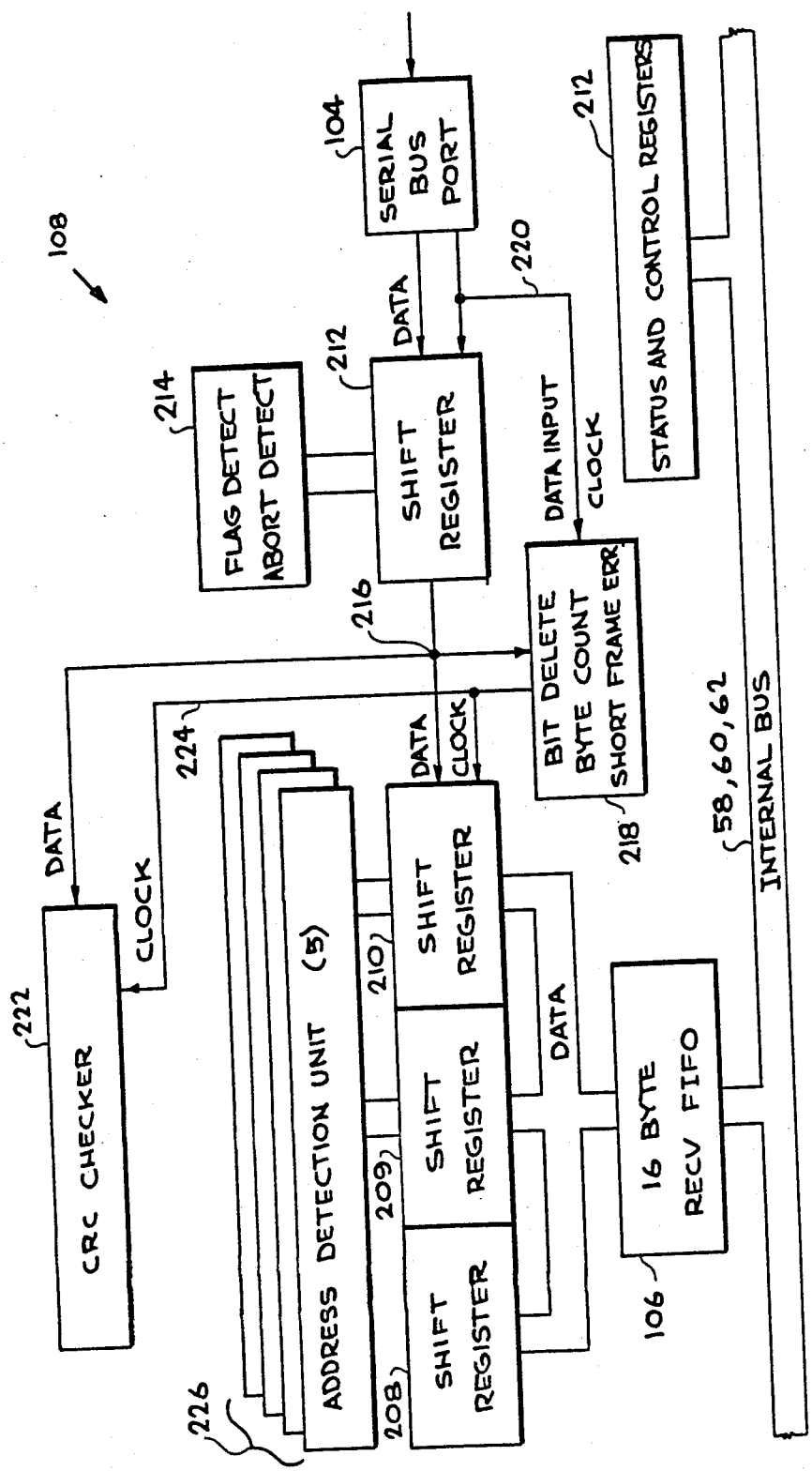

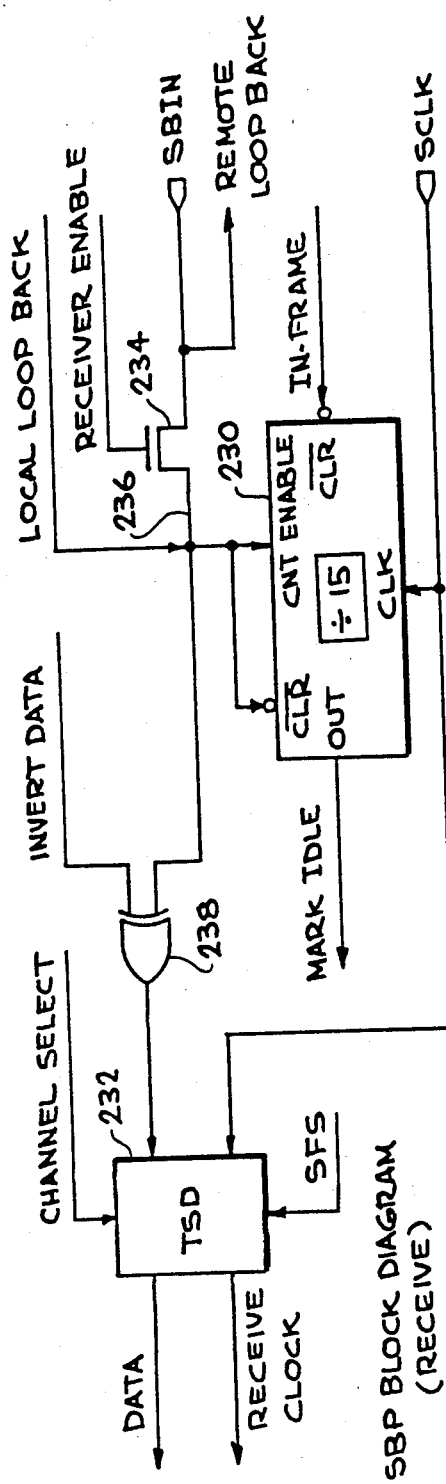
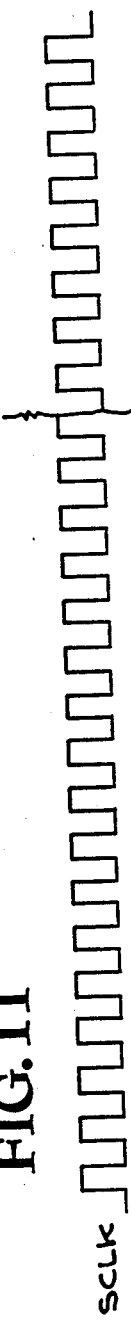
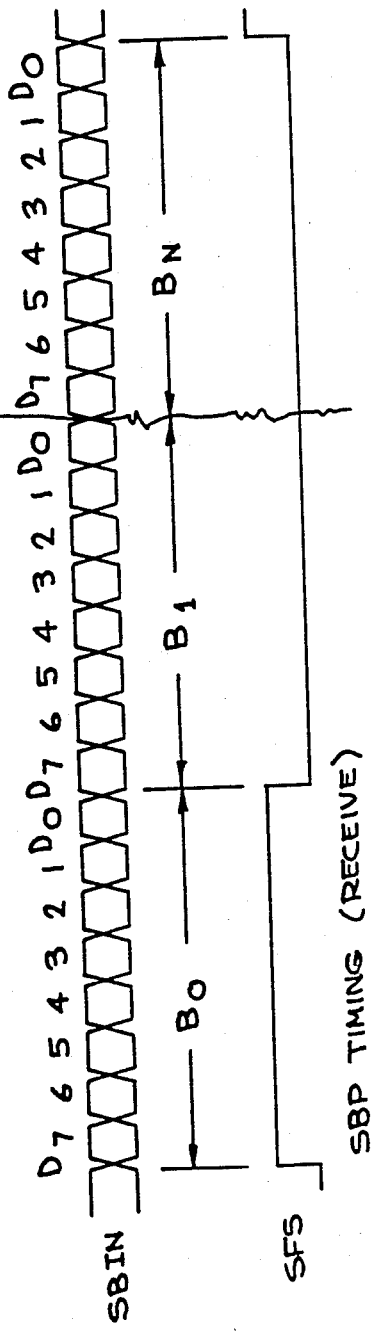
FIG. 11 SBP BLOCK DIAGRAM (RECEIVE)
FIG. 12 SBP TIMING (RECEIVE)

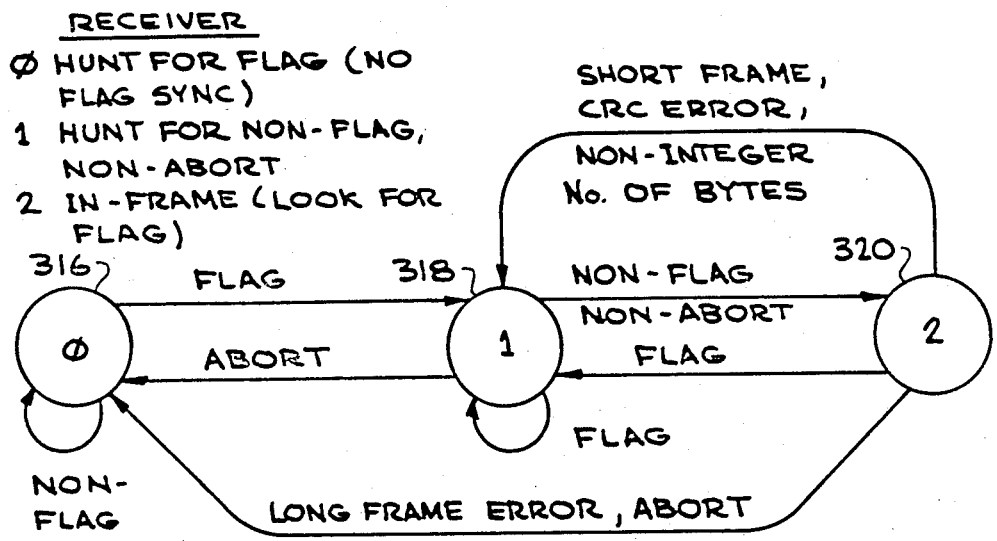
DLC RECEIVER STATE DIAGRAM  FIG. 20
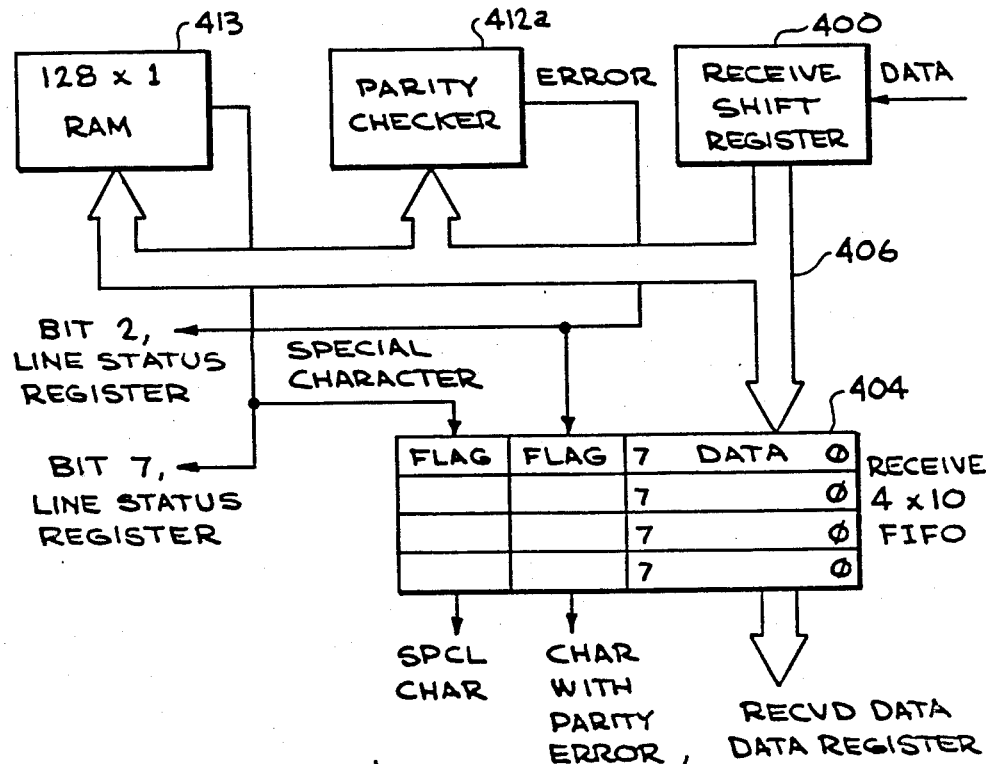
FIG. 22
UART PARITY/SPECIAL CHARACTER UNIT

UART BLOCK DIAGRAM

DUAL-PORT TIMING CONTROLLER

CROSS-REFERENCE TO RELATED, CO-PENDING APPLICATIIONS

Co-pending applications of particular interest to the instant application is U.S. Ser. No. 759,622 filed July 26, 1985, on behalf of Alan T. Clark, Hadi Ibrahim and Arthur F. Lange, and entitled "Digital Subscriber Controller" now U.S. Pat. No. 4,635,255, issued Jan. 6, 1987; U.S. Ser. No. 034,822, filed Apr. 3, 1987, on behalf of D. Gulick, T. Lawell and C. Crowe, entitled "Data Protocol Controller"; U.S. Ser. No. 035,817, filed Apr. 3, 1987, on behalf of D. Gulick, T. Lawell and C. Crowe, entitled "Packet-At-A-Time Reporting in a Data Link Controller"; U.S. Ser. No. 035,683, filed Apr. 3, 1987, on behalf of D. Gulick and T. Lawell, entitled "Data Link Controller with Flexible Multiplexer"; and U.S. Ser. No. 035,684, filed Apr. 2, 1987, on behalf of D. Gulick, T. Lawell and C. Crowe, entitled "Enhanced Universal Asynchronous Receiver-Transmitter", all assigned to the assignee of the instant application.

FIELD OF THE INVENTION

This invention relates to control of elements on an integrated circuit and, more particularly, to access of a memory shared by a local processor and a host processor.

BACKGROUND OF THE INVENTION

An integrated circuit (IC) may employ an external "local" processor for control of various elements on the IC. The IC may also employ an external memory element for storage of data received from, or transmitted to, the IC.

In conjunction with such a local system, a "host" processor may be used and it is therefor desirable to share the external memory between the local and host processors.

It is desirable to employ an ordinary random access memory (RAM) as the external memory element for cost reasons and to maintain compatibility with the purely local system.

Furthermore, it is desirable to be able to provide inter-processor communication using the shared RAM.

SUMMARY OF THE INVENTION

A dual port timing controller (DPTC) which can be used with an interprocessor communication register, provides a shared RAM (S-RAM) used in conjunction with an integrated circuit integrated services data protocol controller. The S-RAM can be accessed either by the local processor or the host processor. The DPTC provides control signals allowing an ordinary RAM to be operated as an S-RAM. These signals include: memory cycle timing signals, control signals for buffers and latches required to isolate the host's system bus from the local processor's system bus and generation of interrupt signals permitting interprocessor communication via the semaphore register.

In another aspect of the invention arbitrating access to the S-RAM, the DPTC includes the semaphore register, storing bidirectional interprocessor interrupts, that provides coordination for the passing of high level messages between the local and host processors.

BRIEF DESCRIPTION OF THE DRAWINGS

FIG. 10 is a block diagram of the receiver portion of the DLC 52 of the IDPC 10.

FIG. 11 is a block diagram of the receiver portion of the Serial Bus Port 104 of DLC 52.

FIG. 12 shows the timing of the receiver portion of SBP 104.

FIG. 20 is a state diagram of the operation of the DLC 52 receiver 108 portion.

FIG. 22 is a block diagram of the parity checker and special/character recognizer 412 of the UART 54 employed in the IDPC 10.

DETAILED DESCRIPTION OF A PREFERRED EMBODIMENT

Figure 1:
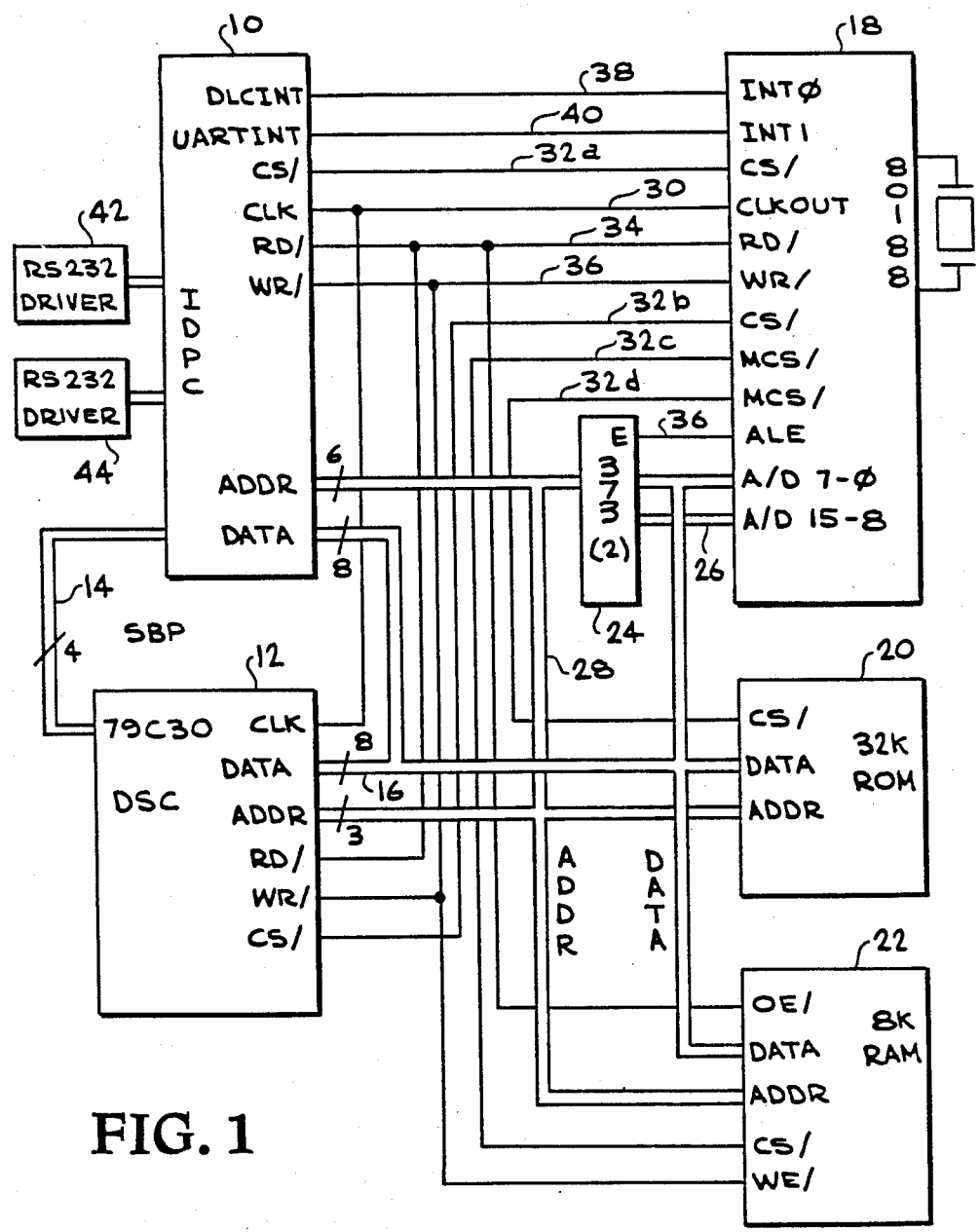
FIG. 1 shows an illustrative case of an ISDN Protocol Controller (IDPC) of the instant invention in a terminal adapter (TA).

With reference to FIG. 1, an illustrative use of an integrated Data Protocol Controller (IDPC) 10 in a terminal adapter (TA). A Digital Subscriber Controller (DSC) 12 such as that described in the related, cross-referenced, co-pending patent application U.S. Ser. No. 034,822, filed Apr. 3, 1987 and entitled "Digital Subscriber Controller" assigned to the assignee of the instant application, which application is incorporated herein by reference, is shown in FIG. 1 connected by a bidirectional bus 14 to the IDPC 10: the serial port of DSC 12 to a serial bus port of the IDPC 10. (The numeral "4" appears adjacent to bus 14 indicating that four signals are conducted in parallel on bus 14; this notational practice is used henceforth in the various drawings employed in describing the invention.) As described in the related, co-pending application, the DSC 12 interconnects the TA at an "S" interface to network terminating (NT) equipment. As such, the various D- and B-channels are demultiplexed off the telecommunications network and passed to the TA, and conversely, the separate B- and D-channels are multiplexed for transmission over the network. A bidirectional data bus 16 interconnects the DSC 12 and the IDPC 10; the data bus 16 carries B- and D-channel information between these elements as well as between a microprocessor 18, a read-only memory (ROM) 20 and random access memory (RAM) 22.

The microprocessor 18 generates lower-byte address signals conducted also on bus 16 (time-division multiplexed with the data signals) to an address latch 24 and generates upper-byte address signals conducted on a bus 26 to the latch 24. The latch then conveys this address signal via a bus 28 to the IDPC 10, the DSC 12, the ROM 20 and the RAM 22. Clock (CLK), chip select (CS), read (RD) write (WR) signals generated by the microprocessor 18 are conducted to the IDPC, the DSC, the ROM and RAM via signal lines 30, 32a-d, 34 and 36, respectively. An address latch enable (ALE) signal generated by microprocessor 18 is conducted to an enable (E) terminal of the address latch 24 via a signal line 36. The meaning and operation of these signals is well known to those skilled in the art and will not be described herein.

Finally, a data link controller interrupt (DLCINT) signal and a Universal asynchronous receiver transmitter (UART) interrupt (UARTINT) signal are conducted via signal lines 38 and 40, respectively, from IDPC 10 to INT0 and INT1 terminals of microprocessor 18. Their meaning and operation will be described hereinafter.

Two line drivers 42 and 44 are shown connected to the IDPC 10 providing full duplex serial data transmit and receive functions, respectively, coupled to a UART section of IDPC 10. Various control signals are required to be conducted between the elements illustrated in FIG. 1, as will be understood by those skilled in the art, but are not shown in the interests of clarity.

The IDPC 10 is controlled by internal status and control registers which are read and written by software running on the microprocessor 18 ("local processor") connected to the IDPC 10. While the IDPC registers can be mapped into either memory 20 or 22 or to input/output devices. The IDPC registers occupy a 64 byte block located in the microprocessor 18 address space. The starting address of this block is determined by address decode logic external to the IDPC 10 which is used to generate the IDPC chip select signal.

In systems containing more than one microprocessor (e.g., Personal Computer with a FPU ("host processor") and a local processor), only the local processor can access the IDPC registers. Although the IDPC contains bus arbitration hardware to allow two processors to share RAM 22 on the IDPC external bus 16, there is no corresponding built-in arbitration to allow a processor other than the local processor to access the IDPC registers. Similarly, the IDPC does not provide a mechanism for the local processor to access devices (including host RAM) not connected to the IDPC external bus 16.

A "host" processor can control IDPC operation indirectly, however, by issuing requests to the local processor 18. This is accomplished via Bus Arbitration (memory sharing) and Interprocessor Interrupt facilities supplied by the IDPC 10. A description of this arrangement is given below in connection with FIG. 23.

Briefly, the host processor writes a command (e.g., "Send Data on the B-Channel" and associated parameters to a set of contiguous locations of RAM 22 on the IDPC external bus 16. This portion of RAM 22 (referred to as a "mailbox") is no different from the rest of the RAM on the IDPC external bus 16 except that the local processor 18 software "knows" that commands from the host processor will be placed at that particular address. The operation of the IDPC Bus Arbitration that allows either processor to access the mailbox is totally transparent to software. The host processor uses the IDPC Interprocessor Interrupt facility to notify the local processor that there is a command present in the mailbox. The local processor notifies the host processor of command results and status in a similar fashion, writing to pre-arranged locations in RAM on the IDPC external bus and interrupting the host processor using the IDPC Interprocessor Interrupt facility.

Figure 2:
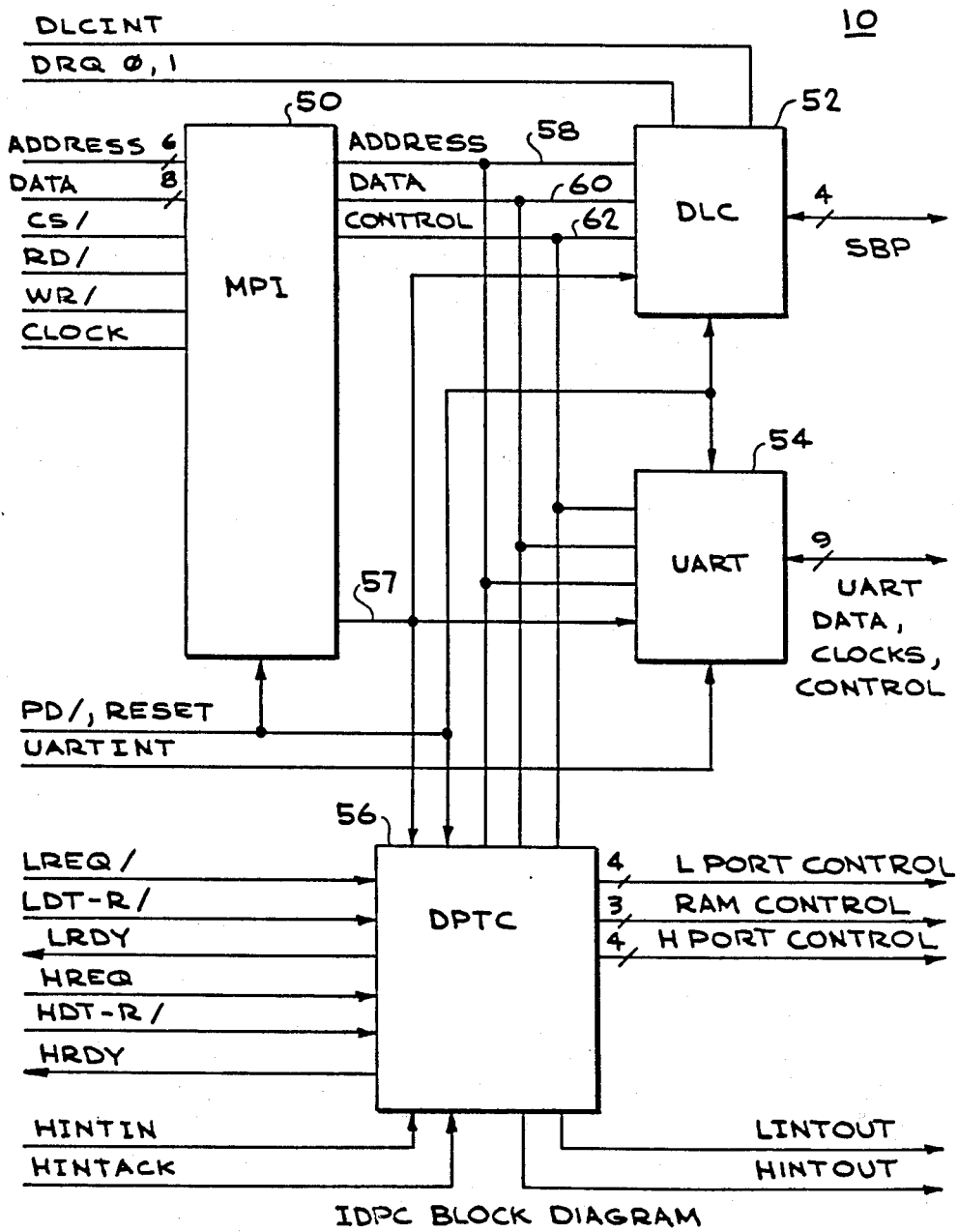
FIG. 2 is a block diagram of the IDPC 10 of the instant invention.

The four major elements internal to the IDPC 10 are shown in FIG. 2 comprising microprocessor interface (MPI) 50, a data link controller (DLC) 52, a universal asynchronous receiver-transmitter (UART) 54 and a dual-port timing controller (DPTC) 56. A signal line 57 conducts the clock signal generated by MPI 50 to the DLC 52, the UART 54 and the DPTC 56. Bidirectional Busses 58, 60 and 62 interconnect all major blocks of the IDPC 10; the DLC 52, the UART 54 and the DPTC 56. Bus 58 conducts address signals received on a 6-conductor address signal line by MPI 50. Bus 60 conducts data signals received at an 8-conductor data signal line by MPI 50. Bus 62 conducts control signals generated by MPI 50 upon reception thereby of chip select (CS), write (WR), read (RD) signals and power down/reset (PD, RESET) signals. A more complete description of the UART 54 and the DPTC 56, including the various signal lines shown in FIG. 2 will be given in connection with FIGS. 21-25.

The MPI 50 connects the DLC 52 and UART 54 to the external microprocessor 18. The design and construction of the MPI 50 is conventional and understood by those skilled in the art. Accordingly, it will not be elaborated on herein. As will be explained hereinbelow, the DLC, UART, and DPTC have user accessible registers. A 64 byte address space is subdivided by the MPI 50 into a 31 byte UART space, a 32 byte DLC space, and a 1 byte DPTC space. The address decoding of the individual spaces is performed internal to the UART, DLC, and DPTC. The 64 byte space is allocated as follows:

| ADDRESS | USE |
| --- | --- |
| 00-31 | DLC 52 |
| 32-62 | UART 54 |
| 63 | DPTC 56 |

The DLC portion 52 of the IDPC 10 has the task of providing a full duplex interface (simultaneous transmit and receive) between the Serial Bus Port (SBP) and three internal parallel busses 58, 60 and 62 of the IDPC. Through the use of separate 16-byte receive and transmit first-in first-out FIFOs buffers and two external direct memory access (DMA) channels, the DLC 52 provides movement of data to and from external memory 20 and 22 and the SBP. The DLC performs low level (ISO layer 2-) bit oriented protocol processing on this data. The major protocols supported are SDLC, HDLC, LAPB (X.25), and LAPD.

Figure 3:
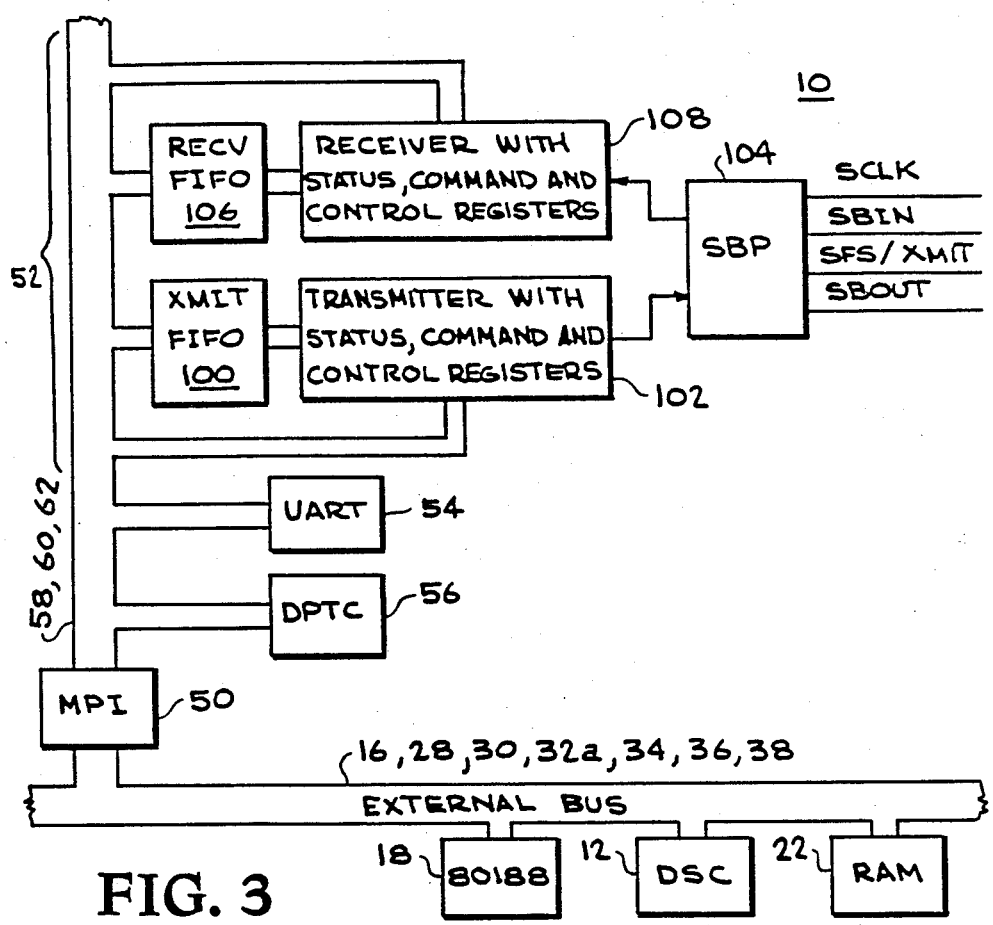
FIG. 3 is a functional block diagram of the IDPC 10 focusing on the interrelationship between the DLC 52 and the remaining portions of the IDPC.

FIG. 3 represents a functional block diagram of the IDPC 10 highlighting the major functional blocks of the DLC 52. The MPI 50 is shown interconnecting the external data and address busses 16 and 28 (FIG. 1) as well as the control lines 30, 32a, 34, 36 and 38 with the internal busses 58, 60 and 62 (FIG. 2). The DPTC 56, UART 54 sections of the IDPC 10 are connected to busses 58, 60 and 62. The DLC 52 portion of the IDPC 10 is shown in FIG. 3 as comprising five major functional blocks. A transmit first-in, first-out (XMIT FIFO) register 100 connected to the internal busses 58, 60 and 62. A transmitter 102 is connected to XMIT FIFO 100 and to the internal busses 58, 60 and 62 and to the Serial Bus Port (SBP) 104. A receive first-in, first-out (RECV FIFO) register 106 is connected to the internal busses 58, 60 and 62. A receiver 108 is connected to RECV FIFO 106 and to the internal busses 58, 60 and 62 and to the SBP 104. The transmitter 102 and receiver 108 each include status, command and control registers. All programmable registers and a portion of the FIFOs called data registers can be accessed via the busses 58, 60 and 62. These registers are mapped directly into microprocessor 18 memory space, and are described in detail hereinafter.

The Serial Bus Port (SBP) 104 receives a serial clock (SCLK) signal, a serial frame synchronization (SFS) time-multiplexed with a transmit clock (XMITCLK) and generates a serial bus output (SBOUT) signal. The description of operation of DLC 52 transmitter and receiver portions requires an understanding of bit-oriented protocols (BOPs) such as SDLC, HDLC, LAPB (X.25) and LAPD.

Bit oriented protocols provide a set of rules and techniques that facilitate the transfer of data over a communications network. This discussion will not concern the workings of the upper level of the protocols—sequence numbers, acknowledges, and the like—since these are the responsibility of the software that runs on the local processor 18. The present description concentrates on the aspects of the protocols that affect the hardware of the DLC 52.

The BOPs call for transmission of data in packets. Packets are delimited by unique Flag characters and contain an address, some control information, the data itself, and an error detection code. The address identifies the sender or the receiver of the data. The control information is used by higher levels of the protocol to manage the flow of data. The data, which is contained in the information field, is user information. Packets that are used for protocol control often omit the information field (this is the only optional field). The error detection code is a Cyclical Redundancy Check (CRC) and DLC 52 uses the CCITT-CRC code. In addition to addresses, control, data, and error checking, the BOPs employ such mechanisms as Flags, Bit Stuffing, and Abort characters. The following section is a glossary of BOP terms and functions. These items will be used throughout the description of the DLC 52.

In the bit oriented protocol environment data is transmitted in frames. Protocols such as SDLC, HDLC, LAPB (X.25), and LAPD shre the same basic frame format:

| FLAG | ADDRESS | CONTROL | INFO | FRAME CHECK SEQUENCE | FLAG |
| --- | --- | --- | --- | --- | --- |
| 01111110 | (1 or 2 bytes) | (1 or 2 bytes) | (OPTIONAL) | (16 bits) | 01111110 |

The eight bit Flag character is identical for all of the above mentioned protocols. It is exactly 01111110. Its bit pattern is unique within a packet because the "bit stuffing" technique (described later) used does not allow six contiguous ONEs to be present in the packet portion of a Frame. The Flag character can perform three functions: as an Opening Flag, as a Closing Flag, and as an inter-packet fill character.

The Opening Flag is defined as the last (perhaps only) Flag prior to a non-Flag, non-Abort character. (The Abort character is defined below.) All valid packets must begin with a Flag. The Opening Flag indicates the beginning of a packet. When Flags are being used as interframe fill characters, a non-Flag, non-Abort character must be received before the preceding Flag can be identified as an Opening Flag.

The principal difference between the lower levels of the various BOPs is the address field. All addresses are of an integer number of bytes in length. In general an address can be one, two, or N bytes long.

The length of an N byte long address is determined by the value of the least significant bit in each byte of the address. This bit, called the Extended Address bit (EA), identifies the last byte of the address. All of the bytes of an N byte long address will have the EA bit cleared to a ZERO except the last byte of the address. The presence of an EA bit set to a ONE indicates that the byte is the last byte of the address. The length of the address field affects the detection of a Short Frame.

In some protocols the second bit (bit 1) of the first byte of the address is used to indicate whether the frame is a command or a response. This bit, called the command/response bit (C/R), can be either a one or a ZERO without invalidating the address.

The control field immediately follows the address field. The DLC 52 treats the control field as packet data. That is, the DLC does not take any action in response to the contents of the control field. The control field can be either one or two bytes long. The length of the control field has an impact on the detection of a Short Frame.

The information field, when present, follows the control field and precedes the Frame Check Sequence. The information field contains the data that is being transmitted between users. The information field contains an integer number of bytes, and can be up to 64K bytes long (minus address and control lengths) for the IDPC 10.

The Frame Check Sequence (FCS) is a 16 bit word that is produced by a CRC generator and checked by a CRC checker. Mathematically it is the ONEs complement of the sum [modulo 2] of the following: The remainder of $X^K$ $[X^{15}+X^{14}+X^{13}+ \ldots +X^2+X+1]$ divided [modulo 2] by the generator polynominal $X^{16}+X^{12}+X^5+1$, where K is the number of bits in the frame existing between, but not including, the final bit of the Opening Flag and the first bit of the FCS, excluding bits inserted for transparency.

-AND-

The remainder after multiplication by $X^{16}$ and then division [modulo 2] by the generator polynominal $X^{16}+X^{12}+X^5+1$, of the content of the frame, between but not including the last bit of the Opening Flag and the first bit of the FCS, excluding bits inserted for transparency.

The Closing Flag is the last field in the frame. It indicates the end of the frame and signals that the FCS should be checked.

A packet is a frame minus the Opening and Closing Flags.

When frames are not being transmitted over the link provided by DLC 52, the link is said to be Idle. When the link is Idle the DLC transmitter 102 can be programmed by microprocessor 18 to send an all ONEs pattern. This is referred to as a Mark Idle (MI) condition. Specifically, an MI is defined as at least 15 contiguous ONEs.

Prior to and between frames, back to back Flags can be transmitted over the link. This is referred to as a Flag Idle (FI) condition and is selected by microprocessor 18 program control.

The DLC receiver 108 is said to be In-frame when it is enabled and the first non-Flag, non-Abort character is received after the receipt of at least one flag. In-frame is valid until the Closing Flag is detected, an Abort character is received or an error is detected. The DLC transmitter 102 is said to be In-frame from the time that it starts to send an Opening Flag until the last bit of the Closing Flag has been transmitted, assuming that the transmitter is not commanded to send an Abort sequence.

The DLC receiver 108 or transmitter 102 is said to be Out of Frame any time it is enabled and no In-frame.

Any pattern of at least seven contiguous ONE bits is said to be an Abort character. An Abort character is a physical entity, not to be confused with the Abort condition—which is an action. The Abort condition, simply called an Abort, is described below. It is important to note that there is a subtle difference between an Abort character and a Mark Idle condition. Back to back Abort characters do not necessarily constitute a Mark Idle condition. A repeating pattern of seven ONEs followed by a ZERO (1111111011111110111111110 . . . ) is a series of Abort characters, but not a Mark Idle. The DLC sends at least one "01111111" when commanded by microprocessor 18 to send an Abort.

The Abort condition is an action that takes place in response to the detection of an Abort character while the DLC receiver 108 is In-frame. An Abort causes the termination and discarding of the packet being received. Aborts are asynchronous events in that they can be detected on bit boundaries as well as byte boundaries.

Zero Bit Insertion/Deletion, often referred to as Bit Stuffing, is a technique used to provide data transparancy. By this is meant a method by which packet data patterns are prevented from appearing as Flags, Aborts, or Mark Idles when they appear in the received data stream. Flags, Aborts, and the Mark Idle condition all consist of six or more contiguous ONE bits. The Bit Stuffing technique examines the contents of a packet to be transmitted by transmitter 102, on a bit by bit basis, (from the first bit after the Opening Flag to the last bit of the FCS) and inserts a ZERO in the bit stream after any pattern of five contiguous ONEs, thus insuring that six or more ONEs do not appear in the data stream. The receiver 108, in turn, examines the data stream and removes the inserted ZEROs that follow five contiguous ONE bits. The implication of this is that Flag, Abort, and Mark Idle generation and detection must take place on the network side of the zero insertion and deletion units.

The BOPs specify minimum lengths for valid packets. This is usually four, five, or six bytes. Any frame that is received with fewer than this legal minimum number of bytes in its packet is called a Short Frame and is considered an error which should be discarded.

On a theoretical basis a frame can be any length greater than the specified minimum. As a practical matter, however, a maximum packet length must be set to prevent FIFO 100 and 106 buffer overrun. This length is dynamic, and can vary on a data call by data call basis. Any received frame whose packet exceeds this maximum length is referred to as a Long Frame, and is considered an error. The detection of a Long Frame error takes place as soon as the maximum legal number of bytes has been exceeded, not when the entire frame has been received.

If a Closing Flag is detected and a non-integer number of bytes has been received, (that is to say that the character preceding the Flag contained fewer than eight bits) a Non-Integer Number of Bytes Error condition exists.

The bytes are transmitted in ascending numerical order; inside a byte, the least significant bit (bit 0) is transmitted first. However, the FCS is numbered and transmitted in reverse to this convention.

As shown in FIG. 3, the transmitter portions 100 and 102 of the DLC 52 reside between the off-chip memory 22 and the serial port 104 to the data communications network. The microprocessor 18, under software control, builds a data block in memory 22 that contains the address, control, and information portions of a packet. This block of data is moved, byte at a time, into the transmit FIFO 100 via either DMA or programmed I/O. The transmitter 102 sends the Opening Flag, transmits the block of data, generates and sends the FCS (if selected), and transmits the Closing Flag. The polarity of the data stream can be inverted as it is being transmitted, if desired. Between packets the transmitter 100 can be programmed to output an all ONEs pattern (Mark Idle), or back to back Flags (Flag Idle). The transmission of a packet can be terminated by sending an Abort sequence in response to the Send abort bit being set in the Command/Control Register (bit 0).

Figure 4:
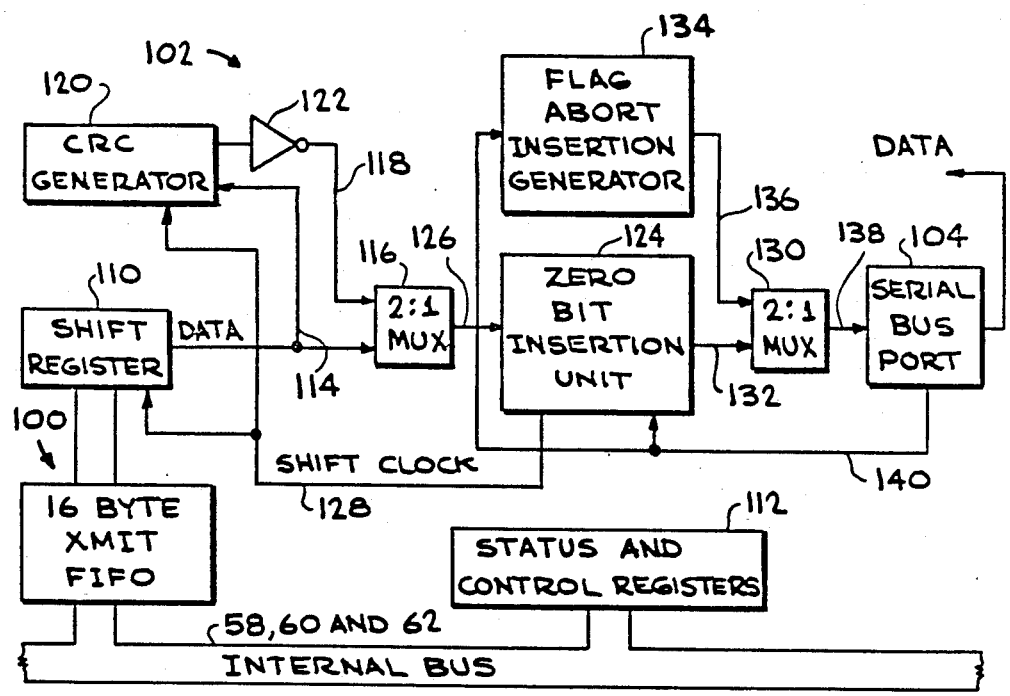
FIG. 4 is a block diagram of the transmitter portion of the DLC 52 of the IDPC 10.

With reference to FIG. 4, a block diagram of the transmitter sections 100 and 102 of the DLC 52, shows the 16-byte XMIT FIFO 100 interconnecting the internal busses 58, 60 and 62 and a parallel-to-serial shift register 110. Status and control registers 112 within transmitter 102 are connected to busses 58, 60 and 62. Control signals are conducted to and from the various elements of the transmitter 102 and the status and control registers 112 on lines not shown in FIG. 4. Appendix A contains a full description of DLC status and control register.

Data signals generated by shift register 110 are conducted on line 114 to a 2:1 multiplexer (MUX) 116 which also receives via a signal line 118 signals generated by a cyclic redundancy code (CRC) generator 120 via an inverting amplifier 122. The CRC generator 120 receives the data signals on line 14 generated by shift register 110. The signals selected by 2:1 MUX 116 are conducted to a Zero Bit Insertion unit 124 via a signal line 126. The Zero Bit Insertion unit 124 generates shift clock signals conducted to shift register 110 and CRC generator 120 via a signal line 128.

A 2:1 multiplexer (MUX) 130 receives the signals generated by Zero Bit Insertion unit 124 via signal line 132 and receives a signal generated by a Flag, Abort Generator 134 via signal line 136. The signal selected by 2:1 MUX 130 is conducted to the Serial Port 104 via a signal line 138. SBP 104 generates timing signals conducted on a signal line 140 to the Zero Bit Insertion unit 124 and the Flag, Abort generator 134.

Figure 5:
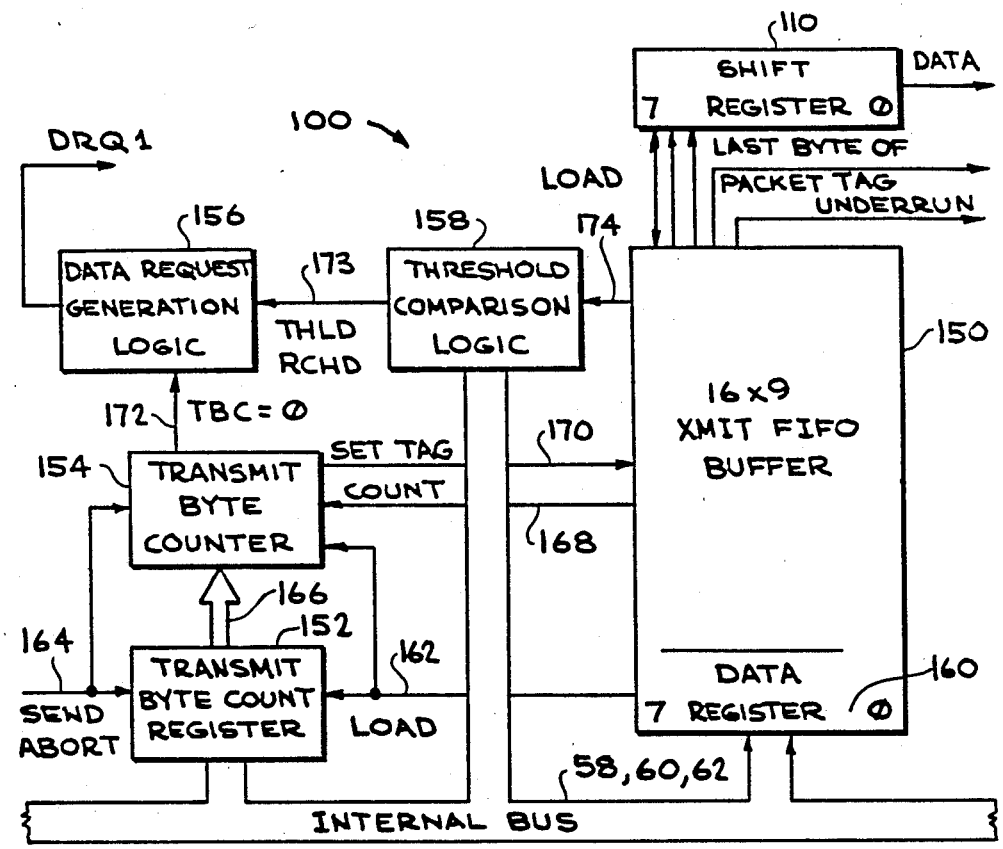
FIG. 5 illustrates the structure of the transmitter first-in, first-out (FIFO) 100 of the DLC 52.

The major elements of the transmitter 100 and 102, shown in block form in FIG. 4, will be described in greater detail in conjunction with FIGS. 5-9. With reference to FIG. 5, the transmit FIFO 100 consists of a FIFO buffer 150, a Transmit Byte Count Register 152, a Transmit Byte Counter 154, a DMA Data Request Generation logic 156 and threshold comparison logic 158.

The Transmit Byte Counter Register 152 is a read/write register and is connected to the internal busses 58, 60 and 62 and receives a LOAD signal generated by the FIFO buffer 150 via a signal line 162. It also receives a SEND ABORT signal generated by Flag, Abort generator 134 via a signal line 164. The transmit Byte Counter 154 also receives the LOAD and SEND ABORT signals and is connected to register 152 via a bus 166. Counter 154 receives a COUNT signal generated by FIFO buffer 150 via signal line 168 and a SET TAG signal generated by counter 154 is conducted to FIFO buffer 150 via signal line 170. A Transmit Byte Counter equals zero (TBC=0) signal generated by Counter 154 is conducted to Data Request Generation Logic 156 via line 170 and a threshold reached (THLD RCHD) signal generated by the threshold comparison logic 158 is conducted to logic 156 via line 172. Logic 158 is connected to the FIGO buffer 150 via a signal line 174, and is also connected to the internal busses 58, 60 and 62.

The FIFO buffer 150 is 16 bytes deep and nine bits wide (8 data bits and one tab bit, the tag indicating "the last byte of a transmit packet"). Data is loaded into the "bottom" of the buffer termed a FIFO Data Register 160 programmed by the microprocessor 18, via I/O or DMA. Data is moved therefrom up to the highest unfilled FIFO 150 location at a clock rate supplied by the microprocessor 18.

Data is unloaded from the buffer by the Parallel to Serial Shift Register 110. Both handling and unloading operations are asynchronous to the microprocessor clock. The buffer 150 is cleared on Reset or when an Abort is transmitted. Associated with the buffer 150 is a Threshold Reached signal generated by the threshold comparison logic 158. This signal is active whenever the number of bytes in the buffer is at or below the threshold level stored in a FIFO Thrshold Register within status and control registers 112. The Threshold Reached signal is conducted to the Data Request Generation logic 156 as an indiction that the buffer 150 should be reloaded. The Threshold Reached signal is reported in the FIFO Status Register, bit 2. A Data Request One (DRQ1) interrupt signal is generated by Data Request Generation Logic 156 when the level in the FIFO buffer 150 falls to the threshold level. DRQ1 is conducted to an external terminal of IDPC 10.

A user accessible location of the FIFO buffer 150 is termed the Data Register 160. The buffer 150 generates a status signal that reflects whether or not the Data Register is empty (available). This signal, Buffer Available, is reported in bit 3 of the Transmit FIFO Status Register (App. A). The bit is set anytime the Data Register is empty, and cleared when the Data Register is written AND the buffer location directly above the Data Register is full. This last stipulation on the clearing of the Buffer Available bit prevents the bit from clearing, only to be reset when the Data Register is emptied on the next clock cycle.

If the Parallel To Serial Shift Register 110 attempts to unload a byte from an empty buffer, an Underrun condition exists. This causes an error to be reported via bit 4 of the Transmit FIFO Status Register. A maskable interrupt is generated by the setting of this bit. In response to the Underrun, an Abort is generated elsewhere in the DLC 52. This causes the Transmit Byte Count Register 152 and the Transmit Byte Counter 154 to be reset to ZERO as well as the FIFO buffer 150 to be cleared.

The Transmit Byte Count Register (TBCR) 152, holds the length of the packet to be transmitted (exclusive of the Opening Flag, FCS, and Closing Flag). This value is loaded into the TBCR 152 by microprocessor 18 software via the Internal Bus 58, 70 and 62. The TBCR 152 is cleared when the DLC 52 is reset or when an Abort is transmitted. When the DLC transmitter 102 is Out of Frame the contents of the TBCR is loaded into the Transmit Byte Counter 154 at the same time it is written into the TBCR. The contents of the TBCR is also loaded into the Transmit Byte Counter when the last byte of a packet (tagged as such) is removed from the FIFO buffer 150. (This also insures that the correct value is loaded into the TBC if the TBCR is updated while the transmitter is In-frame). Loading of the TBCR is delayed if the TBCR is being written at this time.

The Transmit Byte Counter (TBC) 154 is used to count the number of bytes loaded into the buffer 150 for a given packet. The TBC 154 is loaded from the Transmit Byte Count Register and decremented once for each byte loaded into the buffer. When the contents of TBC 154 reaches ZERO, the byte that caused the TBC to reach ZERO is tagged as the last byte of the packet. This tag is created by setting the ninth bit position of that byte to a ONE. Recall that the buffer 159 is nine bits wide. The ninth bit position is used to hold this tag, which travels with the last data byte through the buffer. The tag is used to load the TBC from the TBCR, and indicated the end of a packet to the DLC.

The Data Request Generation Logic 156 generates the Data Request (DRQ1) signal. DRQ1, when active, indicates to the DMA that the buffer 150 is available for the loading of data. The DRQ1 signal is activated when the TBC 154 is not ZERO -AND- the FIFO buffer 150 does not contain a tagged byte -AND- the level in the buffer 150 is below the programmed threshold (bits 3-0 of the FIFO Threshold Register). DRQ1 remains active until the TBC=0 signal is generated -OR- the buffer 150 becomes full. In this manner when the level in the buffer 150 falls to the threshold and there is more data in the packet to be loaded into the buffer, DRQ1 will go active. DRQ1 will remain active until the buffer is coompletelly full or the last byte of the packet is loaded into the buffer. This insures that there can never be data from more than one packet in the buffer at any one time since even if the TBCR 152 is written before the last byte of the packet has been transmitted, DRQ1 will remain inactive until the tagged byte is removed from the buffer. DRQ1 is indirectly made inactive by Reset since the TBC 154 is cleared to ZERO on Reset. DRQ1 will become active in this case as soon as the TBCR 152 is written (non-ZERO).

Figure 6:
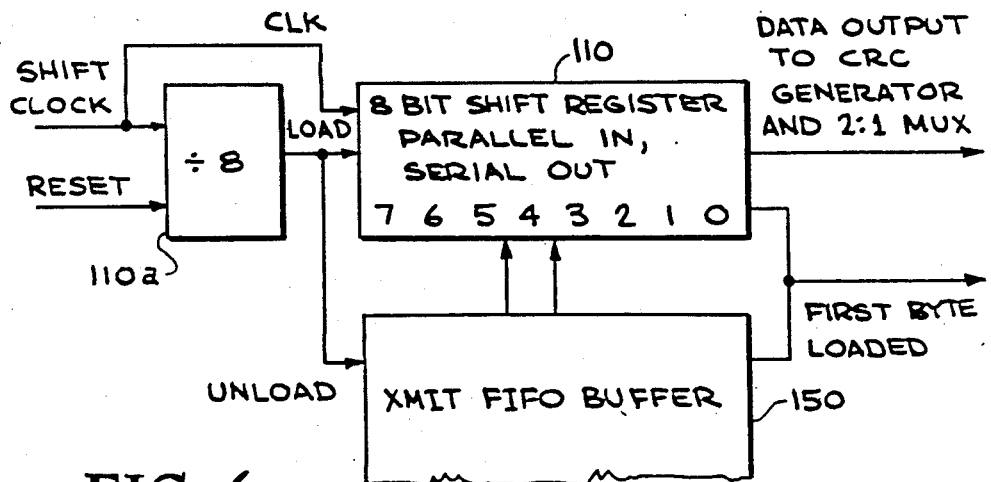
FIG. 6 illustrates the serial-to-parallel shift register 110 of the transmitter 102 portion of DLC 52.

With reference to FIG. 6, data is conducted from the Transmit FIFO 100 to the eight bit shift register 110, one bype at a time. Each byte is shifted out of the shift register 110 serially by reception of the Shift Clock, which is provided by the Zero Bit Insertion Unit 124. The signals generated by shift register is conducted to the CRC generator 120, and to the 2 to 1 multiplexor 116.

The shift register 110 is responsible for generating the load control signals that effect the movement of data from the FIFO buffer 150 into the shift register 110. The first load is enabled automatically after an IDPC or DLC Reset or fter the last byte of a frame (tagged as such) has left the shift register 110. The load will take place as soon as a byte of data reaches the top of the FIFO buffer. Thereafter, the shift register 110 will attempt to load itself every eight shift clock cycle by virtue of the divide-by-eight counter 110a which generates a LOAD signal conducted to register 110, until the last byte of the packet has been loaded.

The counter 110a is held in Reset when the DLC is in Reset, the transmitter is Idle, transmitting an Abort, a Flag, or the FCS. When the first byte of a packet reaches the top of the FIFO buffer 150 it is automatically loaded into the shift register 110. This action is the indication to the Zero Bit Insertion Unit 124 to gate the shift clock through to the shift register, and remove the Reset control from the divide by eight counter 110a.

Data is shifted out of the shift register 110 on the falling edge of the Shift Clock. The Shift Clock is generated by the Zero Bit Insertion 124 and runs at approximately the transmitter data rate: the Zero Bit Insertion Unit increases the length of the shift clock cycle that follows five consecutive ONE bits, by a full bit time. This allows for a ZERO to be inserted in the data stream (the insertion takes place past the Serial to Parallel Shift Register 110). With the exception of changing the duty cycle of an occasional Shift Clock cycle, the zero insertion process has no effect on the operation of the shift register 110. The Shift clock is synchronous to the transmitter clock (XMITCLK). When the transmitter 102 is not shifting data out of the shift register (i.e., when the transmitter is either in Reset, Idle, sending a Flag, sending an Abort, or sending the FCS), the shift clock is blocked at the Zero Bit Insertion Unit.

The shift register 110 is cleared by a Reset or an Abort.

Referring again to FIG. 4, the CRC generator 120 produces a 16 bit word referred to as the Frame Check Sequence (FCS). The mathematical equation describing this operation is described hereinabove. Design and construction of the CRC generator 120 is well known to those skilled in the art and will not be further described herein.

The signals generated by the Parallel to Serial Shift Register 110 and the CRC generator 120 are conducted to the Zero Bit Insertion Unit 124 via the 2 to 1 multiplexor 116. During the data portion of a packet, the address, control and information fields will be referred to as the "data", the multiplexor 116 passes data from the shift register 110. After the last bit of the data portion of the packet has been shifted out of the shift register 110, the FCS is passed out of the CRC generator 120 if the CRC generator is enabled.

A 2:1 MUX 116 control signal causes 2:1 MUX 116 to select the data path from the Parallel to Serial Shift Register 110, except when the FCS is actually being transmitted.

Figure 7A:
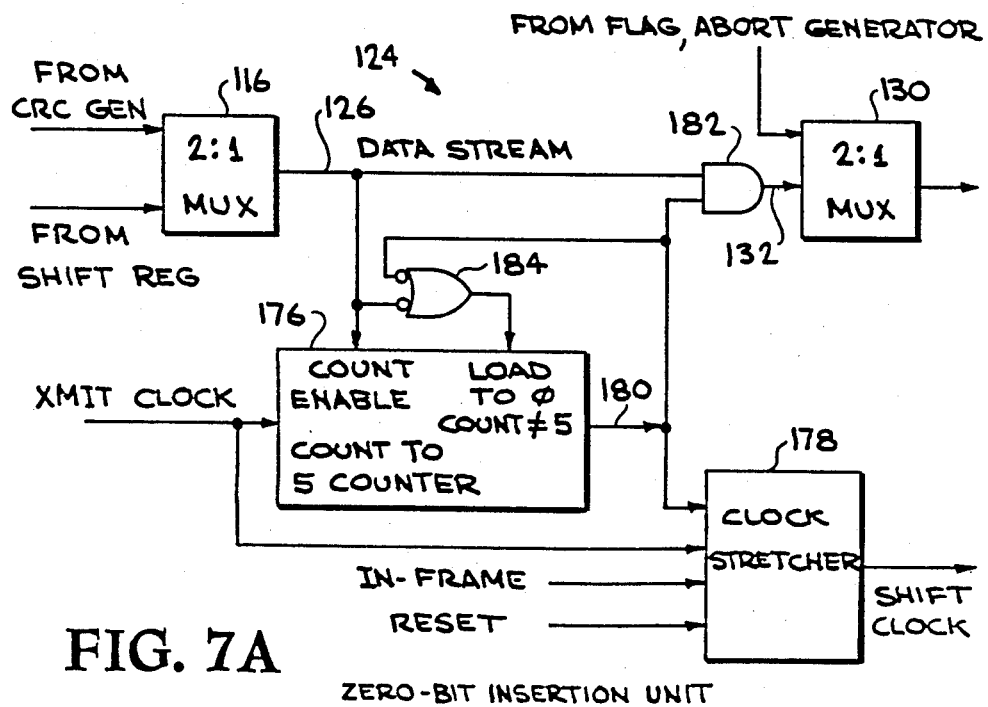
FIG. 7A illustrates the structure of the Zero Bit Insertion Unit 124 of the DLC 52 transmitter 102.

To maintain data transparency the DLC transmitter 102 will examine the frame content between the Opening and Closing Flag (including the address, control, information, and FCS fields) and will cause the Zero Bit Insertion Unit 124 to insert a ZERO bit after all sequences of five contiguous ONEs. This is done to ensure that the Flag and Abort sequences are not simulated in the data stream. Additionally, the Zero Bit Insertion Unit 124 generates the Shift Clock, which is used by the Parallel to Serial Shift Register 110, the CRC Generator 20, and a MUX control signal generator (not shown). With reference to FIG. 7A, the Zero Bit Insertion Unit 124 consists of a three bit counter 176 and related logic.

Three-bit counter 176 receives at a count enable input the data stream on the signal line 126 generated by 2:1 MUX 116. The transmit clock (XMIT CLOCK) signal is conducted to counter 176 as well a to a clock stretcher circuit 178. The resulting counter signal is generated by counter 176 on a signal line 180 when conducts the signal to clock stretcher 178, to an input of an AND gate 182 and to a complement input of an OR gate 184. AND gate 182 also receives the data stream on signal line 126 as does OR gate 184 at a second complement input. OR gate 184 generates a signal applied at a load-to-zero input of counter 126. The AND gate 182 generates a signal conducted on line 132 to 2:1 MUX 130.

The counter 176 is automatically cleared to ZERO when it is reset. As the data stream is received on line 126, the counter 176 is incremented each time a ONE bit is detected and reset (to ZERO) when a ZERO bit is detected. In this way the counter 176 will only count up to five when five consecutive ONEs are encountered. When the counter 176 reaches five, three actions are taken: the data input to 2:1 MUX 130 is forced LOW for one cycle of the transmit clock by AND gate 182, the next Shift Clock cycle is lengthened by one cycle time by clock stretcher 178, and the counter 176 is reset. (Note that for purposes of description all action is shown related to the same clock edge, such as: the same clock edge that shifts the fifth ONE bit to the Zero Bit Inserter is shown clocking it into the counter—obviously, this creates race conditions. These can be avoided by using delayed clocks where appropriate as will be appreciated by those skilled in the art.) By forcing the data input to a LOW, a ZERO is inserted in the data stream since the transmit clock is still running. By stretching the Shift Clock, the shifting of the next bit of data (from either the Parallel to serial Shift Register or the CRC Generator) is held off for one bit time—making room for the inserted ZERO. The counter 176 is held in Reset whenever the transmitter is sending Flags, Aborts, or is Mark Idling.

Clock stretcher 178 also receives an IN-FRAME signal from a control, not shown, and the RESET signal. The clock stretcher 178 generates the Shift Clock which is a conditioned version of the transmitter clock. The clock is conditioned by clock stretcher 178 in two ways: First, its duty cycle can be modified, as just described, to provide for ZERO bit insertion. Second, the shift clock is gated ON and OFF—selecting when data is to be shifted out of the Parallel to Serial Shift Register 110 and the CRC Generator 120. The shift Clock is gated ON when the first byte of a new packet is loaded into the Parallel to Serial Shift Register from the FIFO buffer. (This load is automatic and generates a control signal to the Zero Bit Insertion Unit. The clock remains ON until the last bit of the FCS is sent as indicated by the 2:1 MUX 116 control signal going high, or if CRC generation is not enabled (bit 5 of the DLC Command/Control Register), until the last bit of data has sent (the point at which the data/FCS MUX control would have gone low if CRC generation had been enabled. A control line (not shown) which indicates the ON or OFF state of the Shift Clock is provided to the Parallel to Serial Shift Register 110 for use by its load counter 110a.

The signal generated by AND gate 182 represent the outut of the ZERO bit insertion unit 124 and is conducted to 2:1 MUX 130 that selects between the transmission of data or Flags/Aborts. The control signal for MUX 130 is generated by the Flag/Abort generator 134. The control signal causes 2:1 MUX 130 to select packet data transmission generated by the Zero Bit Insertion Unit 124 from after the last bit of the Opening Flag until the first bit of the Closing Flag. The multiplexer 130 selects the signals generated by Flag/Abort generator 134 whenever data transmission is not explicitly selected.

Figure 7B:
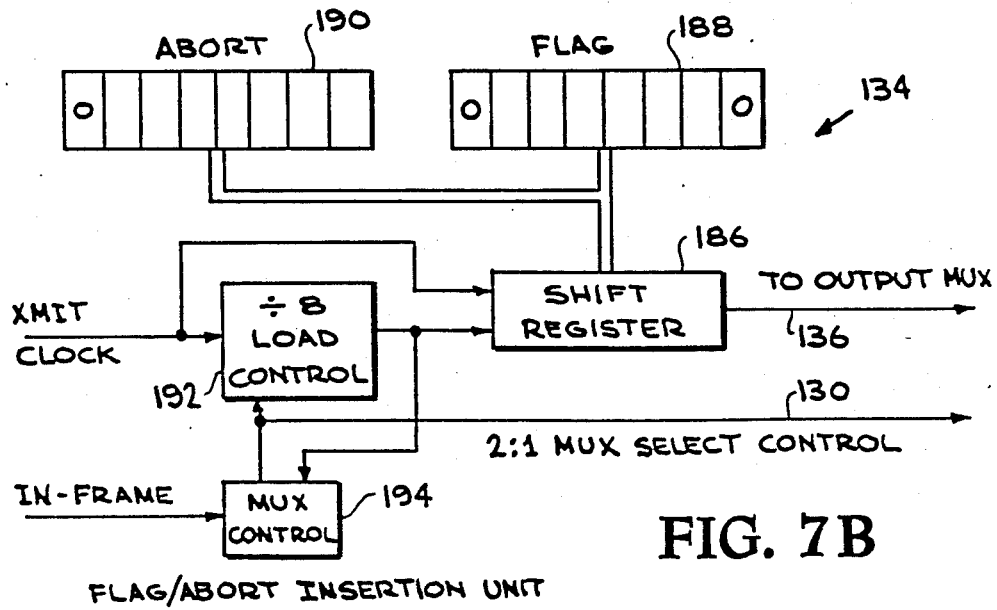
FIG. 7B illustrates the structure of the Flag/Abort Insertion Unit 134 of the transmitter 102 portion of DLC 52.

The Flag/Abort Insertion Unit 134 shown in FIG. 7B generates Flag and Abort characters inserted by 2:1 MUX 130 into the data stream. The unit consists of a shift register 186 which is loaded in parallel with either the Flag (01111110) or Abort (01111111) characters stored in registers 188 and 190, respectively, a divide by eight counter and the logic load shift register 192, and the control logic 194 generating the control signal to the 2 to 1 Multiplexer 130.

The shift register 186 is connected to registers 188 and 190 and can be loaded with either a Flag or an Abort character. The contents of register 186 are shifted out least-significant bit first by the falling edge of the transmit clock and serially connected to one input of 2:1 mux 130 via signal line 136.

The shift register 186 is loaded just prior to the transmission of a Flag or an Abort by unit 134. Flags are transmitted back to back whenever the transmitter is not sending either a packet (exclusive of Opening and Closing Flags) or an Abort. Aborts are transmitted whenever the Send Abort bit is set (bit 0 in the DLC Command/Control register (App. A)). This bit is set and cleared by software. One Abort character is also sent in response to a Transmit FIFO Underrun condition.

When an Abort is requested it is transmitted immediately. If the Send Abort bit is cleared in the middle of the transmission of an Abort character, the transmission of the Abort character will be completed before the transmission of Flag characters will commence. (Flags or Mark idle always follow an Abort. Since the Mark Idle is inserted after the 2 to 1 Output Multiplexor, the Flag/Abort Insertion Unit will always default to sending Flags. If Mark Idle is Selected (bit 3 of the Command/Control Register), the output of the DLC will be forced to an all ONEs pattern, ignoring the Flags coming from the Flag/Abort Insertion Unit.)

When continuous Flags or Aborts are being transmitted, the shift register 186 is automatically reloaded after the transmission of the first Flag/Abort. This takes place every eight bit times. A divide-by-eight counter within block 192 is used to divide down the transmit clock for this purpose.

The Flag/Abort Insertion Unit 134 contains a three-bit counter which contains a user-supplied value indicating the numer of residue bits in a packet. This value is transferred from a Residual Bit Control/Status Register (App. A) when the last INFO byte of a packet just prior to the FCS. The counter is decremented as each bit is shifted out of register 186. When the contents of the counter reaches zero all residual bits have been transmitted and the FCS, if enabled, and closing flag can be transmitted.

The Flag/Abort Insertion Unit 134 generates a control signal to the 2:1 Multiplexer 130, indicating whether packet data or Flags/Aborts are to be transmitted. The control signal selects the Flag/Abort path whenever the transmitter is not sending packet data. Packet data is sent from the end of the Opening Flag until the beginning of the Closing Flag. A request to send an Abort (Send Abort bit or FIFO Underrun) places the transmitter Out of Frame.

Figure 8:
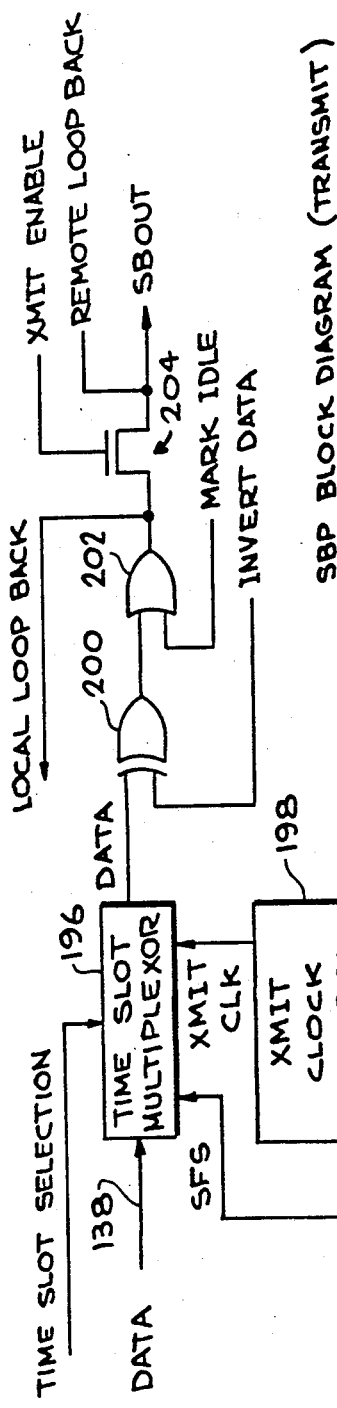
FIG. 8 is a block diagram of the transmitter portion of the Serial Bus Port 104.
Figure 9:
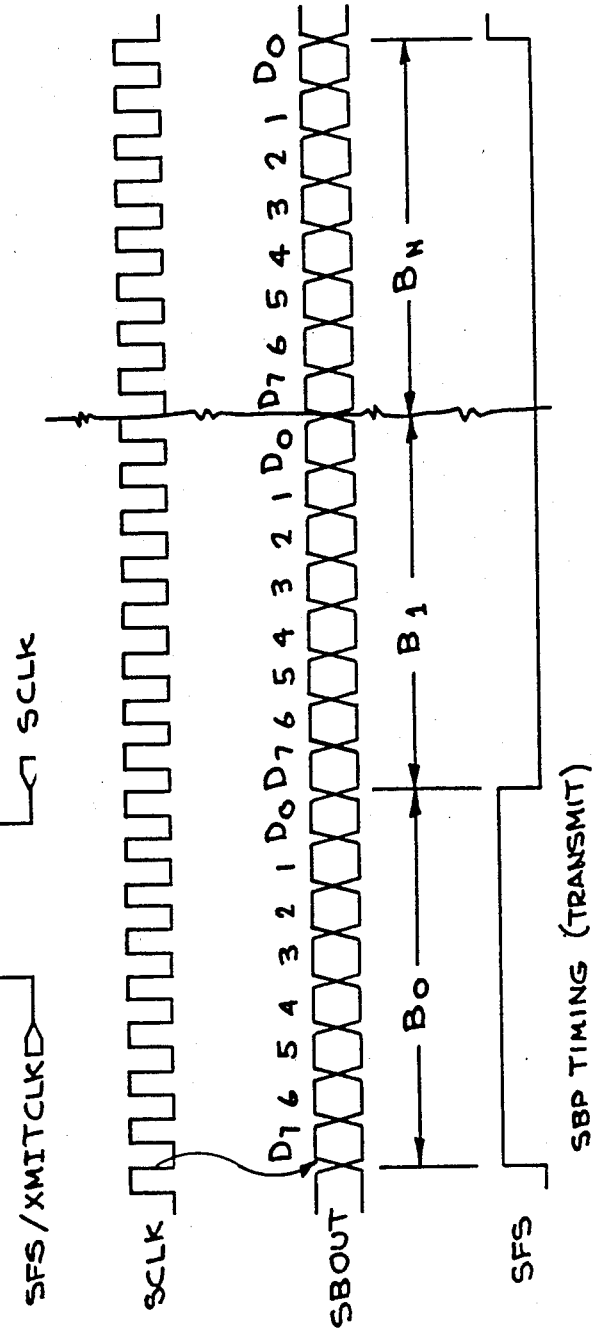
FIG. 9 shows the timing of the transmitter portion of SBP 104.

The Serial Bus Port (SBP) 104 receives the signal selected by 2:1 MUX 130. The SBP performs several functions related to a time slot assignment, clock selection, data inversion, enabling the transmitter, and Loop Back testing. FIG. 8 is a block diagram of the SBP 104.

The signal selected by Multiplexer 130 is routed through a Time Slot Multiplexer (TSM) where it is assigned one of thirty-one time slots, or transmitted as is (referred to as the non-multiplexed mode). The SBP 104 is designed to connect directly to the SBP of the DSC 12 (FIG. 1). Up to thirty-one time slots combine to form a frame, where data is transmitted during one of the 8-bit groups shown in FIG. 9.

A transmit clock control 198 receives a Serial Frame Synch (SFS) signal and a Serial Clock (SCLK) signal applied to pins of the IDPC.

The Serial Frame Sync (SFS) signal (the SFS/XMITCLK pin serves as either the SFS input in multiplexed mode, or the transmit clock input in non-multiplexed mode) provides a reference indicating the location of the first eight bits of the frame. The transmitter time-slot multiplexer 196 can be programmed by microprocessor 18 (shown in FIG. 8 by the signal line "TIME SLOT SELECTION") to place data on any one of the time slots via bits 1 to 5 of the SBP Control Register, as described in App. A hereinafter. In the multiplexed mode a signal applied on SCLK pin provides the transmit clock source. This clock source is gated by transmit clock control 198 with the selected time slot to provide the transmit clock. If time slot 0 is selected, data is transmitted for as long as the SFS signal is active, instead of for eight bits at a time. If the SFS input is held active for 16 bit times instead of 8 each frame, the transmitter will end out 16 bits per frame, as opposed to 8. By doing this the DSC 12 can place the data on both of the two B channels (on an every-other-byte basis) effectively doubling the data rate. If the non-multiplexed mode (bits 1 to 5 set to ONEs in the SBP Control Register), data is transmitted continuously. in this mode transmit clock is input on the SFS/XMITCLK pin. Data is always transmitted on the falling edge of the transmit clock.

After data has passed through the TSM 196 it is conducted to a programmable inverter XOR gate 200. If bit 0 of the SBP Control Register is set to 1, the data will be inverted by virtue of an INVERT DATA signal conducted to XOR gate 200 from Status/Control Registers 112.

Whenever the transmitter 102 is enabled (bit 1 of the DLC Command/Control Register) and is out of frame (and the Closing Flag or Abort has been sent) with Mark Idle selected (bit 3 of the DLC Command/Control Register), the transmitter's output will be forced HIGH by an XOR gate 202 receiving the signal generated by the programmable data inverter 200 and a MARK IDLE signal generated by Status/Control Register block 112.

The transmitter 102 is enabled and disabled via bit 1 in the DLC Command/Control Register (App. A). Whenever the transmitter is disabled, the SBOUT pin is three-stated by virtue of transistor 204 receiving the signal generated by programmable Mark Idle inserter 202, upon application of a transmit enable (XMIT ENABLE) signal. The signal conducted via transistor 204 is generated at a Serial Bus Output (SBOUT) terminal pin of the IDPC 10.

The DLC 52 can be placed in a Local Loop Back configuration for test purposes. This is done by setting bit 3 to a 1 in the SBP Control Register. Local Loop Back disconnects the SBIN and SBOUT pins (SBOUT is three-stated) and connects the transmitter output and receiver input together. The selected transmitter clock described earlier is used as the receive clock.

The DLC 52 can be placed in a Remote Loop Back configuration for test purposes. This is done by setting bit 4 to a 1 of the SBP Control Register. Remote Loop Back disables the transmitter, and echoes whatever is received at the SBIN pin out the SBOUT pin. Reference should be had to App. A for a complete description of these aspects of the IDPC 10.

Associated with the DLC 52 transmitter 102 are shown several user visible status and control registers. These registers, contained in functional block 112 are described in detail in Appendix A, are used to configure the DLC transmitter 102, instigate specific actions, report status, and generate interrupts. All of these registers can be accessed by the local microprocessor 18. None of them can be accessed by a host processor.

Although not shown on FIG. 4, various control and status signal lines interconnect the DLC transmitter 102 elements shown there with the Status and Control Register block 112. As these signal lines are conventional, and their ability to control the elements to which they are connected is well understood by those skilled in the art. Accordingly, the design and construction of block 112, nor of the other similar control and status blocks employed by the IDPC 10, will be elaborated herein. Referring again to FIG. 3, the receive portions 106 and 108 of the DLC 52 takes serial data from the Serial Bus Port (SBP) 104, processes it, and allows it to be moved to off-chip memory 22. Dedicted hardware modules are used to perform the bit level operations on each frame of data as it is received (Mark Idle detection, data inversion, Flag/Abort recognition, Zero Bit Deletion, CRC checking, and address recognition). The 16-Bit deep receive FIFO 106 is used as a buffer between this bit-rate-dependent processing and packet-at-a-time processing performed by the microprocessor 18. Data can be moved from the receive 106 FIFO to memory 22 either by DMA, or by microprocessor 18 control.

With reference to FIG. 10, a block diagram of the receiver sections 106 and 108 of the DLC 52, shows the 16-byte RECV FIFO 106 interconnecting the internal busses 58, 60 and 62 and three shift registers 208, 209 and 210. Status and control registers 212 within DLC receiver 108 are connected to busses 58, 60 and 62. Status and Control signals are conducted to and from the various elements of the receiver 108 and the status and control registers 212 on lines not shown in FIG. 10.

The Serial Bus Port 104 receives data signals from a Serial Bus Input (SBIN) terminal which are conducted to a shift register 212. A Flag Detect, Abort Detect Unit 214 is connected to shift register 212. The shift register 212 is connected via a signal line 216 to the shift register 210 for transference of data signals.

A recovered DATA INPUT CLOCK signal generated by SBP 104 is conducted to a Bit Delete, Byte Count, Short Frame Error Unit 218 via a signal line 220, which also receives the data signals on line 216. Shift register 212 also receives the recovered DATA INPUT CLOCK signal on line 220. A cyclic redundancy code (CRC) Checker 222 receives the data signals on line 216 as well as a clock generated by Bit Delete, Byte Count, Short Frame Error Unit 218 via signal line 224. Shift register 210 also receives the clock signal on line 224. An address detection unit 226 is connected to registers 208 and 210.

The major elements of the receiver 106 and 108, shown in block form in FIG. 10, will be described in greater detail in conjunction with FIGS. 11-18. With reference to FIG. 11, the hardware blocks of the receiver 108 will be discussed in the order that data flows through the unit, from the receiver portion Serial Bus Port 104 to the RECV FIFO 106 (refer to FIG. 10). The receiver 102 must support data rates from DC to 2.048 MHz. For this reason care has been taken in the design of the receiver to minimize the effects of real time events on the software that processes the received data packets. The DLC 52 of the instant invention has been designed to receive an entire packet and move it to off chip memory 22 without the intervention of the microprocessor 18, if direct memory access (DMA) is used. Packet status information is reported on a packet-by-packet basis at the time that the packet has been completely moved to memory 22. A description of this delayed status reporting mechanism is given hereinafter in connection with FIG. 27.

The receiver portion of Serial Bus Port (SBP) 104 receives serial data from the SBIN pin of the IDPC 10 and generates signals therefrom to the Flag/Abort Detection Unit 214 and the Zero Bit Delection Unit 218. The receive-side of SBP performs three operations on the data: Mark Idle detection, programmable data inversion, and time slot demultiplexing. FIG. 11 is a block diagram of the receive side portion of SBP 104. Data is clocked into the receive side SBP by the rising edge of a serial clock (SCLK) signal applied at a terminal pin of IDPC 10. This signal is conducted to a clock input terminal (CLK) of a Mark Idle detector 230 and to a clock input terminal of a time slot demultiplexer (TSD) 232. A transistor 234 interconnects the SBIN terminal and a signal line 236 connected to a count enable (CNT ENABLE) input terminal of Mark Idle Detector 230. Transistor 234 receives a RECEIVER ENABLE signal which causes the data signals applied at the SBIN terminal to be conducted on signal line 236. The RECEIVER ENABLE signal is generated by status and control register 212 as described in App. A.

Mark Idle detector 230 also receives at a complemented input an IN-FRAME signal, and at a complmented input the data signals conducted on line 236.

The Mark Idle detector examines the data stream received via line 236 for the presence of 15 or more contiguous ONE bits, whenever the receiver 108 is out of frame. The detection of Mark Idle must take place after the receiver is out of frame since a valid data pattern of 15 or more ZEROs, while In-frme on an inverted data link (inverted to all ONEs), will simulate the Mark Idle condition. The Mark Idle detection unit 230 consists of a counter that is enabled by the In-frame signal being inactive; counts each ONE bit as it arrives; is reset by each ZERO bit that arrives; generates a Mark Idle indication siganl when it counts 15 ONEs and maintains that indication until a ZERO is received; is cleared by a hardware or software Reset; and is cleared and disabled when the receiver 108 goes In-frame upon reception of the In-frame signal.

The detection of a Mark Idle condition sets bit 0 in a Receive Link Status Register (App. A). If enabled, an interrupt is generated in response to a negative-to-positive transition of this bit.

A Programmable Data Inverter comprising XOR gate 238 receives the data signals via signal line 236 and an INVERT DATA signal; the reception of which causes inversion of the received data on a bit-by-bit basis. INVERT DATA is also generated by status and Control Register 212 as described in App. A. Setting bit 0 in a SBP Control Register (App. A) causes this inversion.

Time slot Demultiplexer 232 receives the signal generated at the output of XOR gate 238 and a Serial Frame Synchronizer (SFS) signal. The Time Slot Demultiplexer (TSD) 232 an operate in one of two modes: multilexed or non-multiplexed. Reference should now be had to FIG. 12, a timing diagram of the TSD 32. When in the multiplexed mode (selected by bits 1 through 5 of the SBP Control Register (APP. A) the incoming data is valid during one of up to 31 eight-bit long time slots of a 24 bit long frame. The Status/Control Register block 212 generates a signal denoted "CHANNEL SELECT" received by TSD 232 based on bits 1 to 5 of the SBP Control Register as described in App. A. The Serial Frame Sync/Transmit Clock (SFS/XMITCLK) pin of the IDPC 10 receives the frame sync pulse (SFS) which is active for the first eight bit times of the frame and this defines the frame boundaries. The active time slot is selected by bits 1 to 5 of the SBP Control Register. Time slot 0 is treated as a special case in which data can be received more than eight bits at a time. When time slot 0 is selected data is received for as long as SFS is active. This allows, for example, 16 bits of data to be received each frame. If the DSC 12 were using both B channels to receive data belonging to the same packet (thus doubling the data rate), it would send the data to the IDPC over both channels 0 and 1 of its SBP. With the SFS pulse lengthened to 16 bit times, the IDPC 10 would receive all 16 bits (on its channel 0) as part of the same packet.

In the non-multiplexed mode, data is received by the TSD 232 as a continuous stream, clocked by SCLK. Non-multiplexed operation is selected by setting bit 1 to 5 of the SBP Control Register (Refer to App. A.) In this mode, the SFS/XMITCLK input is not used by the receiver 108 (it is used as the transmit clock input by the transmitter, thus giving separate receive and transmit clocks).

The selected data signals generated by TSD 232 are generated at a DATA output terminal of TSD 232 and the clock used, either SFS or SCLK, is generated at a RECEIVE CLOCK output terminal.

Figure 13:
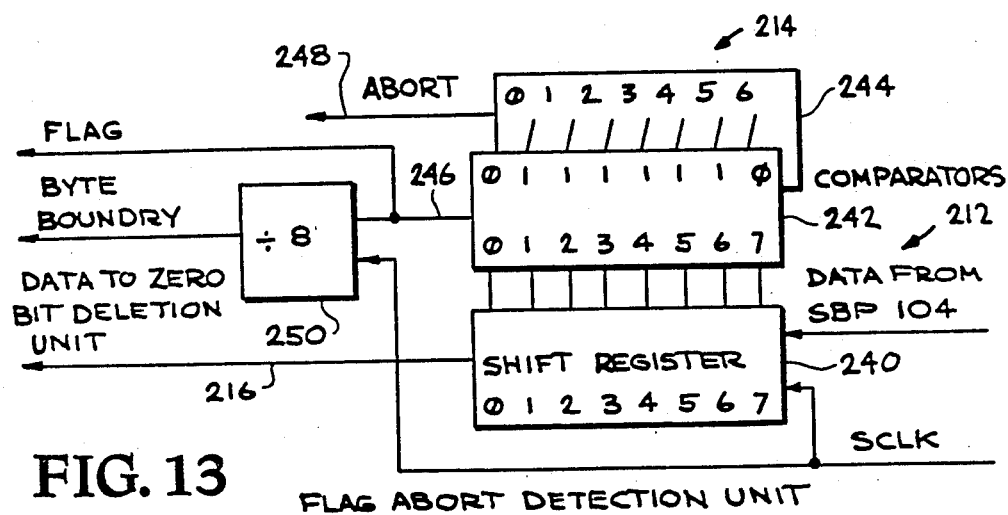
FIG. 13 is a block diagram of the Flag/Abort Detection Unit 214 of the receiver 108 portion of DLC 52.

With reference to FIG. 13, the Flag/Abort Detection unit 214 includes an eight-bit shift register 240 connected to the Data Output Terminal of TSD 232. The serial receive data is shifted on the rising edge of SCLK received by register 240. The contents of the shift register 240 are tested by comparators 242 and 244, respectively, for the presence of eithr a Flag or an Abort character. Testing takes place every time a bit is shifted into the shift register. In the case of Abort detection, only the first seven bits are tested. Comparators 242 and 244 generate a signal on lines 246 and 248, respectively, indicating detection of the Flag or Abort character, respectively. Flag/Abort Detection Unit 214 also includes comparators 242 and 244 connected to shift register 240.

The Flag/Abort Detection Unit 214 generates an IN-FRAME signal received by the receive and transmit sides of SBP 104 of the DLC, and by the Short Frame Byte Counter 260. The IN-Frame signal is generated when a Flag character is present in the shift register 240, eight bit times elapse, and neither a Flag nor an Abort character is then present in the shift register 240.

The contents of shift register 240 are conducted on line 216 to the Zero-Bit Deletion Unit 218. A divide-by-eight counter 250 is used to generate a byte boundary signal. The counter 250 receives the SCLK signal which it divides by eight, to produce the BYTE BOUNDARY signal. The counter 250 is reset by the receipt of a Flag detection signal conducted on line 246.

On Reset, the shift register 240 is set to all ZEROs in order to avoid false Flag or Abort detection.

Figure 14:
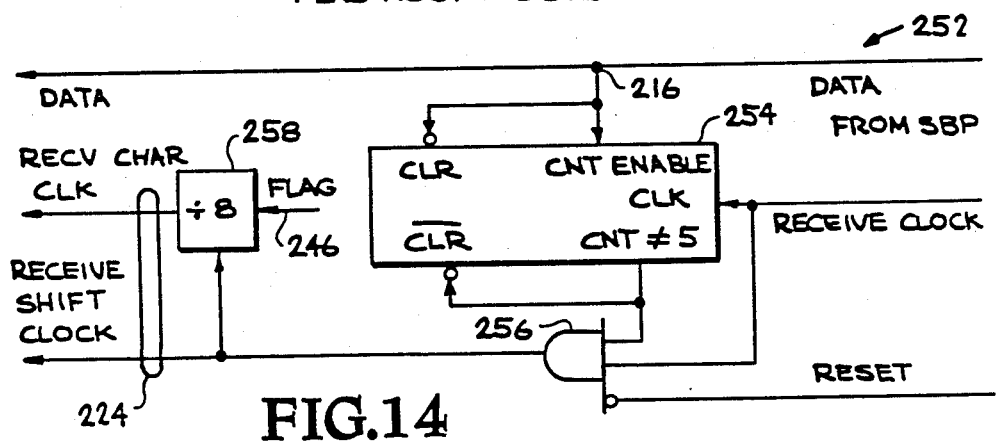
FIG. 14 is a block diagram of the Zero Bit Deletion Unit of element 218 of the DLC receiver 108.

In order to prevent valid data patterns from being detected as either Flags or Aborts, a technique called Bit Stuffing is used. The transmitter examines the data stream between the Opening and Closing Flags (exclusive). If five consecutive ONE bits are detected, a ZERO is inserted after the fifth ONE. The Zero Bit Deletion Unit in the receiver removes this added ZERO. FIG. 14 shows a block diagram of the Zero Bit Deletion Unit.

With reference to FIG. 14, the Zero Bit Deletion Unit 252 of Zero Bit Deletion Byte Count and Short Frame Error Unit 218 is shown. The data received from the shift register 240 is conducted via signal line 216 to the Zero Bit Deletion Unit 252. A three-bit counter 254 receives the data on line 216 as well as the RECEIVE CLOCK generated by SBP 104. Signal Line 216 is connected to a count enable (CNT ENAB) input terminal of Counter 254 as well as to a complemented clear (CLR) input terminal thereof. A COUNT NOT EQUAL TO 5 (CNT=5 signal is generated at an output of counter 254 which is conducted to an AND gate 256 as well as to a complemented clear (CLR) input of the counter. AND gate 256 also receives the RECEIVE CLOCK signal and at a complement input the RESET signal.

Counter 254 generates the CNT=5 signal at the presence of five consecutive ONEs in the data received on line 216. If this event occurs, the next bit is deleted from the data stream (normally ZERO). The deletion is performed by stretching the Receive Clock one clock cycle in a Receive Shift Clock signal generated by AND gate 256. The Receive Shift Clock is received by divide-by-eight counter 258 which also receives the Flag signal on line 246 and generates a Receive Character Clock (synchronized to Flag character receipt). The Receive Shift Clock and the Receive Character Clock signals are conducted to the Serial to Parallel Shift Register 210, a Receive Byte counter portion of unit 218 and the CRC Checker 222 via signal lines 224.

Figure 15:
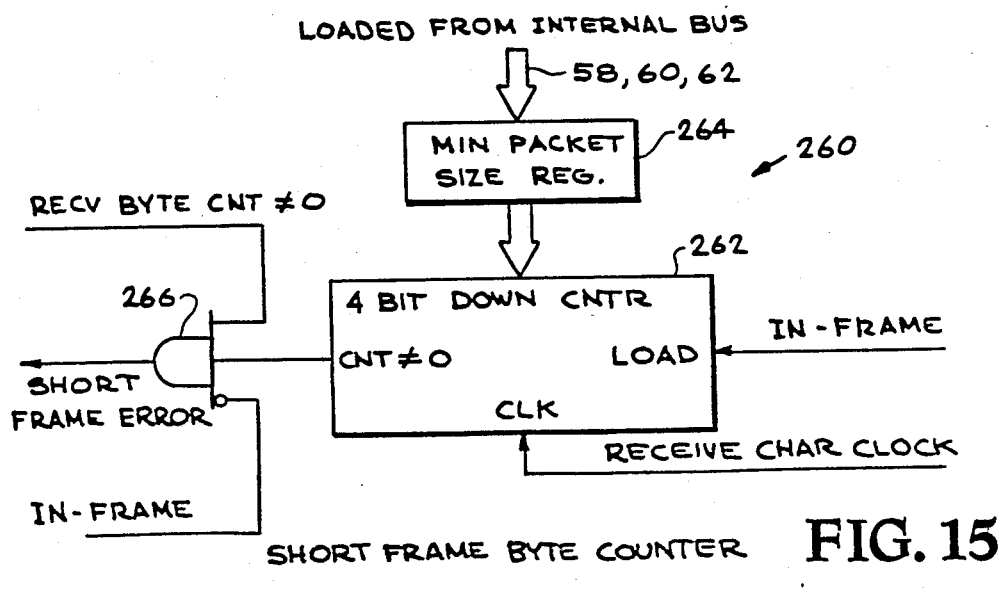
FIG. 15 is a block diagram of the Short frame Byte Counter 260 of element 218 of the DLC receiver 108.

With reference to FIG. 15, the Short Frame Byte Counter 260 (SFBC) portion of Unit 218 includes a four-bit down counter 262 receiving at a clock input the RECEIVE SHIFT CLOCK signal that counts the number of characters that have reached the Serial to Parallel Shift Register 210. Four-bit down counter 262 also includes a register 264 storing a Minimum Packet Size value received on internal busses 58, 60 and 62. The contents of register 264 is conducted to down counter 262 where it is applied to a load terminal thereof. The counter 262 generates a COUNT NOT EQUAL TO ZERO (CNT=0) signal conducted to an AND gate 266. AND gate 266 also receives a RECEIVE BYTE COUNT GREATER THAN ZERO (RECV BYTE CNT=0) signal generated by receive 16-byte FIFO 106 and an IN-FRAME signal. If a frame ends in a Flag, AND the number of bytes received is less than the value programmed in the Minimum Packet Size Register, AND data has been placed in the FIFO (Receive Byte Counter 0), a Short Frame Error signal is generated by AND gate 266.

The CRC Checker 222 is virtually identical to the CRC Generator 120 in the transmitter and accordingly will not be further described.

Figure 16:
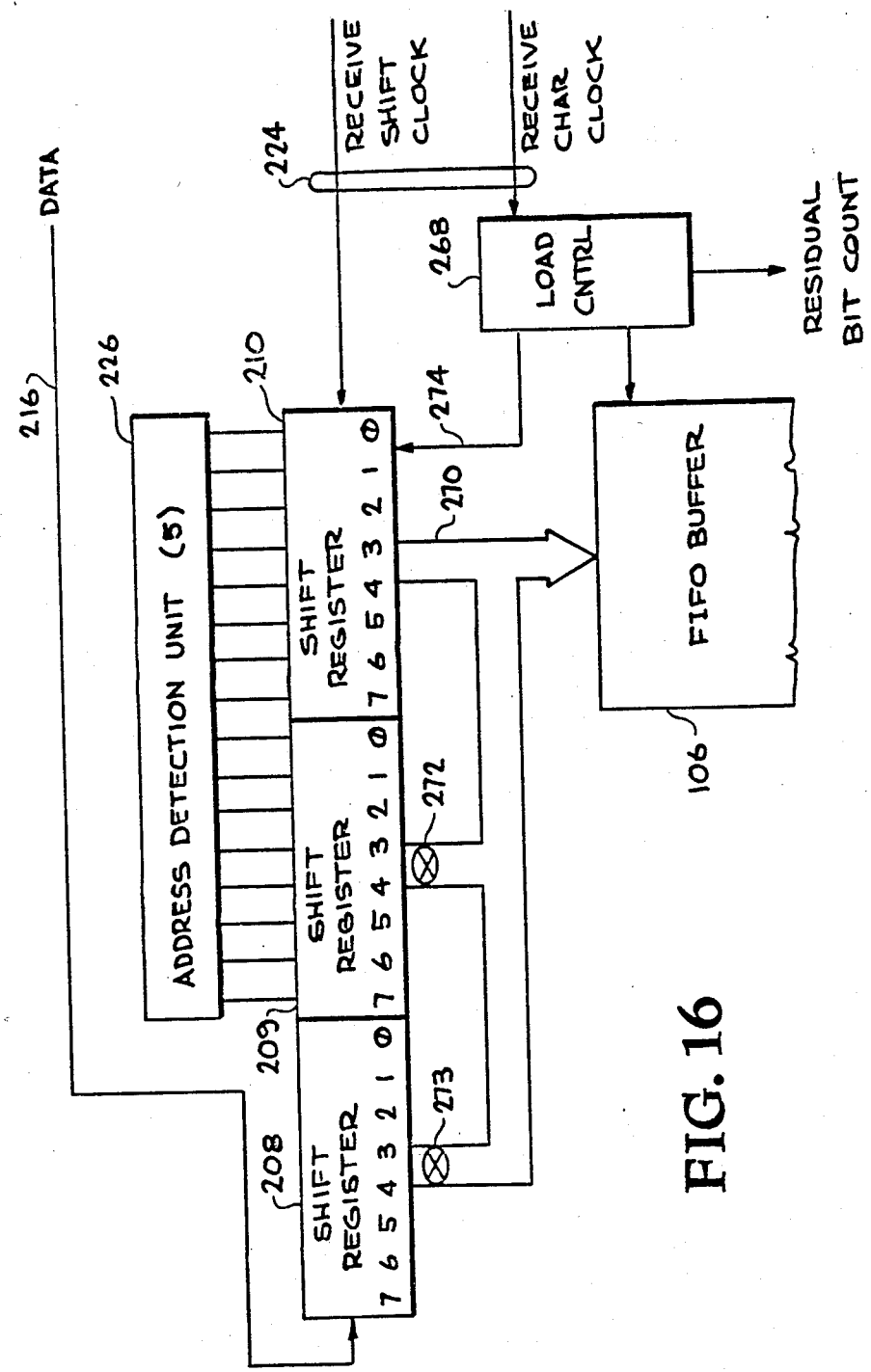
FIG. 16 is a block diagram of the Serial-to-Parallel Shift register 208 and 210 and related element of the DLC receiver 108.

FIG. 16 shows the interconnection of the Serial To Parallel Shift Registers 208, 209 and 210, the RECV FIFO 106, and the Address Detection Unit 226. The data stream, as modified by the Zero Bit Deletion Unit 252, is conducted to a 24-bit shift register comprising the 8-bit registers 208, 209 and 210 which converts the serial data stream into 8-bit bytes. The 16-bit contents of the shift registers 209 and 210 are presented in parallel to the Address Detection Unit 226 for comparison. For one byte addresses, only the first eight bits of the shift register (register 210) are compared. The contents of the shift registers are conducted in parallel to the Receive FIFO 106 a byte at a time. A LOAD CONTROL portion 268 of Serial to Parallel Shift Register 208, 209 and 210 generates the LOAD control signal that writes the data into the FIFO buffer 106.

Serial data is received on line 216 clocked into the shift registers 208, 209 and 210 on the rising edge of the Receive Shift Clock. The Receive shift clock is active only when data is to be shifted into the shift register. The shift registers 208, 209 and 210 have three output paths to the RECV FIFO 106. The first output path 270 moves the least significant byte (the one received first) to the RECV FIFO. All but the last bytes in a packet move over this path into the RECV FIFO. A second output path 272 and a third output path 273 are used to move the last bytes of the packet into the FIFO (including the last byte of the FCS if the FCS is present in the packet).

Load control 268 receives the RECV CHAR CLOCK signal generated by SBP 104 and generates load signals on liness 274 and 276 conducted to shift registers 208, 290 and 210, and RECV FIFO buffer 106, respectively. Load Control 268 also generates a residual bit count signal which is received by a Resideual Bit Control/Status Register (App. A). The movement of data from the shift registers 208, 209 and 210 to the RECV FIFO buffer 106 is enabled by the rising edge of the Receive Character Clock signal generated by divided-by-eight counter 258 of the Zero Bit Deletion Unit 252. Assuming that the packet's address matched, or address detection is disabled, (Reference App. A) the load takes place on the next synchronized edge of the clock received from microprocessor 18. If the top byte of the RECV FIFO buffer 106 is not empty at the time the load is to take place the load is delayed, and retried on each successive microprocessor 18 clock cycle. If the load does not take place prior to the receipt of the next RECEIVE SHIFT CLOCK, an Overrun error occurs.

When a Packet terminates with a Flag, an Abort, or a Long Frame Error, the last byte of the packet is moved to the RECV FIFO 106 directly. At the time that the closing Flag, for example, is detected, there are still two bytes of data in the shift registers 209 and 210 and residual bits (1 to 8), if any, are located in shift register 208, left-justified. At the time the closing flag is detected, the FCS is located in the first 16 bits of the shift registers 209 and 210. The residual bits (1 to 8) are located in the last eight bits of the shift register 208 (left justified). When the closing flag is detected, the following actions take place:

The residual bit count is saved in the Residual Bit Control/Status Register;

The data in the last eight bits of the shift register 208 is then shifted until the residual bit counter reaches eight;

If the FCS is not to be placed into the RECV FIFO 106, the contents of the last eight bits of the shift register 208 are loaded into the FIFO via path 273 and tagged as the last byte in the packet; and If the FCS is to be placed in the RECV FIFO 106, the last eight bits of the shift register are loaded into the FIFO via path 273, the two bytes of the FCS are moved into the FIFO via paths 270 and 272, and the last byte of the FCS is tagged.

Any packet that terminates with a Flag or an Abort before any data has been loaded into the FIFO, the contents of the Byte Counter are ZERO, as will be described hereinafter, and in this case no data is allowed to be placed into the RECV FIFO 106. The contents of the shift registers 208, 209 and 210 is simply ignored—it will be cleared out by the first 16 bits of the next packet.

The Address Detection Unit 226 is used to identify packets that are addressed to the receiver 108. Depending on programming via Status/Control Registers 212, the first one or two bytes of each received packet is compared against up to five Address Registers (four user programmable and one broadcast). If the incoming packet's address field matches one of the Address Registers, if enabled, the packet is received. If no match occurs the packet is discarded and the receiver reenters a looking for a Flag state. The states which the receiver can assume are described hereinafter in connection with FIG. 20.

Figure 17:
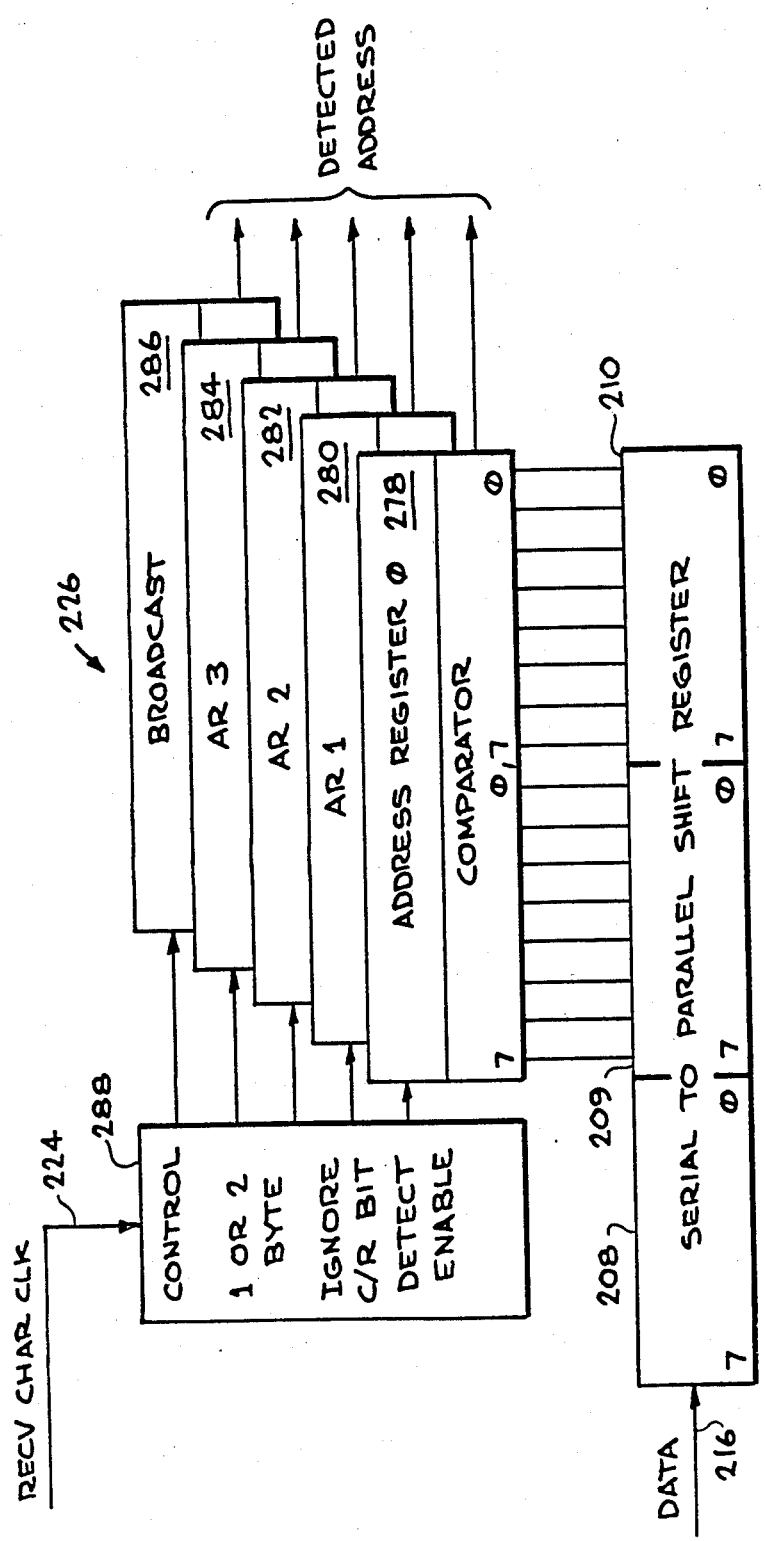
FIG. 17 is a block diagram of the address detection unit 226 of the DLC receiver 108.

The Address Detection Unit 226 is illustrated in FIG. 17 and includes five comparison units 278, 280, 282, 284 and 286. The first four comparison units 278–284 include a programmable 16-bit address register and a two-byte comparator. The last comparison unit 286 (broadcast) consists of register containing all ONEs and a two-byte comparator. A control element 288 receives the RECV CHAR CLK signal and is connected to an Address Control Register within element 212. Associated with each comparison unit is an enable bit that turns that particular recognition unit on or off. These bits reside in the Address Control Register (App. A). If all five enable bits are cleared (disabled) the receiver 108 will accept all packets. Bit 5 of the Address Control register selects whether the address is one or two bytes long. If one-byte addressing is selected, either the least significant eight bits of the sixteen bit Address Registers or the most-significant eight-bits, as selected by bit 7 of the Address Control Register, are used in the comparison. Also, bit 6 of the Address Control Register causes the second bit (bit 1) of the first byte of all addresses to be ignored. This is required since some BOPs use this bit position to indicate whether the packet is a command or a response (C/R). When this ignore C/R bit control bit is set, bit 1 of the first byte of all addresses is considered a don't care. Refer to App. A for a complete description of the Address Control Register.

Address comparison takes place when the Serial to Parallel Shift Registers 209 and 210 have received 16 bits following the Opening Flag. The identity of the particular comparator that makes the match with the incoming address is reported in bits 0–2 of the Interrupt Source Register described in App. A. This status is reported when the last byte of the packet is read from the RECV FIFO 106.

Figure 18:
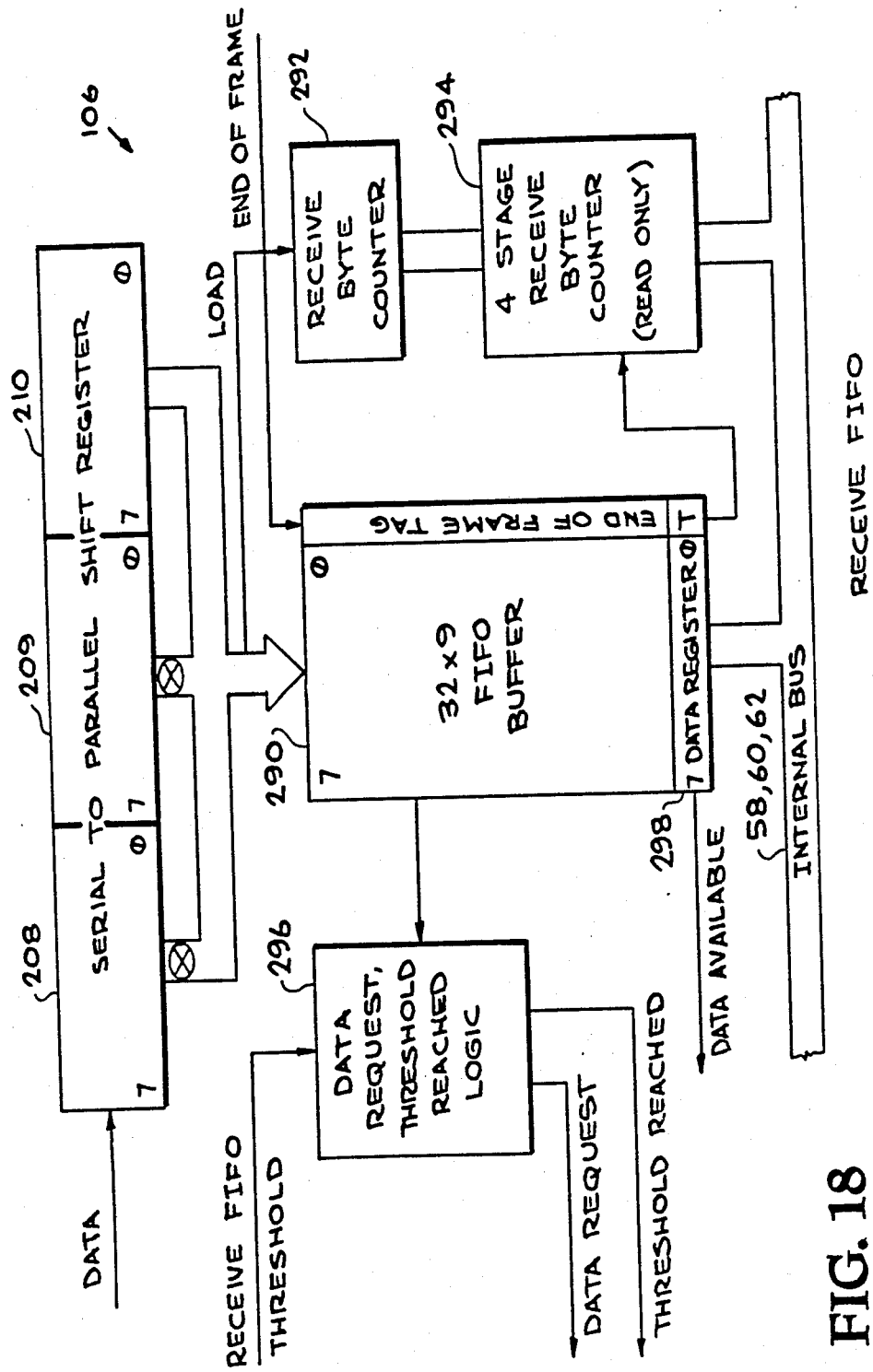
FIG. 18 illustrates the structure of the receive FIFO 106 within the DLC 52.

With reference to FIG. 18, the Receive FIFO 106 interconnects the Serial to Parallel Shift Registers 208, 209 and 210 and the Internal Busses 58, 60 and 62 and consists of a RECV FIFO buffer 290, a Receive Byte Counter 292, and a 4-stage Receive Byte Counter 294 and Data Request control logic 296.

The Receive Byte Counter 292 is a read/write register and is connected to the internal busses 58, 60 and 62 and receives a LOAD signal generated by the shift register load control 268.

The 4-stage Receive Byte Counter 294 is a read-only register and is connected to the internal busses 58, 60 and 62 and receives an END-OF-FRAME TAG signal from a data register portion 298 of FIFO buffer 290.

The END-OF-FRAME TAG signal is used by the 4-stage delayed status reporting mechanism employed by Receive Byte Counter 294 as will be explained hereinbelow in connection with FIG. 27.

The receive FIFO buffer 290 is a 32-byte deep buffer that is loaded at the "top" from the Serial to Parallel Shift Registers 208 and 210 and unloaded at the bottom via the Data Register 298 by the microprocessor 18 or DMA. (Refer to description of data movement given in connection with FIG. 16). Data is shifted down the buffer at the clock rate supplied by the microprocessor 18.

The presence of data in the Data Register 298 is indicated by the setting of the Data Available bit (bit 1) in FIFO Status Register (App. A) portion of Status and control registers 212. This bit is cleared when the Data Register 298 becomes empty and the location in FIFO buffer 290 directly above the Data Register 298 is empty.

When the receiver 108 terminates the receipt of a packet (normally or abnormally), and data from that packet has been placed in the receive FIFO buffer 290, the last byte of the packet is tagged when it is placed into the buffer. Each FIFO buffer 290 location contains a ninth bit to accommodate this tag. The presence of a tagged bit in the buffer 290 forces Data Request, described hreinafter, active.

Associated with the receive FIFO buffer 290 is the Data Request Control logic 296 which generates a Threshold Reached signal. The Data Request Control logic 296 receives a signal from the FIFO buffer 290 indicating the number of bytes stored in the buffer. This signal is active whenever the number of bytes of data in the buffer is equal to or greater than the threshold level programmably stored in a FIFO Threshold Register (App. A). When Threshold Reached is active, bit 0 in a Receive FIFO Status Register is set to 1. A maskable interrupt is generated when the Threshold Reached bit transitions from ZERO to ONE. The Threshold Reached signal is also used in the generation of Data Request to the DMA.

If the "top" location in the receive FIFO buffer 290 is full when the Serial To Parallel Shift Register load control 292 generates a load signal for a new byte of data, an Overrun condition occurs. This error is described in detail hereinafter.

Data Request Control logic 296 of the FIFO 190 generates a Data Request signal that controls the operation of the DMA (when used). Data Request signal being active informs the DMA that it should empty the FIFO buffer 290. Data Request signal goes active when the Threshold Reached signal becomes active, OR, a byte tagged as the end of a packet is present in the FIFO buffer 290. Data Request remains active until the buffer 290 becomes empty, OR, the tagged byte has been removed.

A 16-bit Receive Byte Counter 292 is provided in the receive FIFO 106 to maintain a count of the number of bytes that have been placed in the FIFO buffer 290 from the packet that is currently being received. When the last byte of the packet (tagged as such) is removed from the FIFO buffer 290 the contents of the Receive Byte counter 292 is conducted to a Receive Byte Count Register 294. This is a four stage register that delays the reporting of the byte count until the tagged byte is read from the FIFO 290—this delayed reporting operation is described in detail hereinafter. The Receive Byte Counter 292 is cleared when its contents are loaded into the Receive Byte Count Register 294.

The Receive Byte Count Register 294 reports the length of the receive packet to software. This read only register is connected to the Internal Busses 58, 60 and 62. A description of the delayed-reporting four stage register is given hereinafter in connection with FIG. 27.

Associated with the DLC 52 receiver 108 are several user visible registers. These registers, which are described in detail hereinafter are used to configure the receiver, instigate specific actions, report status, and generate interrupts. All of these registers can be accessed by the local processors; none of them can be accessed by an off-chip host processor. Appendix A contains a description of the varous DLC 52 registers.

Figure 19:
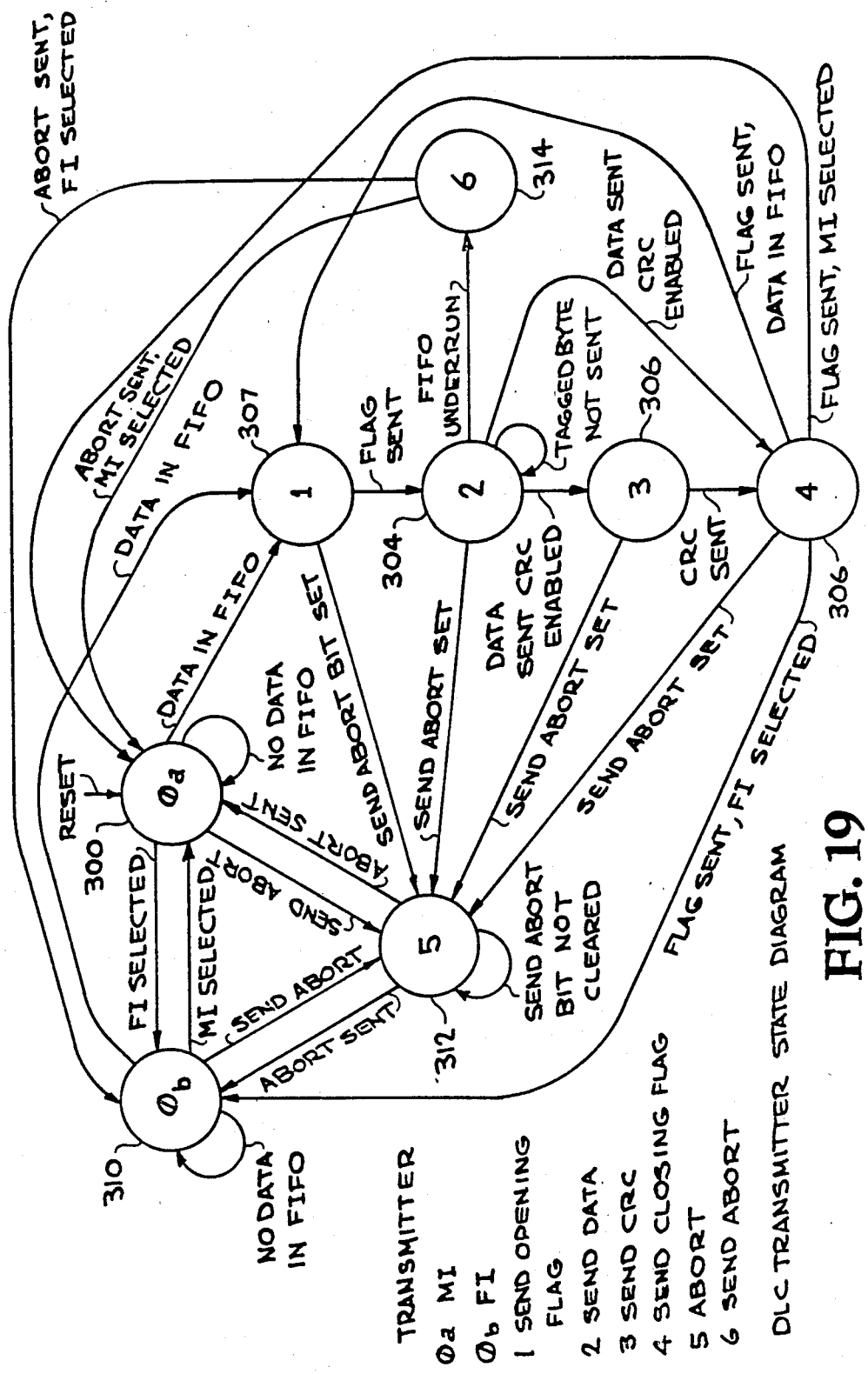
FIG. 19 is a state diagram of the operation of the DLC 52 transmitter 102 portion.

Briefly, normal operation of the transmit-side IDPC 10 will be described by reference to FIG. 19, a transmit-side state diagram. Following hardware Reset of the IDPC 10, or when the IDPC 10 is reset by the microprocessor 18 (bit 6 of the DLC Command/Control Register within block 112), the transmitter 102 of the DLC 52 is disabled, and is in state Oa—sending Mark Idle-denoted element 300 in FIG. 19.

The microprocessor 18 initializes the DLC transmitter 102 by setting bits within transmitter status/control registers 112, described in App. A, by selecting data inversion or non-inversion (bit 0 of the Serial Bus Port (SBP) Control Register, selecting the SBP channel configuration (bits 2-1 in the SBP Control Register), selecting whether CRC generation is to be used, and selecting either Flag or Mark Idle (bit 3 of the DLC Command-/Control Register, the default is Mark Idle).

The Transmit Byte Count Register 152 (App. A) is used to specify the length of the packet to be transmitted, excluding FCS bytes, and is only programmed when the packet length to be transmitted is different from the previous packet transmitted. Bytes are counted in the transmit byte counter 154 in the transmit FIFO 100 as they are placed into the transmit FIFO buffer 150. When the count equals the value programmed into the Transmit Byte Count register 152, that byte is tagged as the last non-FCS byte in the packet. Data inversion/non-inversion and SBP channel configuration do not affect the operational sequence of the transmitter. The Flag Idle/Mark Idle selection does affect the operational sequence and is described below.

After the DLC transmitter 102 is Reset (bit 6 of the DLC Command/Control Register, or hardware Reset), the transmitter goes to state 0a 300. The transmitter will remain in state 0 until data has been placed in the transmit FIFO 100, and the first byte of that data reaches the top of the FIFO. At that time the transmitter will go to state 1 (element 302).

With the transition of state 1 (302) the transmitter 102 is said to be "In-frame". In state 1 the transmitter 102 sends the Opening Flag. When this Flag has been sent state 2 (304) is entered.

While in state 2, data is unloaded from the transmit FIFO 150 into the eight bit Parallel to Serial Shift Register 110. Serial data is clocked out of the shift register, through the 2 to 1 multiplexer 116, and into the Zero Bit Insertion Unit 124. The data is then fed into the Serial Bus Port (SBP) 104 where it is optionally inverted, and transmitted to the data communications network. The transmitter leaves state 2 when the last byte of the packet up to the first FCS byte has been shifted out of the Parallel to Serial Shift Register 110.

If CRC generation has been selected (bit 5 of the DLC Command/Control Register) the transmitter will enter state 3 (306). If CRC generation is disabled, state 4 (308) is entered directly from state 2. In state 3 the inverted contents of the CRC generator 120 is fed to the Zero Bit Insertion Unit 124 following the original packet (now completed) data stream. The inversion of the CRC generator 120 output is required by the CRC algorithm. After the 16 bits of the FCS (inverted contents of the CRC generator) have been transmitted the Valid Packet Sent bit is set (bit 4 in the Interrupt Source Register) and State 4 (308) is entered. The Valid Packet Sent indication can generate a maskable interrupt.

While in state 4 one Flag character (the Closing Flag) is transmitted. The transmitter 102 will transition to either state 0a (300) 0b (310) or 1 (302 when the transmission of the Flag completes. If data is present in the transmit FIFO 100 (a new packet), state 1 is entered. If no data is present in the FIFO, state 0 is entered. The selection of the Flag Idle or Mark Idle inter-frame fill (bit 3 of the DLC Command/Control Register) selects between state 0a and 0b.

There are five exceptions to the normal flow of events described above: Abort, Local Loop Back, Remote Loop Back, transmitter disabled while In-frame, and FIFO Underrun. Of these only FIFO Underrun is an error condition.

The user can terminate the transmission of a packet by requesting that an Abort be sent (bit 0 of the DLC Command/Control Register). When a Send Abort request is received the transmitter enters state 5 (312) where the transmitter 102 will begin transmitting Abort characters (01111111 with 1 being the LSB). This action takes place on the next bit boundary after the Send Abort bit is set by software; the transmit FIFO 100 will be cleared. Abort characters will continue to be sent until this bit is cleared. The transmitter will go out of frame when transmission of the Abort begins. When the Send Abort bit is cleared the transmitter will enter state 0b if Flag idle is selected or data is present at the top of the FIFO (a new packet); state Oa is entered otherwise. In all cases at least one Abort character will be transmitted, even if the Send Abort bit is set and cleared by consecutive CPU instructions. (The Abort is used to tell the receiver on the other end of the link that the packet currently being received is to be terminated and discarded.) While sending an Abort has no meaning when the transmitter is out of frame (not sending a packet), the request will be honored. It will have no meaning at the receive end if the receiver is out of frame.

For test purposes the DLC can be placed in a Local Loop Back mode of operation (bit 3 of the SBP Control Register (App. A). In this mode the DLC transmitter 102 is disabled at the same point that the Transmit Enable bit (bit 1 of the Command/Control Register is implemented. The DLC receiver 108 is also disabled to prevent incoming data from interfering with the Loop Back. The transmitter is then connected to the receiver and the transmit clock is used as the timing reference for both the transmitter and the receiver. Packets can then be transmitted normally with the exception that nothing leaves the part. The receiver receives the packet just as if it were originating from outside the IDPC 10. See APP. A for loop-back operation.

Remote Loop Back, selected by setting bit 4 of the SBP Control Register, causes any activity on the SBIN input to the Receiver 108 to be echoed on the SBOUT output pin. The DLC transmitter 102 is disconnected from the SBOUT pin via transistor 204. When the SBP is operating in multiplexed channel mode each received bit (conditioned by SFS/XMITCLK) is transmitted on the next falling edge of the receive clock i.e., data received at the SBIN pin on the rising edge of SCLK is clocked out of the SBOUT pin by the subsequent flling edge of SCLK. When the SBP 104 is operating in the non-multiplexed mode, data bits received via SBIN (clocked in by the positive going edge of the receiver clock [SCLK]) is clocked ou on a bit by bit basis using the negative edge of the same clock (SCLK). The DLC receiver 108 can still receive data while in this state.

If an attempt is made to use the DLC transmitter 102 while in Remote Loop Back mode, the transmitter will function normally, but no data will leave the IDPC 10.

DLC Transmitter 102 is disabled while In-Frame. The transmitter will continue to process the frame normally, and will disable the SBOUT pin as soon as the Closing Flag has been sent. Once the Closing Flag is transmitted, the transmitter returns the transmitter to state 0 and disconnects the SBOUT pin via transistor 204 (places it in an open drain condition with no ability to be driven low).

A FIFO Underrun occurs when the transmitter attempts to unload a byte of data from an empty transmit FIFO 100 while in frame. This condition is reported via bit 4 of the FIFO Status Register (App. A) and a maskable interrupt is generated. This causes the FIFO Status Register bit to be sent in the Interrupt Source Register (App. A) (if the Underrun interrupt has been enabled in the FIFO Status Interrupt Enable Register). When the FIFO Underrun is detected the DLC transmitter 102 enters state 6 (314) where one Abort character (01111111) is transmitted and the transmitter reenters state 0.

Briefly, normal DLC receiver 108 operation will be described by reference to FIG. 20, a receive-side state diagram. Following hardware Reset of the IDPC 10 or when 14 is reset by software (bit 6 of the DLC Command/Control Register), the DLC receiver 108 is disabled and is in a state 0 (316 in FIG. 20).

When the receiver 108 is disabled (by clearing bit 2 of the DLC Command/Control Register), the connection between the SBIN pin and the receiver is severed via transistor 234. This is the only effect that disabling the receiver has on the remainder of the DLC 52. All other receiver functions work in the same manner as they do when the receiver is on.

The user, via software running on the microprocessor 18, initializes the DLC receiver 108 by: selecting data inversion/non-inversion (bit 0 of the SBP Control Register (App. A)), specifying SBP channel configuration (bits 1 and 2, of the SBP Control Register), enabling CRC check if desired (bit 4 in the DLC Command/Control Register (App. A)), selecting the desired address mode (Address Control Register (App. A)), loading the address(es) to be recognized (Address Register(s)), specifying the minimum packet size Minimum Packet Size Register 264 (App. A)), specifying the maximum packet size (Maximum Packet Size Register (App. A)), and finally enabling the receiver 108 (bit 2 in the DLC Command/Control Register.

The DLC receiver 108 starts operation in state 0 (316). In state 0 the receiver examines the incoming data stream (clocked in from the SBIN pin on the rising edge of SCLK (SCLK pin]) on a bit by bit basis for the presence of a Flag character. No data is passed beyond the Flag/Abort detection unit 214 in state 0. The detection of a Flag causes a transition to a state 1 (318).

In state 1 the data stream is inspected on a character by character basis for the presence of a non-Flag, non-Abort character (character boundaries are established by the receipt of a Flag). If the character following the Flag is another Flag, the receiver remains in state 1. If the character is an Abort, the receiver reenters state 0. If the character is not a Flag or an abort, the receiver is said to be In-frame, and a state 2 (320) is entered.

In state 2 data is passed beyond the Flag/Abort detector 214 to the Zero Bit Deletion Unit 218. Here, the next bit following any five contiguous ONEs is deleted (this bit should always be a ZERO, and was inserted by the transmitter to prevent data patterns from being detected as Flag or Abort characters—which have six and seven contiguous ONE bits respectively). The first one or two characters following the Opening Flag of the packet are normally the address field (while the addrress field can be more than two bytes long, the receiver can examine only the first two bytes of any address—any remaining bytes are treated as data). If address recognition is enabled (bits 0-4 of the Address Control Register), these characters are tested by the address detection unit 226 for a match with one of the five enabled preprogrammed addresses (four programmable addresses and the Broadcast Address). If there is not a match, the DLC receiver 108 returns to state 0 (looking for Flags). The packet currently being transmitted is ignored and no status is reported on it. If, however, there was an address match (or address detection was disabled, in which case all frames are accepted), the frame is received and is placed into the receive FIFO 106, one byte at a time (including the Address, Control, Information, and FCS fields). Each received character is loaded into the receive FIFO 108 when it reaches the last eight bits of the 16 bit long Serial to Parallel Shift Register 208, 210 (with the exception of the last character, discussed below).

State 2 is exited normally whenever the Flag/Abort detector 214 receives a Flag character. If a Flag is detected the receiver enters state 1. (Back to back packets can share Opening and Closing Flags.) At the time the Flag is detected, the two previous characters still in the 16 bit long Serial-To-Parallel Shift Register 208, 210 are immediately loaded into the receive FIFO 106 and the second of these two bytes is tagged as the last character in the packet. The tag makes the form of a ninth bit appended to each word in the FIFO. If CRC checking has been enabled (the output of the CRC comparator 222 is valid at this time), and its status (error or not) is recorded. These last two characters loaded into the receive FIFO 106 are the Frame Check Sequence (FCS) if CRC check is enabled.

When a packet has been received with either a Closing Flag, an Abort, or a Long Frame Error, its length and status are latched. This information is presented to the user when the last byte of the packet (tagged as such) is read from the receive FIFO 106 (by DMA or programmed I/O). An interrupt (maskable) indicating the receipt of a packet, and its status, are generated at this time. The delay in status reporting is required since the user's software operates at a packet level and has not received the complete packet until the last byte has been moved from the receive FIFO 106 to memory 22. In normal operation the receive FIFO 106 is automatically unloaded by the DMA and the user is not interested in the status of a packet until it has been completely transferred to memory.

During the course of normal operation six error or exception conditions can occurs. These are: the receipt of an Abort character while In-frame, a CRC Error, a Short Frame Error, a Long Frame Error, a Non-Integer Number of Bytes Error and a FIFO Overrun Error. In addition to these six cases, the DLC receiver 108 can be placed in two test modes: Local Loop Back and Remote Loop Back.

When an Abort is received while the receiver is In-frame (state 2), the packet is terminated. The Abort takes precedence over all receive errors. As a result of this termination several actions are taken: the contents of the 16 bit shift register 208, 210 is moved to the receive FIFO 106. The last byte is tagged as such as it is placed into the FIFO; the DLC receiver 108 returns to state 0; The status, including the Abort Received bit in the Receive Link Status Register (App. A) and byte count are latched; and when the last byte of the aborted packet is read from the receive FIFO 106, a maskable interrupt is generated.

When the Closing Flag of a packet is detected, the CRC Checker 222 has finished its work. If CRC checking is enabled (bit 4 in the DLC Command/Control Register), the output of the CRC checker is tested at this time. If an error has occurred, this error condition is latched for delayed reporting.

When a packet is terminated (with a Flag) that has fewer characters (exclusive of Flags) than is programmed into the Minimum Receive Packet Size Register, and more than 16 bits, a Short Frame Error is reported. If the packet had 16 or fewer bits it is discarded without notification to the user. This is possible since no data has been placed into the receive FIFO 106 at this time. If the Short Frame contained more than 16 bits, it is terminated the same way that a normal packet is, with the exception that the Short Frame Error is latched for delayed reporting. The receiver 108 returns to state 1.

The DLC receiver 108 contains a Maximum Receive Packet Size Register (App. A) within block 212 which is programmed to specify the maximum acceptable packet length. If the number of bytes received equals this count and a Flag or an Abort is not detected at this time, a Long Frame Error exists and the packet is terminated. This termination is the same as for a normal frame with the exception that the Long Frame Error status condition is latched for delayed reporting.

If a flag is detected on a non-byte boundary (when from 1 to 7 bits of a character have been received), a Non-Integer Number of Bytes Error exists. The packet is terminated as normal with the exception that the short character is loaded into the receive FIFO 106 as is (it is tagged as the last byte), and the Non-Integer Number of Bytes Error status is latched for delayed reporting Note that in an alternative embodiment of the IDPC 10, the DLC can receive and transmit packets containing a non-integral number of bytes.

When a byte has been shifted into the last 8 bit positions of the 16 bit shift register 208, 210 it is moved into the receive FIFO 106. There is one bit time for this operation to take place. If the top location in the receive FIFO buffer 106 is full when this load is attempted, the load is blocked. If the top location in the buffer does not become empty before the next bit is to be shifted into the shift register, a FIFO Overrun condition exists. When this happens the packet is terminated, the last byte in the FIFO is tagged as the last byte in the packet, status is latched—including the Overrun condition indicator—for delayed reporting, and the receive returns to state 0 (if a Flag is detected at the same time as the Overrun then state 1 is entered).

For test purposes the output of the DLC transmitter 102 can be Looped Back to the receiver 108. This mode is selected by setting bit 3 in the SBP Control Register (App. A). When in the Local Loop Back mode, the receiver is isolated from its input (SBIN pin) via transistor 234.

For test purposes the input of the DLC receiver 108 can be fed directly to the output pin of the transmitter (SBOUT). This mode is entered when bit 4 of the SBP Control Register is set. The operation of the receiver is unaffected by this action.

Figure 21:
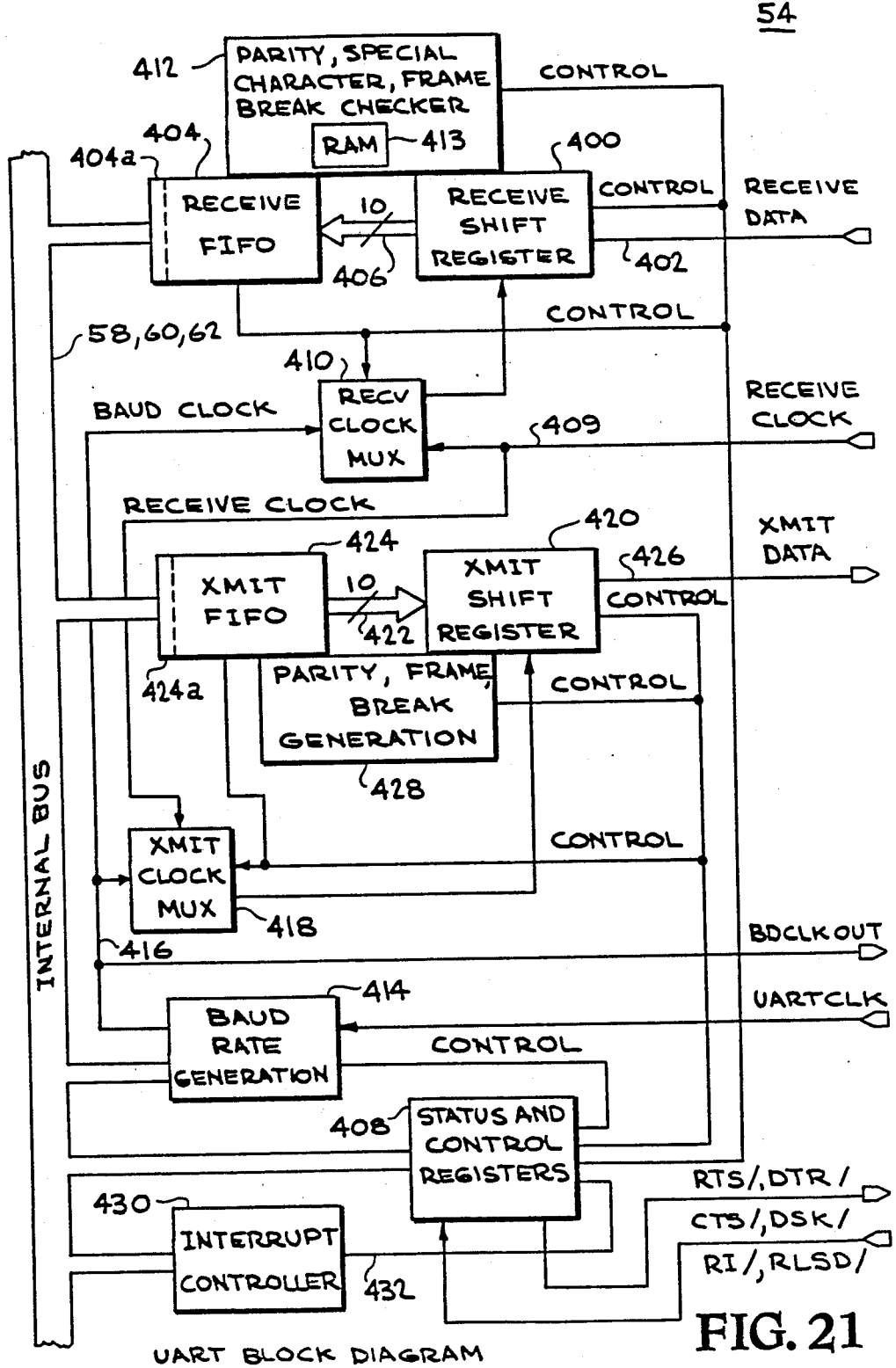
FIG. 21 is a functional block diagram of the UART 54 employed in the IDPC 10 of the present invention.

FIG. 21 is a functional block diagram of the UART 54 portion of the IDPC 10 of the present invention. The UART 54 of the instant invention is compatible with the industry standard 8250 UART as described at pages 357-371 of "Communications Products Handbook" published by Western Digital Corporation, copyright 1984, which description is hereby incorporated herein, and, in addition, provides operation in a synchronous mode as well as an asynchronous mode. The UART 54 also includes a Special Character Recognition Unit and transmit and receive first-in, first-out (FIFO) registers.

As shown in FIG. 21, UART 54 includes a 10-bit receive serial-to-parallel shift register 400 connected via a signal line to a Receive Data input terminal of the IDPC 10. Receive shift Register 400 is connected to a Receive FIFO 404 via a bus 406. Data signals are received by register 400 and transferred to FIFO 404 under control of signals received from a UART control 408 which includes a set of Status and Control Registers. Receive Shift Register 400 and Receive FIFO 404 are connected to Control 408. Receive FIFO 404 contains a receive FIFO data register 404a located at the "top" of receive FIFO 404, i.e., that portion of FIFO 404 connected to busses 58, 60 and 62.

A Parity, Special Character, Frame, Break Checker 412 is connected to Receive Shift Register 400, Receive FIFO 404 and to UART control 408. Parity, Special Character, Frame, Break Checker 412 includes a random access memory 413, as will be described in greater detail herinafter in connection with FIG. 22.

A receive multiplexer 410 connected to UART control 408 receives Receive Clock signals on a signal line 409 connected to an input terminal of the IDPC 10. The receive clock MUX 410 has an output terminal connected to Receive Shift Register 400. A Baud Clock signal generated by a Baud Rate Generation Unit 414 is conducted on a signal line 416 to a second input terminal of receive Clock MUX 410, as well as to a first input of a transmit clock MUX 418, also receiving the Receive Clock via signal line 409 and connected to UART control 408. The output terminal of tansmit clock MUX 418 is connected to a transmit (XMIT) parallel-to-serial shift register 420.

The XMIT shift register 420 receives signals via a bus 422 from a transmit (XMIT) FIFO 424 which, in turn, is connected to the busses 58, 60 and 62. The XMIT shift register 420 is connected to UART control 408, as is the XMIT FIFO 424, and XMIT parallel-to-serial shift register generates signals conducted on a signal line 426 to a XMIT Data terminal of the IDPC 10.

Transmit FIFO 424 contains a transmit FIFO data register 424a located at the bottom of Transmit FIFO 424, i.e., that portion of FIFO 424 connected to busses 58, 60 and 62.

A parity, Frame, Break Generation Unit 428 is connected to UART control 408 and to XMIT shift register 420 and XMIT FIFO 424.

A UART Interrupt controller 430 is connected to busses 50, 60 and 62 and generates signals to UART control 408 via a signal line 432. UART control 408 receives clear to send (CTS/), data set ready (DSR/), ring indicator (RI/), and received line signal detect (RLSD/) signals conducted from an input terminal of the IDPC 10 and generates return to send (RTS) and data terminal ready (DTR) signals conducted to an output terminal of the IDPC 10.

The clocks used to transmit and receive data by UART 54 come from one of two sources: the receive clock (RXCLK) input in, or the baud rate generator 414. Clock selection is made via bits 0 and 1 in a UART Control Register within Status and Control register block 408. Appendix B contains a complete description of the registers within UART block 408. As with the DLC Status/Control Registers, various status and control signals are conducted between these registers and the UART elements shown in FIG. 21, not shown.

The baud rate generator 414 is a programmable divider that receives a signal via line 414 applied to the UARTCLK pin. Generator 414 provides a Baud clock, to the UART receiver and transmitter sections. The input clock received on signal line 414 is divided down by a programmable 16 bit (1-65536) Divider. The programmable divider is configured by loading the Divisor Latch LSB and Divisor Latch MSB Registers (App. B). These registers are accessed by setting the Divisor Latch Access Bit (DLAB), bit 7 in the Line Control Register (App. B) of control 408, and then writing the UART addresses 0 and 1 (these are the DATA Registers and Interrupt Enable Register addresses when the DLAB bit is cleared).

In the asynchronous mode the baud rate generator 414 is similarly programmed to a value 16 times the receive clock rate.

The sources of the transmitter and receiver clocks are independently selectable via receive clock MUX 410 and transmit clock MUX 418, respectively. For example: When bit 0 is set in the UART Control Register, the receiver clock MUX 410 selects the output of the baud rate generator 414 for its clock. When bit 0 is cleared, the RXCLK input is used. The same options apply for the transmitter clock MUX 418 except that in this case bit 1 in the UART Control Register (App. B) specifies the clock source.

The UART 54 has two primary modes of operation: asynchronous and synchronous.

In the asynchronous mode the receive and transmit shift registers 400 and 420 are clocked at a rate that is 16 times the baud rate. Asynchronous operation is selectable via microprocessor 18 by clearing bit 2 of the UART Control Register (App. B) of Control 408 to ZERO. As described above, the source of the clock can be either the internal baud rate generator 414 or an external input (receive clock input, RXCLK). Receive clock selection is determined by bit 0 of the UART Control Register, transmit clock selection by bit 1 of the UART Control Register.

In synchronous operation the receive shift register 400 is clocked at the same rate as the data. This means that the data and clock must be in synchronization with each other. Data is latched into the receive shift register 400 on the rising edge of the clock. Synchronous mode is selected by setting bit 2 of the UART Control Register.

The clock used by the transmit shift register 420 is also the data rate. Data is shifted out of the shift register 420 on the falling edge of the clock. The transmit clock can be provided by either the baud rate generator 414 or the external receive clock input (RXCLK).

Data is transmitted as a steady stream of bits with no framing (start and stop bits) involved. When the transmit shift register 420 is loaded, its contents are transmitted directly. The next data byte is concatenated onto the previous one. When the shift register 420 and FIFO 424 are empty the line is placed in a Marking (ONEs) condition.

Data is received on line 402 as a steady stream of bits with no framing involved, and therefore no character boundaries. As eight bits are received into the received shift register 400, they are loaded into the Receive FIFO 404. When the line 402 is idle (Marking), the receive shift register 400 is receiving (and moving to the FIFO) bytes containing all ONEs. This mode is useful in low speed synchronous applications since the end to end line—IDPC 10 UART, to ISDN, to IDPC UART—appears as a piece of wire to the two end users. Data is sampled and transferred as long as receive clock pulses are received.

The receive shift register 400 is used to convert incoming serial data into parallel characters. The serial data is clocked into the shift register by the data sample strobe signal on line 416 in asynchronous mode and the rising edge of the receive clock on line 412 in synchronous mode as selected by clock MUX 410.

Asynchronous operation—The data sample strobe signal is generated by Baud Rate Generator 414 in the following manner: Whenever the UART receiver is not receiving a character, the rising edge of the 16X clock is used to sample the receive data (RXD) input signal on line 402. If RXD has transitioned from high to low since the last rising edge of the 16X clock, a potential start bit has been detected. If the RXD signal line 402 remains low for at least three clock cycles, the start bit is assumed to be valid; if not, it is ignored. Assuming the start bit was determined to be valid, the eighth rising clock edge after the high to low transition of the RXD signal (beginning of the start bit) is used to synchronize a divide by 16 counter within Baud Rate Generator 414 that divides the 16X receive clock down to form the data sample strobe (Baud Clock) signal. The RXD signal on line 402 is then sampled by the Baud Clock once for each bit in the character to be received.

The receive shift register 400 is ten bits long permitting up to eight data bits, one parity bit, and the start bit. When the previous character is moved from the shift register 400 to the FIFO 404, or at Reset, the shift register 400 is loaded with all ONEs. Data is shifted into the shift register start bit first (the start bit is a ZERO). When the start bit reaches the end of the shift register (bit position ten transitions from a high to a low) the character has been completely received. Note that for characters of less than eight bits (or an eight bit character without parity), the data is loaded into the shift register at a bit position that is closer to the low order bit position such that the start bit will wind up in the last bit position at the end of the character. This technqiue aliminates the need for a counter to keep track of the number of bits received.

If the RXD signal is sampled low on the next bit time after the last bit of a character is received, a framing error exists, and is reported via bit 3 of the Line Status Register. The character with the framing error is not loaded into the FIFO 404.

When the UART 54 receives characters containing less than eight data bits, the additional high order bits in the 8 bit byte that is to be loaded into the receive FIFO ar set to ZERO.

Synchronous operation—In synchronous mode the RXD input signal is sampled on every rising edge of the 1X receive clock received on signal line 409. Data is shifted into the receive shift register 400 on every clock cycle. In this mode there are no start or stop bits. One byte of data is received and loaded into the receive FIFO 404 every eight bit times.

Received data is loaded into a four byte deep receive FIFO 404. Receive FIFO 404 is preferably of the "bubble up" type. An interrupt condition flag is set in the Interrupt Identification Register (bits 1–3) when the number of characters in the FIFO has reached the level designated in the receive FIFO threshold field of the UART Control Register (bits 3 and 4). Bit 3 in the UART Status Register is set when the receive FIFO 404 threshold is reached, and cleared when the FIFO 404 level falls back below the threshold. A timeout is generated internally if the number of characters received is less than the FIFO threshold level (0), and no characters have been received for 1600 baud clock cycles in the asynchronous mode, and 100 clock cycles in the synchronous mode (approximately ten character times). The timeout sets bit 0 in the UART Status Register and generates a maskable interrupt.

Data is read out of the FIFO, from a Receive FIFO Data Register 404a connected to busses 58, 60 and 62 by the microprocessor 18. The presence of valid data in the Receive FIFO Data Register 404a is indicated by (Receive Data Available) bit 0 in the Line Status Register.

If the receive FIFO 404 is full when a newly received character is to be loaded into the FIFO, an Overrun Error is reported via bit 1 in the Line Status Register.

With reference to FIG. 22, a parity checker 412a and RAM 413 portion of parity, special character, frame, Break Checker 412 is shown connected to the receive FIFO 404 which is ten bits wide, eight data bits, one special character flag, and one parity error flag. Parity, framing, and special character conditions are checked by element 412 when data is loaded into the FIFO 404. In particular, the presence of a character that has a parity error is reported by parity checker portion 412a, or is a special character is reported by comparison with RAM 413, in the Line Status Register. The parity error flag and the special character flag are set accordingly. Interrupts (if enabled) are generated when either condition is detected. Only the data bits can be read by the user. While Special Character and Parity Error interrupts are generated when the character is loaded into the receive FIFO 404, the Parity Error present and Special Character Available status bits (in the UART Status Register) are not set until the character is at the FIFO output 404a. This allows the user to identify which character caused the interrupt.

When the UART 54 is programmed to receive characters with fewer than eight bits, the unused bit positions are filled with ZEROs as the character is placed into the receive FIFO 404.

Special Character Recognition is performed within element 412 connected to receive shift register 400 and receive FIFO 404. When a valid character has been received by shift register 400, the lower seven bits of its bit pattern are used as a pointer into the 128 bit deep RAM 413. Bits in the 128 bit RAM 413 are set and cleared by the microprocessor 18. If the RAM bit addressed by the data is set (1), the character is flagged as "special" by the setting of bit 7 in the Line Status Register. This test is performed when the character is loaded into the receive FIFO 404. An interrupt is generated only if the special character enable bit is set (bit 5 in the Interrupt Enable Register). The special character received bit is used to identify the presence of an interrupting condition. A second bit, bit 2 in the UART Status Register, is used to identify which character in the FIFO is special. This bit is not set until the character is at the output of the FIFO.

The special character recognition unit 412 uses the received characters as addresses into a 128 bit RAM 4B. The 128 bit RAM is orgnized as 128×1, as seen by the special character detector, and as a 16×8 array as seen by the user. RAM 413 is loaded by the user by writing to one or more of the 16 registers. The first register, located at relative address 9, contains the first eight bits of the 128 bit map. Bit 0 in the map corresponds to bit 0 in the first register. Bits 15-8 are located in the second register (address 10) and so forth. The default value at Reset is all ZEROs.

Parity is checked by parity checker element 412a on all received characters as they are loaded into the receive FIFO 404. If a violation has occurred, and parity is enabled (bit 3 of the Line Control Register (App. B)), the parity error bit is set (bit 2 of the Line Status Register (App. B)). If the receiver line status interrupt is enabled (bit 2 of the Interrupt Enable Register (App. B)), an interrupt will be generated. A second status bit, bit 1 in the UART Status Register (App. B), is set when the character containing the parity error reaches the output of the receive FIFO 404. This allows the user to identify which character in the FIFO 404 contains the error. The selection of even or odd parity is made via bit 4 of the Line Control Register. The UART 54 can be placed in a test mode that forces the parity bit to be generated and then detected in the state opposite the programmed state (even or odd). This stick parity mode is invoked by setting bit 5 in the Line Control Register.

Frame errors are detected by element 412. Framing is valid only in the asynchronous mode of operation. Framing is not checked in the synchronous mode.

Bit 3 of the Line Status Register is set if the received character does not have a valid stop bit, and is not a break condition. An interrupt is generated if the line status interrupt enable bit is set (bit 2 of the Interrupt Enable Register).

Break Detection is performed within element 412. Break detection is valid only in asynchronous mode. Break detection does not take place in synchronous mode.

Bit 4 in the Line Status Register is set if the receive data input is held spacing (0) for more than a full character time (start bit+data bits+parity bit+stop bits). The Receive Line Status interrupt must be enabled for an interrupt to be generated.

Data that has been transferred into the transmit FIFO 424 by the microprocessor 18 via busses 58, 60 and 62 is loaded into the parallel-to-serial transmit shift register 420 and shifted out synchronized by the transmit clocked selected by transmit clock MUX 418. Parity can be generated and appended to the data. The character length and number of stop bits are programmable via microprocessor 18. Break indications can be generated by the UART transmitter.

The shift register clock applied to transmit shift register 420 can come from either the baud rate generator 414 or the receive clock received from the input pin as selected by transmit clock MUX 418. Clock source selection is made via the transmit clock selection (bit q) in the UART Control Register. The input source for the shift register clock is 16 times the data rate in asynchronous mode, and 1 times the data rate in synchronous mode. Synchronous operation is selected via bit 2 of the UART Control Register). In Asynchronous Mode (only) the transmit logic automatically divides the clock by 16. Data is shifted out of shift register 420 on the falling edge of the clock.

Bit 6 of the Line Status Register is set when the transmit FIFO 424 is empty and the last bit has been shifted out of the shift register 420. An interrupt can be generated by this condition.

Data to be transmitted by UART 54 is loaded into the transmit FIFO 424 by the microprocessor 18. As the transmit shift register 420 becomes empty it is reloaded from the FIFO 424. When the number of bytes in the FIFO 424 is equal to or less than a programmable threshold, the Transmit FIFO Threshold Reached Bit (5) is set in the Line Status Register (App. B). An interrupt is generated (if enabled) when the FIFO level FALLS TO the programmed threshold level (the transition causes the interrupt, not the level in the FIFO being at or below the threshold). The threshold is programmed via bits 5 and 6 of the UART Control Register. Parity, if selected, is generated by element 428 connected to XMIT FIFO 424 and XMIT Shift Register 420 as the data is moved from the FIFO to the shift register.

Frame generation by element 428 takes place only in the asynchronous mode of operation. The number of stop bits and character length are programmed into the UART transmitter. These parameters also hold for the receiver. The number of stop bits is programmed in the Line Control Register bit 2. The character length is programmed by bits 0 and 1 of the Line Control Register.

Break Generation is also performed by element 428. Under control of the microprocessor 18, the UART 54 will transmit an all ZEROs "Break" pattern until the Break bit is reset by the microprocessor 18. The Break request bit is bit 6 in the Line Control Register. The UART 54 will wait until any character currently being transmitted is complete before transmitting a break. (A minimum of ten contiguous ZERO bits will always be sent when a break is requested.) The UART transmitter will return HIGH for at least one bit time following the transmission of a break before a new character will be sent. This allows the start bit of the new character to be detected. Break generation causes the transmit FIFO 424 to be cleared.

The UART control until 408 provides handshake signals for use in controlling communications between the IDPC 10 and an external terminal. These signals are: RTS/, CTS/, DSR/, and DTR/. RTS/ and DTR/ are outputs to the terminal. They are controlled by the CPU bia bits 1 and 0 in the Modem Control Register (App. B), respectively. CTS/ and DSR/ are inputs from the terminal. Their status can be read at Modem Status Register bits 4 and 5, respectively. The CTS/ and DSR/ inputs generate a modem status interrupt if they have changed since the Modem Status Register was last read. This interrupt is enabled via Interrupt Enable Register bit 3. The Delta CTS and Delta DSR bits in the Modem Status Register (0,1) reflect the fact that the status of CTS/ or DSR/ has changed since the Modem Status Register was last read. Reading the register clears these bits.

The UART 54 has four handshake lines in addition to the lines used by the IDPC. These are Ring Indicate, (RI/), Receive Line Signal Detect (RLSD/), Output 1, and Output 2. RI/ and RLSD/ are inputs to the UART. Their status is reported by bits 6 and 7 of the Modem Status Register, respectively. An interrupt is generated by the detection of the trailing edge of RI/ (RI/ going inactive-high). This is reported via bit 2 in the Modem Status Register. An interrupt is generated if RLSD/ changes since the Modem Status Register was last read. This Delta RLSD/ indication is reported via bit 3 in the Modem Status Register. The Output 1 and 2 signals are general purose outputs. They are controlled by setting and clearing bits 2 and 3 in the Modem Control Register, respectively.

With reference again to FIG. 2, a dual-port timing controller (DPTC) 56 is illustrated connected to the MPI 50 via a control line 57 and to the IDPC internal busses 58, 60 and 62. Also shown in FIG. 2 connected to DPTC 56 are signal lines conducting signals to and from external terminal pins of the IDPC 10. These include bus arbitration control terminals: a local processor bus request (LREQ/) input terminal, a local data transmit/Receive (LDT-R/) input terminal, a local ready (LRDY) output terminal, a host processor bus request (HREQ) input terminal, a host data transmit/receive (HDT-R) input terminal, a host ready (HRDY) output terminal, a host interrupt in (HINTIN) input terminal, a host interrupt acknowledge (HINTACK) input terminal, a host interrupt out (HINTOUT) output terminal, a local interrupt out (LINTOUT) output terminal. Also a set of four host port (HPORT) control output lines, a set of three RAM control output lines and four local port (LPORT) control output lines. The HPORT lines include a Host Data Latch Enable (HDLE) output line, a host data bus enable (HDBE/) output line, a host address bus enable (HABE/) output line, and a host data laach output enable (HDLOE/) output line. The RAM control lines include a RAM Chip Select (RAMCS/) output line, a RAM write enable (RAMWE/) output line and a RAM Output enable (RAMOE/) output line. The LPORT output lines include a local address bus enable (LABE/) output line, a local data abus enable (LDBE/) output line, a local data latch enable (LDLE) output line and a local data latch output enable (LDLOE/) output line.

The signals on the various lines connected to the DPTC56 are now described more completely.

The input pin is used as the direction control for the DPTC 56 portion of the IDPC when the local processor 18 is accessing a shared RAM to be describe hereinafter in connection with FIG. 23. When this pin goes high it indictes that a write cycle to the shared RAM is in progress. As a result of LDT-R/ going high, RAMWE/ and LDBE/ are driven active (low). When LDT-R goes low it indicates that a read cycle from the RAM is in progress. At this time RAMOE/, LDLE/ and LDLOE/ are driven active low. LDT-R is returned to the inactive state on the next falling edge of CLK.

HDT-R/ functions identically to LDT-R except that it is the direction control supplied when a remote host is accessing the shared RAM.

The LREQ/ is an active low input to the IDPC from the local processor 18 requesting access to the shared RAM. LREQ/ is sampled on the negative edge of every IDPC clock cycle. LREQ/ is normally active for two IDPC clock cycles. When sampled active, LREQ/ drives RAMCS/ and LABE/ active (low). LREQ/ is to be synchronous to the clock.

The HREQ signal functions identically to LREQ/ except that it comes from a remote host processor requesting access to the shared RAM and it is active high. HREQ is an asynchronous input with respect to the IDPC clock.

LRDY is an active high output from the IDPC 10 used by the local processor 18 to complete shared RAM memory cycle. LRDY is normally high. It is driven low when request for the shared RAM is received from the local processor 18(LREQ/) and the host processor is currently accessing the shared RAM.

The HRDY signal performs the same functions as the LRDY except that it is used by the host processor.

When activated LINTOUT signal intended to generate an interrupt to the local processor 18. LINTOUT goes active (high) as a result of bit 1 in a Semaphore Register being set to a 1. LINOUT is returned to the inactive state when bit 1 of the Semaphore Register is cleared to 0.

The HINTOUT pin functions similar to the LINTOUT pin but it is intended to interrupt the host processor. HINTOUT is activated by the local processor 18 writing a done into bit 0 of the Semaphore Register. HINTOUT is intended to be connected to an interrupt input on the host processor. HINTOUT is deactivated by the host pulsing the HINTACK pin which clears bit 0 of the Semaphore Register and deactivates HINTOUT.

The HINTIN is an active high input used by the host processor to generate an interrupt to the local processor 18 (LINTOUT). When HINTIN goes active it causes bit 1 of the Semaphore Register to be set to one which in turn generates LINTOUT out. This mechanism is necessary because the host cannot read/write the Semaphore Register.

The HINTACK active high input to the IDPC clears bit 0 of the Semaphore Register to a zero. HINTACK is output by the host processor in response to the receipt of a HINTOUT interrupt from the IDPC.

LABE/ is driven active low by the IDPC as a result of receiving an LREQ/ from the local processor 18 and is used to enable the address lines from the local processor 18. LABE/ remains active until the end of the memory cycle.

HABE/ functions identically to LABE/ except that it enabales address lines from the host address latches to the memory bus and is activated by HREQ.

LDBE/ is an active low output used to enable the data lines from the local processor 18 to the shared RAM data bus. LDBE/ is driven active as a result of LDT-R/ being driven high (write cycle). It remains high until the end of the memory cycle.

HDBE/ functions identically to LDBE/ except that it enables data from the host bus onto the shared RAM bus and it is activated by HDT-R/ going high.

The LDLE active high output is used to latch data from the shared RAM to the local processor 18. LDLE is driven low (the latch is made transparent) as a result of LDT-R/ going low (read cycle). It returns active (high) at the end of the memory cycle.

HDLE functions identically to LDLE except that it latches data from the shared RAM to the host processor data bus and is activated by HDT-R/ going low (read cycle).

LDLOE/ is an active low output from the IDPC used by the local processor 18 to enable the output of the data bus latches back to the local processor. LDLOE/ is driven active (low) when LDT-R/ is driven low (read cycle). It is cleared (high) when LREQ/ goes inactive.

HDLOE/ functions identically to IDLOE/ except that it is used to enable the output of data onto the host data bus and is activated (low) by HDT-R/ going low (read cycle). It is cleared (high) when HREQ goes inactive.

RAMCS/ is an active low output from the IDPC used by the shared RAM as its chip select enable. It is driven active (low) when either LREQ/ or HREQ are sampled active. RAMCS/ remains active until the end of the memory crycle.

RANWE/ is an active low output from the IDPC used by the shared RAM as a write strobe. It is activated when either LDT-R/ or HDT-R/ goes high (write cycle). It is deactivated at the end of the memory cycle.

RAMOE/ is an active low output signal used by the shared RAM to enable its output drivers. It is driven active when either LDT-R/ or HDT-R/ is driven low (read cycle). It is cleared (high) at the end of the memory cycle.

Figure 23:
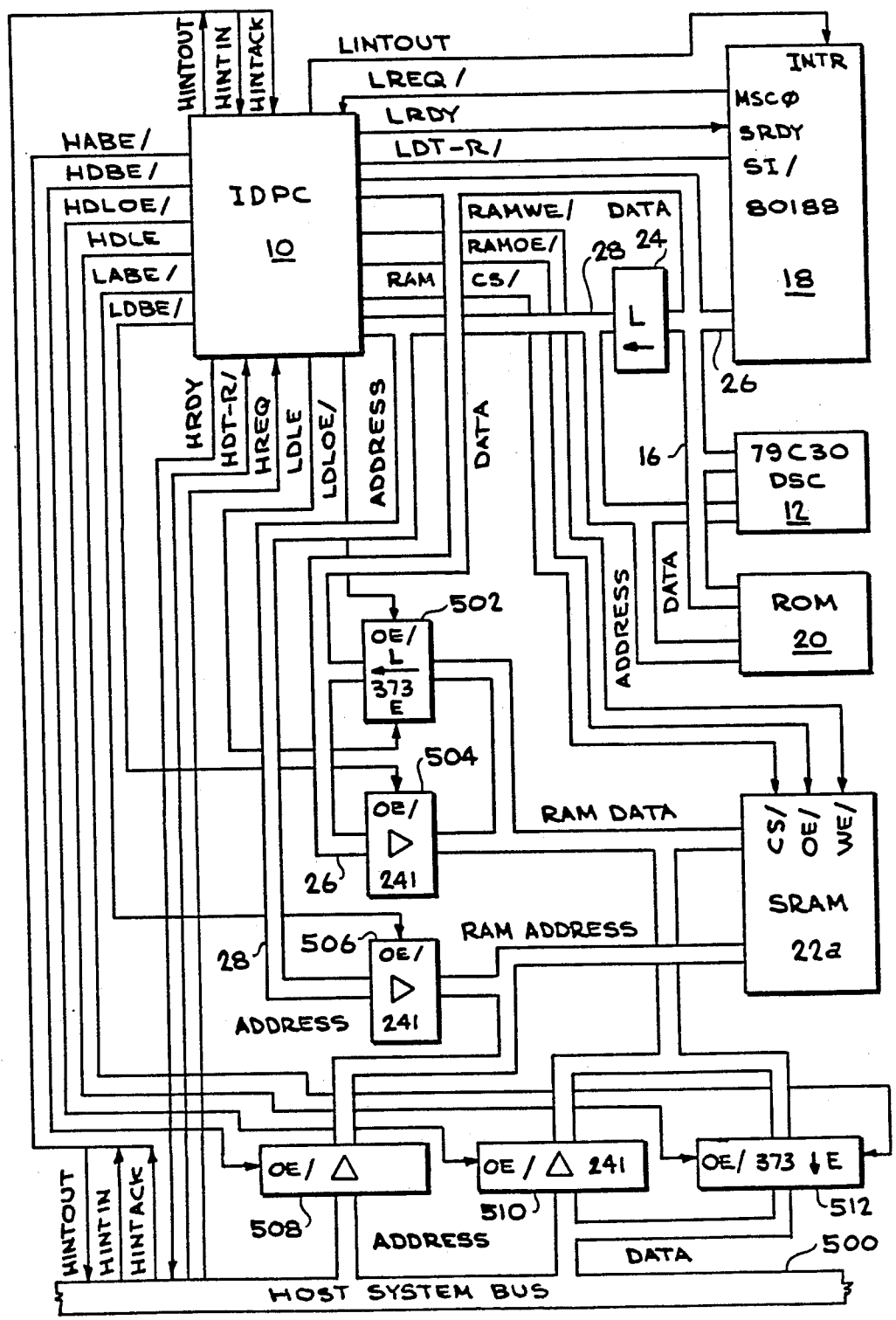
FIG. 23 is a block diagram showing interconnection of the Dual-Port Timing Controller (DPTC) 56 of the IDPC 10 of the instant invention to a host processor and a local processor.

With reference now to FIG. 23, the IDPC 10 can be used in host-based systems in which the "local" microprocessor 18 and an external "host" communicate with one another via a shared memory 22a (dual port RAM). This memory is an external shared RAM (SRAM), that can be accessed by either the microprocessor 18 or the host. The Dual Port Timing Controller (DPTC) 56 of IDPC 10 provides the control functions necessary to allow an ordinary SRAM 220 to function as a dual port device. These functions include: memory cycle timing generation, control of buffers and latches required to isolate the host's system bus 500 from the microprocessor 18 local bus and generation of the Ready control signals back to the host and the local processor.

In addition to arbitrating accesses to the shared RAM 22a, the DPTC 10 provides a semaphore mechanism (bidirectional Interprocessor Interrupts) that is used to coordinate the passing of high level messages to and from the local microprocessor 18 and the host. SRAM 22a is connected to the date and address busses 26 and 28 and receives the RAMCS/ (at CS/ terminal), the RAMOE/ (at an OE/ terminal) and the RAMWE/ (at a We/terminal) and We/ generated by the DPTC 56 of the IDPC 10.

Various bus isolation devices are shown in FIG. 22. A latch 502 is placed on the data bus 26 between the SRAM 22a and the IDPC 10. Latch 502 receives the LDLE at an OE/ input and LDLE/ at an E input from the DPTC 56 of the IDPC 10. A latch 504 is placed on the data bus 26 between the IDPC 10 and the SRAM 22a receives the LDBE/ at an OE/ input from the DPTC 56. A latch 506 is placed on the address bus 28 between the IDPC 10 and the SRAM 22a receives the LABE/ at an OE/ input. A latch 508 is placed on the address bus 28 following the latch 506 between the host system bus 500 and the SRAM 22a receives the HABE/ signal at an OE/ terminal generated by DPTC 56. A latch 510 is placed on the data bus 26 following the latches 502 and 504 between the host system bus 500 and receives the HDBE/ signal at an OE/ terminal generated by the DPTC 56. A latch 512 is placed on the data bus 26 following the latches 502 and 504 between the SRAM 22a and the host system bus 500 and receives the HDLOE/ signal at an OE/ terminal and a HDLE signal at an E terminal generated by the DPTC 56.

Finally, the IDPC 10 communicates the HINTOUT, HINTIN, HINTACK, HRDY, HDT-R/ and HREQ signals to and from the host system bus 500 and the LINTOUT, LREQ/, LRDY, LDT-R1 conducted to the MCSO, SRDY and SI/ terminals of local processor 18.

Figure 24:
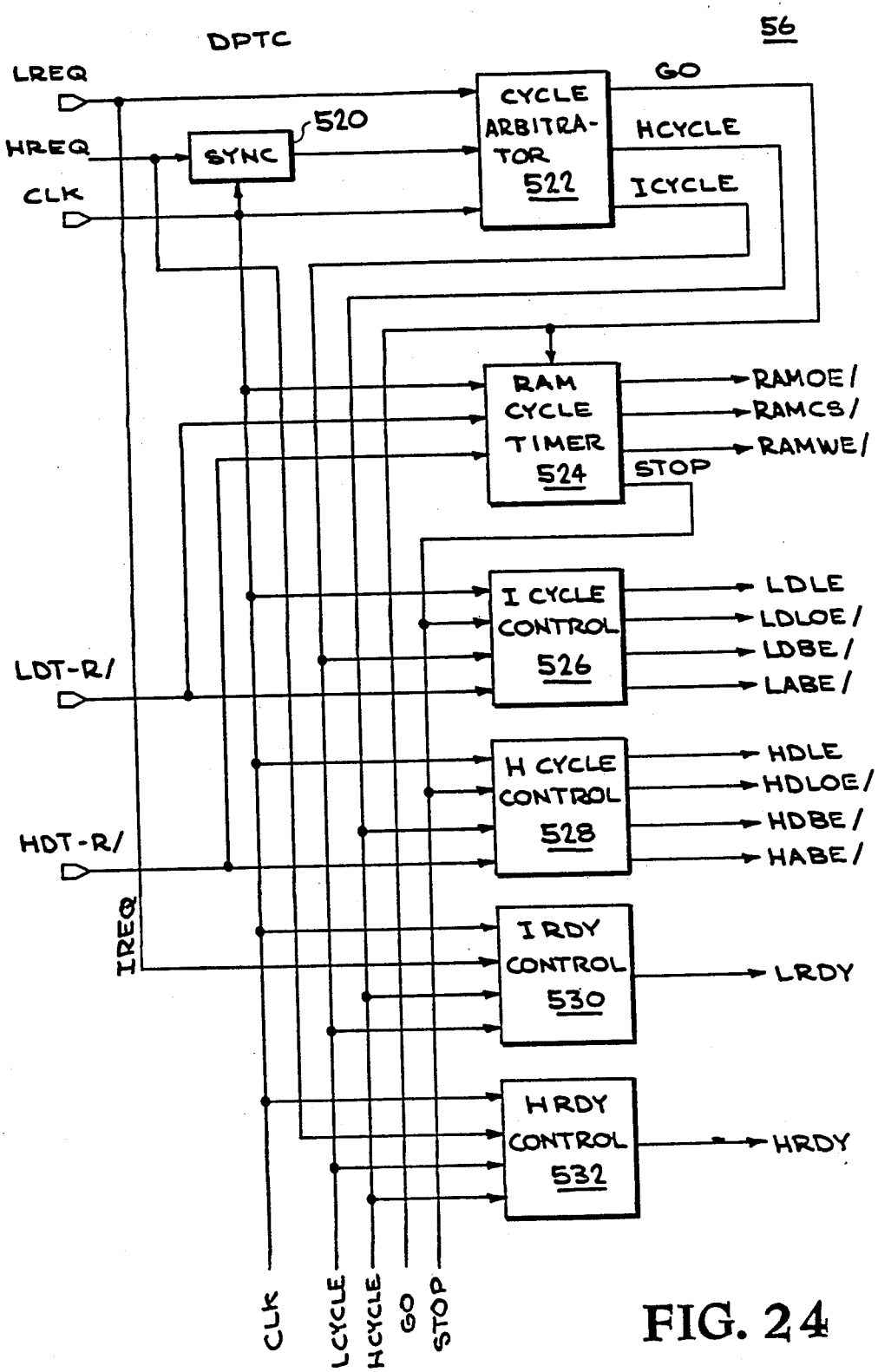
FIG. 24 is a functional block diagram of the DPTC 56 of the IPDC 10 of the instant invention.

With reference now to FIG. 24, a functional block diagram of the DPTC 56 of IDPC 10 shows reception and generation of the various control signals described hereinbefore in connection with FIG. 2. The operation of DPTC 56 will be described in connection with the seven major functional blocks shown in FIG. 24.

A synchronization (SYNC) block 520 receives the master clock (CLK) signal from the local processor 18, as well as the HREQ signal from the host on bus 500. The synchronization block 520 generates a host request signal synchronized with the local clock which is conducted to a conflicting request cycle arbitration block 522 which also receives the LREQ signal from local processor 18 and the CLK signal. Cycle arbitration block 522 generates a local cycle (LCYCLE) signal and a host cycle (HCYCLE) signal therefrom for use by the other functional blocks within DPTC 56. Cycle arbitration block 522 also generates a GO signal received by a RAM cycle timer block 524. RAM cycle timer block 524 also receives the CLK signal and the LDT-R/ and HDT-R/ signals, and generates therefrom the RAMOE/, the RAMCS/ and the RAMWE/ signals, as well as a STOP signal.

A local port cycle controller 526 receives the STOP signal generated by RAM cycle timer 524, the CLK signal, the LCYCLE signal and the LDT-R signal and generates therefrom the LDLE, LDLOE/, LDBE/ and LABE/ signals.

A host port cycle controller 528 receives the STOP signal, the CLK signal, the HCYCLE signal and the HDT-R/ signal and generates therefrom the HDLE, HDLOE/, HDBE/ and HABE/ signals.

A local port ready (LRDY) controller 530 receives the LREQ signal, the CLK signal, the HCYCLE signal and the LCYCLE signal and generates therefrom the LRDY signal.

A host port ready (HRDY) controller 532 receives the HREQ signal, the CLK signal, the HCYCLE signal and the LCYCLE signal and generates therefrom the HRDY signal.

Figure 25A:
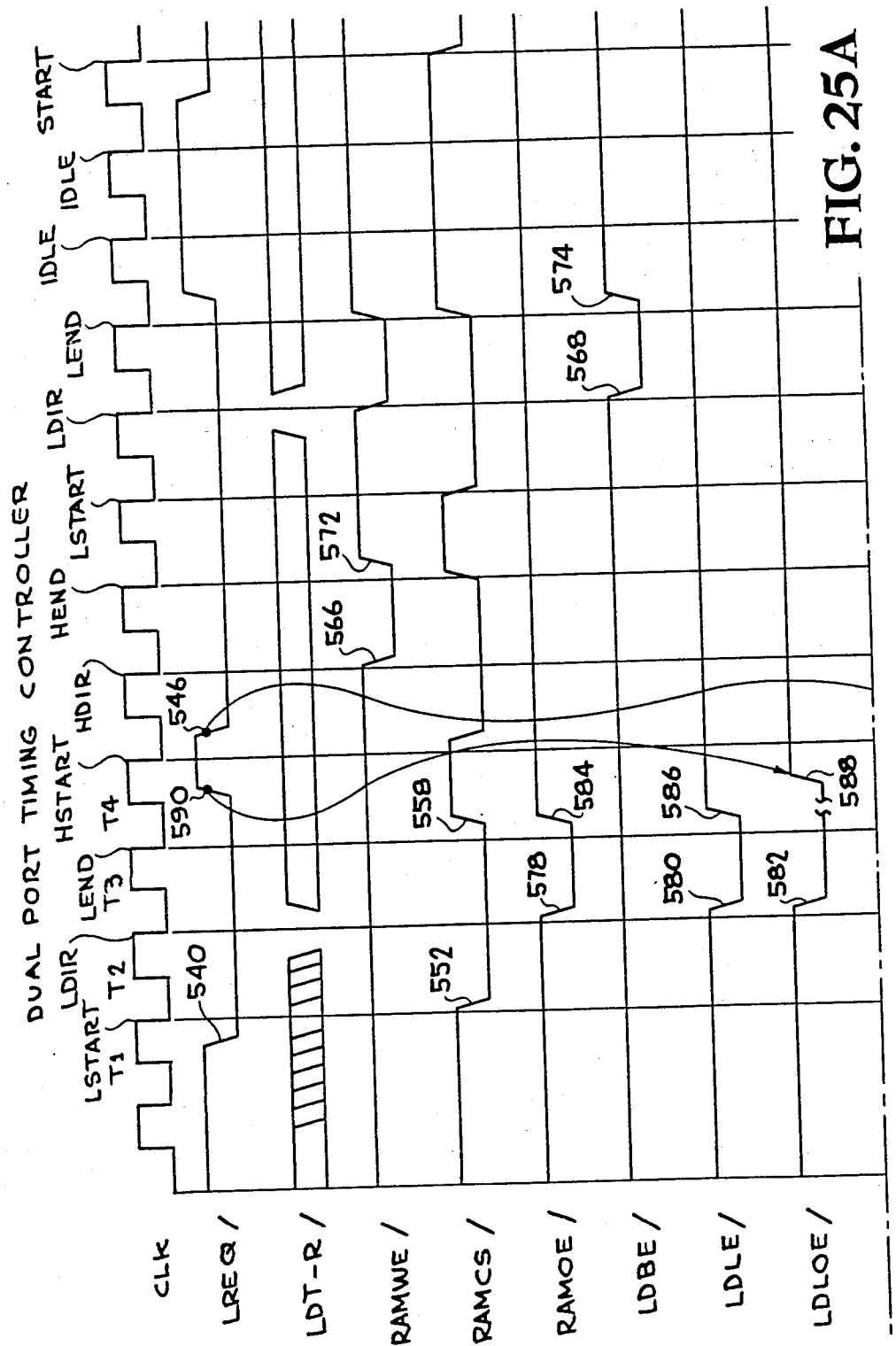
FIG. 25 is a timing diagram showing the timing relationship among the control signals received by the DPTC 56 and then subsequently generated thereby.
Figure 25B:
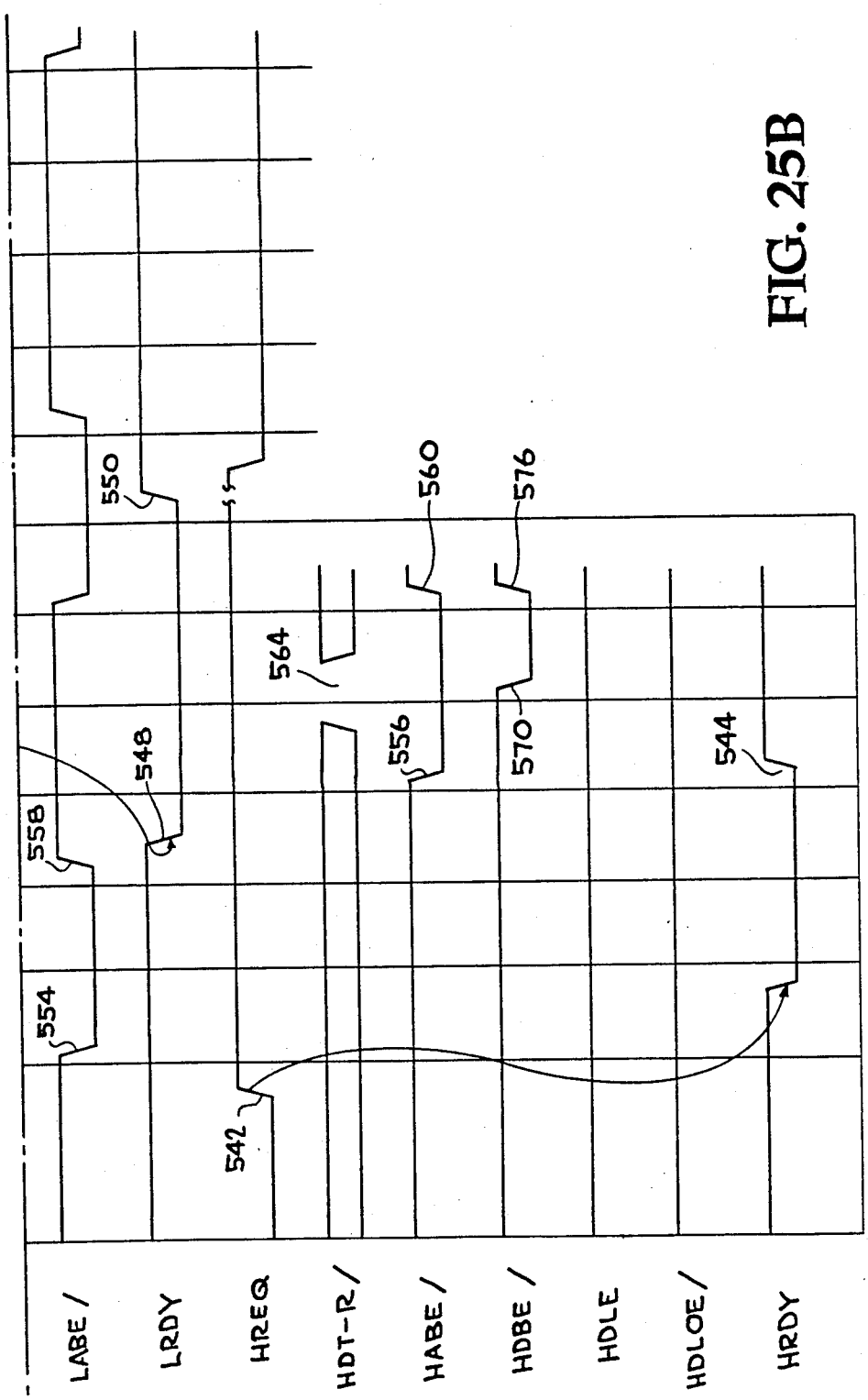

Design and construction of the various blocks shown in FIG. 24 will be understood by those skilled in the art when taken with their description above as well as further description of their functioning given now in connection with the DPTC timing diagram of FIG. 25.

The DPTC 56 generates the cycle timing for all accesses to the shared RAM 22a. The length of each cycle is fixed, and is independent of the cycle times of either the local processor 18 or the host. Memory cycles are generated in response to a request from either the local processor 18 or the host. In the case of conflicting requests the DPTC 56 arbitrates the conflict, granting the first cycle to one requester while holding off the other (via the appropriate Ready line LRDY or HDRY). The DPTC 56 will always arbitrate in favor of the local processor 18 (referred to as the L-port). With reference now to the timing diagram of FIG. 25, if the L-port has a request pending (via the LREQ/ input) at the time when the cycle arbitration block 522 is ready to start the next memory cycle, at the time labelled by reference numeral 540 in FIG. 25, the L-port will be granted the cycle regardless of a request from the host (H-port). If a request from the host (HREQ input pin) is present, or becomes present during the cycle (L-cycle) time 542, the next cycle will be granted to the host (H-cycle) time 544. This takes place implicitly since the DPTC 56 will start the next cycle before the local processor 18 can request another cycle time 546. If an L-cycle request is received in the middle of an H-cycle the local processor 18 is held off (via the LRDY line) until the H-cycle has completed (time 548 through time 550).

L-cycle requests are synchronous with the IDPC clock. This is not a problem since the IDPC clock is the same as the local processor clock and the memory cycle timing is generated from the IDPC clock. H-cycle requests are assumed to be asynchronous to the IDPC clock, and are synchronized internally to the DPTC within the SYNCH block 520.

As shown in FIG. 25, the SRAM 22a memory cycle is two IDPC clock (CLK) times in length, with at least one CLK clock time dead space in between any two SRAM cycles.

While the SRAM 2a is idle the cycle arbitration block 522 of DPTC 56 samples the LREQ/ and synchronized HREQ signals on the falling edge of every IDPC clock cycle. If a request is present a cycle is started and a GO signal is generated to RAM cycle timer 524. The starting of a cycle causes the following actions to take place: RAMCS/ is driven active (low) by RAM cycle timer 524 (time 552) and either LABE/ or HABE is driven active (low) (times 554 or 556, respectively) depending on whether LREQ/ or HREQ/ was sampled.

RAMCS/ provides the chip select control output to the SRAM 22a. Both RAMCS/ and either LABE/ or HABE/ signals remain active until the end of the memory cycle times 558 or 560 respectively.

On the next falling edge of the IDPC clock (CLK) the active port's direction control input line (LDT-R/ or HDT-R) is sampled (times 562 or 564, respectively) by RAM cycle timer 524. This signal determines whether the cycle is a read or write cycle. If the direction control is sampled high (write) the following actions are taken: RAMWE/ is driven active (low) by RAM cycle timer 524 (time 566) and either LDBE/ or HDBE/ is driven active (low) (times 568 or 570, respectively) depending on whether LDT-R/ or HDT-R/ was sampled.

RAMWE/ is the SRAM 22a write strobe. It is returned to its inactive (high) state at the end of the cycle (time 572). LDBE/ and HDBE/ are the data buffer enable controls that place the data to be written into the SRAM 22a on the memory bus. They are also returned to their inactive (high) state at the end of the cycle (time 574 or 576, respectively).

If the direction control line LDT-R/ or HDT-R/ is sampled low (read), the following happens: RAMOE/ is driven active (low) by RAM cycle timer 524 (time 578); LDLE or HDLE is driven active (low) (times 580, time for HDLE omitted for clarity); and LDLOE/ or HDLOE/ is driven active (LOW) (time 582, time for HDLOE/ omitted for clarity).

RAMOE/ enables the SRAM 22a output drivers. LDLE and HDLE place the appropriate data bus latch 502 or 512, respectively, in its transparent state. LDLOE/ and HDLOE/ enable the data abus latch 502 or 512, respectively, outputs back to the local or host system bus. RAMOE/, LDLE, and HDLE are cleared at the end of the cycle (times 584, 586, respectively, time for HDLE omitted for clarity). LDLOE/ (time 588) and HDLOE/ (time omitted for clarity) are cleared when the cycle request (LREQ/ or HREQ) is removed (time 590).

The memory cycle ends on the next falling edge of the IDPC (CLK) clock (time 592).

The LREQ/ and HREQ inputs are sampled by cycle arbitration block 522 on each successive falling edge of the IDPC clock (CLK) to determine if a new cycle is to be started.

The LCYCLE and HCYCLE control blocks 526 and 528 generate the various LDLE, LDLOE/, LDBE/, LABE and HDLE, HDLOE/, HDBE/, HABE timing signals described in connection with FIG. 24.

In the event that the L-port requests a cycle while an H-cycle is in progress, or the H-port requests a cycle while either an L-cycle is in progress or an L-port request is present, a conflict occurs. The cycle arbitration block 522 of DPTC 56 will always arbitrate in favor of the L-port.

If LREQ/ becomes active while an H-cycle is in progress LRDY is driven inactive (low) by LRDY control 530. This takes place immediately. LRDY is returned active at the start of the next memory cycle (which will be an L-cycle).

The case in which HREQ becomes active while an L-cycle is in progress is handled exactly the same as above, except that HDRY is used as the control signal instead of LRDY.

The case where HREQ is active prior to the start of a cycle and LREQ/ also becomes active, causes HRDY to be driven inactive (low) as soon as LREQ/ becomes active. (If LREQ/ is already active—before the L-cycle starts—HRDY is driven inactive as soon as HREQ becomes active.) HRDY is returned active when the H-cycle is started.

Figure 26:
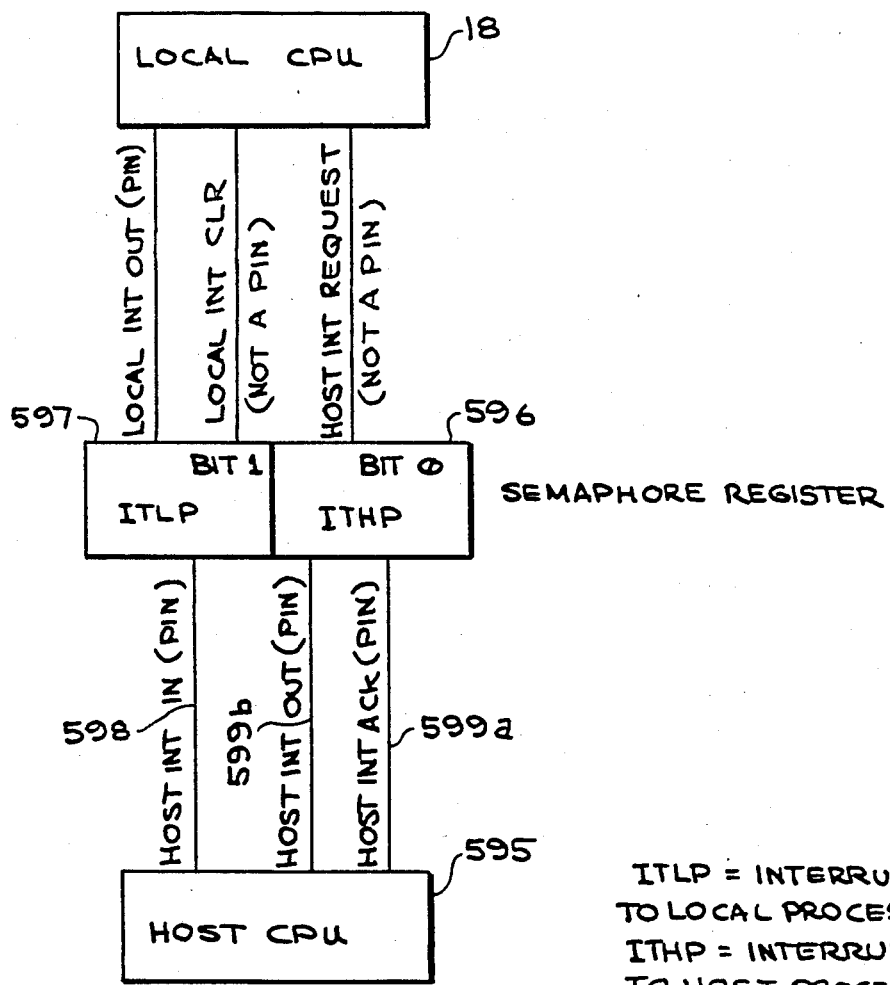
FIG. 26 illustrates the interprocessor interrupt scheme employed by the IDPC 10 of the present invention.

With reference now to FIG. 26, all communication between the local processor 18 and the host processor 595 takes place through "mailboxes" located in shared RAM 22a. A mechanism is required to inform the recipient that there is a message in his mailbox. Interrupts are used for this task.

Message passing takes two forms: local processor 18 sending to the host 595, and host sending to the local processor. When the local processor wishes to send a message to the host, it first places the message in the host's mailbox and then generates an interrupt request to the host. The host reads the message and clears the interrupt request. Conversely, when the host wishes to send a message to the local processor it places the message in the local processor's mailbox and generates an interrupt request to the local processor. The local processor reads the message and clears the interrupt request. The DPTC 56 provides a two-bit semaphore register 596 to facilitate the generation and clearing of these interrupt requests. The low-order bit position of semaphore register 596 (bit 0) contains an interrupt-to-host processor (ITHD) flag and the high-order bit position (bit 1) contains an interrupt-to-local processor (ITLP) flag.

The ITLP portion of semaphore register 596 is connected to the local processor 18 (via an external pin of IDPC 10) by a signal line 597 carrying a LOCAL INT OUT signal. The host processor 595 is connected to the ITLP bit position (via an external pin of IDPC 10) by a signal line 598 carrying a HOST INT IN signal. The local processor 18 can write a LOCAL IN CLR signal to bit 1 of register 596 and a HOST IN REQUEST signal to bit 0 of register 596 via the MPI 50.

The host 595 is connected to the ITHP bit position of semaphore register 596 (via an external pin of IDPC 10) by a signal line 599a carrying a HOST IN ACK signal and (via an external pin of IDPC 10) by a signal line 599b carrying a HOST IN OUT signal.

The Samaphore Register 596 can be read and written by the local procesor (but not by the host). Local processor-to-host interrupt—The local processor 18 generates an interrupt to the host 595 by writing a ONE to bit 0 in the Semaphore Register 596. The setting of this bit activates the host interrupt output (HINTOUT pin). The host clears the bit, and therefore the HINTOUT pin, by pulsing the host interrupt acknowledge input (HINTACK pin).

Host-to-local-processor interrupt—The host 596 generates an interrupt to the local procesor 18 by pulsing the host interrupt input (HINTIN pin). This sets bit 1 in the Semaphore Register 596 and activates the local interrupt output (LINTOUT pin). The local processor clears the interrupt request (generated by the LINTOUT line) by clearing bit 1 in the Semaphore Register.

The IDPC 10 of the present invention contains a number of registers into which user-definable data can be written and/or from which data can be read. The DLC 52 transmitter 102 has a set of status and control registers (112, FIG. 4), the DLC receiver 108 has a set of status and control registers 212, FIG. 10), the UART 54 has a set of status and control registers (408, FIG. 21) and a set of special character bit map registers within element 412 and the DPTC 56 has a single semaphore register. These registers are associated with various aspects of each of these three major functional blocks of the IDPC 10, as will now be described.

The user accesses the various status and control registers and the semaphore register 596 via microprocessor 18 by supplying an address to the MPI 50 according to the following memory map:

| Address | Use |
| --- | --- |
| 00-31 | DLC 52 |
| 32-62 | UART 54 |
| 63 | DPTC 56 |

Status and control registers listed in Table I below are contained within the DLC 52 in blocks 112 and 212 and are used to establish the required modes and configurations of the DLC transmitter 102 and receiver 108 as well as monitoring and reporting the necessary status of the DLC 52 to the user. The status and control registers used for the DLC FIFOs 100 and 106 and Serial Bus Port (SBP) 104 are also listed in Table I. These registers occupy the first 29 locations in a 32 byte DLC address space. This space starts at location 00 in the Internal Memory Map.

Prior to discussing the details of the individual registers listed below in Table I, the following section describes two DLC registers and a bit field in a third register which differ from the other user-accessible DLC registers.

The Receive Frame Status Register, Receive Byte Count Register, and the Receive Link Address Bit field (bits 0–2) of the Interrupt Source Register support the reception of multiple contiguous frames (back-to-back frames). These two registers and the bit field of the third register must maintain a "history" of the status (good or bad frame) and byte count of up to two previously received frames while a third frame is actually being received by the DLC 52. These registers and the bit field are four stage registers to support multiple levels of status from frames received by DLC 52.

Each of the Receive Frame Status Register, Receive Byte Count Register and the Receive Link Address Bit Field are comprised of the following four stages: (1) Current, (2) Holding, (3) Master, and (4) Slave. A typical four-stage "delayed-status" structure used for the Receive Frame Status Register is shown in FIG. 27. The FIG. 27 illustrates a typical interconnection as will be described hereinafter.

Figure 27:
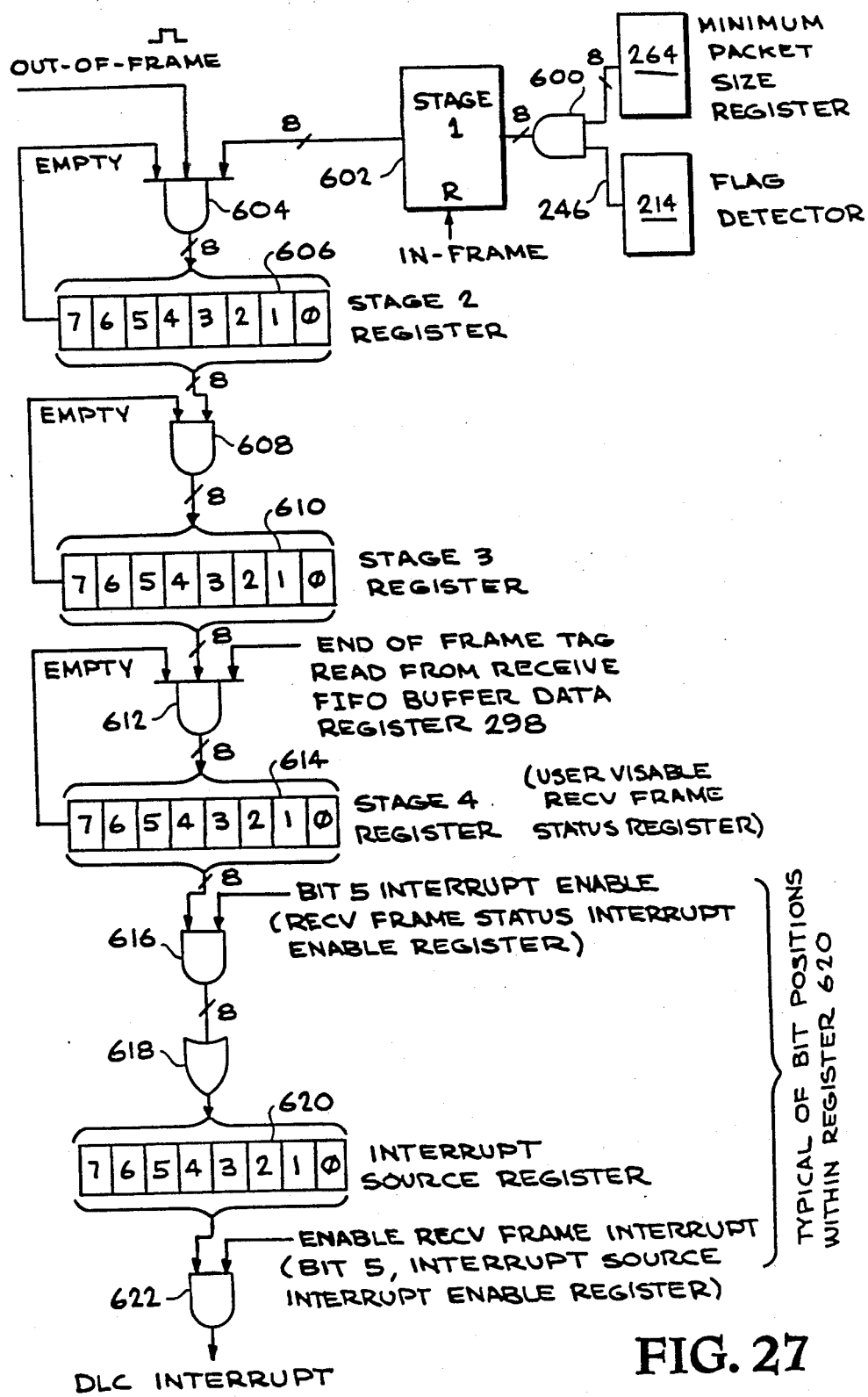
FIG. 27 is a diagram of the four-stage "delayed status" apparatus employed for the Receive Frame Status and Receive Byte Count Register and the Receive Link Address Bit Field of the Interrupt Source Register of the DLC 52.

With reference to FIG. 27, the flag detector 214 of DLC receiver 108 is connected to an AND gate 600 as is sthe eight-bit minimum (receive) packet size register 264 (together representing "stage 1"). (Although only one AND gate 600 is shown in FIG. 27, eight such gates, operating in parallel and each connected to the flag detector, are employed.) The signals generated by AND gates 600 are conducted to an eight-bit latch 602, receiving at a reset (R) input the IN-FRAME signal. The outputs of latch 602 are conducted to a set of (eight) AND gates 604, each also receiving an OUT-OF-FRAME signal and an EMPTY signal generated by an eight-bit ("stage 2") register 606. Register 606 receives the eight signals conducted in parallel from AND gates 604.

Register 606 is, in turn, connected at its outputs to a set of (eight) AND gates 608, each also receiving an EMPTY signal generated by an eight-bit ("stage 3") register 610. Register 610 is, in turn, connected at its outputs to a set of (eight) AND gates 612, each also receiving an EMPTY signal generated by an eight-bit ("stage 4") register 614. Register 614, is, in turn, connected at its outputs to a set of (eight) AND gates 616 each also receiving a signal from bit 5 of a Receive Frame Status Interrupt Enable Register (typical of other bit positions within the register.) The outputs of AND gates 616 are conducted in parallel to an OR gate 618. The single output generated by OR gate 618 is conducted to bit position five of an Interrupt Source Register 620, which is, in turn, connected at its output to an AND gate 622. AND gate 622 also receives a signal from bit 5 of an Interrupt Source Interrupt Enable Register. The signal generated by AND gate 622 generates a DLC interrupt signal.

Stage 1 (602) contains the current status of the frame presently being received by the DLC 52. This stage is updated with the current DLC receiver status as changes occur in real-time. The contents of Stage 1 is transferred to Stage 2 (606) via gates 604 when Stage 2 is empty and an event occurs that caused a byte to be tagged as the End-of-Frame (EOF) byte as it enters the DLC Receive FIFO 106 as described hereinabove in connection with FIG. 18. If Stage 2 is not empty (i.e., contents not yet transferred to Stage 3), then Stage 1 will retain its status. When Stage 1 is transferred to Stage 2, Stage 1 is free to begin monitoring the next frame that arrives. Stage 2 then holds the data until Stage 3 is empty. Data is transferred from Stage 2 to Stage 3 as soon as Stage 3 becomes empty. This, in turn, allows transfer of data from stage 1 to Stage 2 at the EOF condition.

The contents of Stage 3 register 610 is transferred to Stage 4 register 614 (which is the register accessible by the user) when Stage 4 is empty and the EOF-tagged byte is read (by DMA or the microprocessor 18) from the Receive FIFO Data Register 298. If Stage 4 is not empty, then Stage 3 will retain its status. Stage 4 is cleared ("emptied") when read by microprocessor 18 or when DLC 52 Reset occurs.

Received frame status can "back up". If microprocessor 18 has not read Stage 4 when an event occurs that would cause Stage 3 to be transferred to Stage 4, Stage 3 is not transferred to Stage 4. There is no problem if Stage 4 is emptied before an event occurs which would cause Stage 1 to be transferred to Stage 2. In this case, Stage 3 is transferred to Stage 4 as soon as Stage 4 is emptied. However, with both Stages 2, 3, and 4 non-empty when an event occurs that would result in Stage 1 being transferred to Stage 2, existing Stages 1, 2, 3, and 4 are not disturbed. The DLC Receiver 108 begins ignoring all received link bytes, freezing Stage 1. Any frames which are transmitted to the DLC receiver are therefore lost until Stage 4 is read by microprocessor 18. As soon as Stage 4 is emptied by a microprocessor read, Stage 3 is transferred to Stage 4, Stage 2 is transferred to Stage 3 and Stage 1 is transferred to Stage 2. At this point, the DLC Receiver 108 logic enters Receiver State 0 (Hunt for Flag) and frame reception can begin again.

The valid and invalid packet received bits (3,5) of the Interrupt Source Register are also reported in a delayed fashion. These bits can be built from the other delayed status conditions and do not themselves require four-stage mechanism.

If Receive Frame Status Register has not been read since the Interrupt Source Register was last read, and the least significant bit of the Receive Byte Count Register is read, the Receive Status Register will be cleared. In this manner, the four-stage delayed status mechanism remains synchronized if a valid data packet is received and the Receive Status Register is not read.

The DLC 52 contains a number of registers within the transmitter status and control registers block 112 (FIG. 4) and the receiver status and control registers block 212 (FIG. 10). These registers are listed in Table I.

TABLE I

DLC 52 Status and Control Registers

| IDPC Hex Address | Register | Length (Bytes) |
|---|---|---|
| 00 | Command/Control Register | 1 |
| 01 | DLC Address Control Register | 1 |
| 02 | Link Address Recognition Register 0 | 2 |
| 04 | Link Address Recognition Register 1 | 2 |
| 06 | Link Address Recognition Register 2 | 2 |
| 08 | Link Address Recognition Register 3 | 2 |
| 0A | Serial Bus Port (SBP) Control Register | 1 |
| 0B | Minimum Receive Packet Size Register | 1 |
| 0C | Maximum Receive Packet Size Register | 2 |
| 0E | Interrupt Source Interrupt Enable Register | 1 |
| 0F | Receive Frame Interrupt Enable Register | 1 |
| 10 | Receive Link Interrupt Enable Register | 1 |

TABLE I-continued

DLC 52 Status and Control Registers

| IDPC Hex Address | Register | Length (Bytes) |
|---|---|---|
| 11 | FIFO Status Interrupt Enable Register | 1 |
| 12 | Transmit Byte Count Register | 2 |
| 14 | FIFO Threshold Register | 1 |
| 15 | Interrupt Source Register | 1 |
| 16 | Receive Byte Count Register | 2 |
| 18 | Receive Frame Status Register | 1 |
| 19 | Receive Link Status Register | 1 |
| 1A | FIFO Status Register | 1 |
| 1B | Receive FIFO Data Register | 1 |
| 1C | Transmit FIFO Data Register | 1 |

Appendix A contains a description of the DLC status and control registers listed in Table I.

The DLC registers fall into five categories, command/control, status, FIFO data, interrupt identification, and interrupt enable registers.

DLC command/control regiters—The command/control registers are used to configure the DLC, and to request specific actions. These include:
DLC Command/Control Register;
Link Address Control Registers (4);
SBP Control Register;
Minimum Receive Packet Size Register;
Maximum Receive Packet Size Resiter;
FIFO Threshold Register; and
Transmit Byte Count Register.

The DLC Command/Control Register controls the operation of the entire DLC. The other registers each control the actions of a specific portion of the DLC. The bit assignments are not critical in these registers.

DLC status registers—The DLC status registers report the state of the DLC to the user. These include:
FIFO Status Register;
Receive Byte Count Register;
Receive Frame Status Register;
Receive Link Status Register; and
Portions of the Interrupt Source Register.

The status registers are organized to group status information according to type. This is important since this is the way that the software interrupt handling routines will tend to be organized. For example, status information that pertains to the real time condition of the communications link is reported separately from information specific to a particular received frame of data. In general, the software is interested in the status of packets, not portions of packets—this is the key, the DLC reports status to the user only after the packet has been moved from the IDPC into external RAM. Traditionally, the user was involved in either the status of data on a character by character or several character at a time basis, not on a packet at a time basis. This status structure is unique to the IDPC.

The bits inside the various status registers are organized with the most probable condition in the LSB position and the least probable condition in the MSB position. This reduces the software overhead in identifying a given condition. Further, the most likely status conditions (and the identification of the address associated with the packet in question) are reported in the Interrupt Source Register. This is the first register that a user will read after receiving an interrupt. Under all normal conditions, the user need access no other register to identify the status of the DLC.

FIFO data registers—These are the registers that the user reads or writes to move data to and from the DLC (FIFOs).

Interrupt identification register—The Interrupt Source Register contains three bit fields, the packet address identification field, the valid packet field, and the interrupt source field. The first two fields were discussed above. The interrupt source field has one bit for each of the status registers. When this bit is set, the associated register contains the interrupting condition. In this manner, the user can efficiently locate the cause of the interrupt.

By way of example: To identify that a valid packet has been received, the IDPC requires only a read to the Interrupt Source REgister, and a shift right and test instruction—a total of two instructions. If a less optimum organization were used, as many as 17 instructions could have been required.

Interrupt enable registers—These registers are bit-for-bit matchs of the status registers. This provides a user friendly organization for interrupt enabling. Extra registers are required by this scheme, but the result is clearer for the user.

Table II lists the 12 user-accessible status and control registers in the UART 54 plus a 128 bit bit-map, addressed as 16, 8 bit registers corresponding to the random access memory 413 of the Paroty, Special Character, Frame, Break Checker 412. The UART registers are mapped into a 31 byte space. The two baud rate divisor registers overlap the FIFO Data Registers and the Interrupt Enable Register Addresses. Access is gained by setting the Divisor Latch Access Bit (DLAB) in the Line Control Register. The base address of the 31 byte block is indicated in the memory map presented earlier.

TABLE II

UART 54 Status and Control Registers

| Address | Register Name | Type |
|---|---|---|
| 0 DLAB = 0* | RECEIVE FIFO DATA REGISTER | Read |
| 0 DLAB = 0* | TRANSMIT FIFO DATA REGISTER | WRITE |
| 0 DLAB = 1* | BAUD RATE DIVISOR LSB | READ/WRITE |
| 1 DLAB = 0* | INTERRUPT ENABLE | READ/WRITE |
| 1 DLAB = 1* | BAUD RATE DIVISOR MSB | READ/WRITE |
| 2 | INTERRUPT IDENTIFICATION | READ |
| 3 | LINE CONTROL | READ/WRITE |
| 4 | MODEM CONTROL | READ/WRITE |
| 5 | LINE STATUS | READ |
| 6 | MODEM STATUS | READ |
| 7 | UART STATUS | READ |
| 8 | UART CONTROL | READ/WRITE |

TABLE II-continued

| | UART 54 Status and Control Registers | |
|---|---|---|
| Address | Register Name | Type |
| 9-24 | EIGHT BIT SPECIAL CHARACTER BIT MAP REGISTERS | READ/WRITE |

*DLAB bit is defined above.

Appendix B contains a description of the UART status and control registers listed in Table II.

UART registers—The UART registers are identical to those defined in the 8250, with the exception of the bits required to control and report status on the features added to the 8250 (special character recognition, FIFOs synchronous operation, etc.). The trick here is to be exactly compatible with the 8250, while providing the new capabilities cleanly. The UART Status, and UART Control registers are new to the basic 8250. Additional bits have been added to unused positions in existing 8250 registers (identified in the UART register section of the FPS). The positions of these added bits is important to direct the interrupt source identification process in a logical manner.

The DPTC 56 contains one user-accessible register. This register is used by the local processor 18 to control the generation and clearing of semaphore interrupts between the local processor 18 and the host processor. This DPTC register is described hereinabove in connection with FIG. 26. The DPTC register (Semaphore Register 596) is mapped into address 63 decimal.

APPENDIX A

DLC 52 Status/Control Registers (112,212)

COMMAND/CONTROL REGISTER is an eight-bit register. All bits in this register are set and cleared by software except when initialized to default values as a result of DLC Reset as described hereinbelow or IDPC Reset Pin as described hereinbelow. This register can be written to and read from by the microprocessor 18.

DLC COMMAND/CONTROL REGISTER

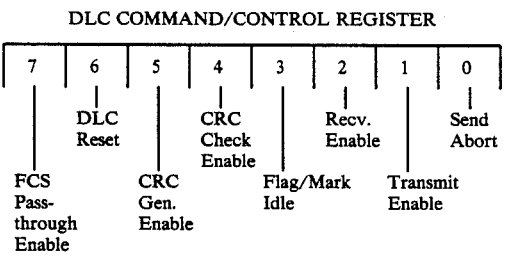

Bit 0 Send Abort (Default=0)

When this bit is set to ONE, the following actions result immediately and persist until the bit is cleared to ZERO:

(a) DLC transmitter Flag/Abort Insertion Unit 134 (FIG. 7B) transmits Abort characters (bit pattern 01111111 (LSB on right)).

If the user via microprocessor 18 sets and clears this bit on two successive writes the DLC will transmit one "Abort" character.

(b) Clear the DLC Transmit FIFO 100 (FIG. 4).

(c) Clear the DLC Transmit Byte Counter 154 (FIG. 5).

(d) Clear the DLC Transmit Byte Count Register 152 (FIG. 5).

Bit 1 Transmitter Enable (Default=0)

When set to ONE, this bit allows data from the DLC 52 to be shifted out to SBOUT (FIG. 8) under control of the SCLK or SFS/XMITCLK. When this bit is cleared to ZERO, the SBOUT pin is placed in a three-state condition. When this bit is cleared to ZERO and the DLC transmitter is "In-frame" (state 1 (302) of FIG. 19), i.e., transmitting data, the DLC waits until the current frame is complete (i.e., DLC transmitter out of frame) before disabling the SBOUT pin.

Bit 2 Receiver Enable (Default=0)

This bit, when set to ONE, allows data from the SBIN pin to be clocked into the Serial Bus Port (SBP) portion 104 of the DLC 52. When cleared to ZERO, this bit blocks the receipt of any data into the SBP portion of the DLC. If this bit is cleared while the DLC receiver is In-frame, the DLC 52 will wait for the frame currently being received to terminate in an orderly fashion (i.e., Closing Flag received or terminating error occurs) before disconnecting.

Bit 3 Flag Idle-Mark Idle/ (Default=0)

This bit, when set to ONE, causes the DLC 102 transmitter to continuously transmit the Flag Idle pattern when not In-frame. When cleared to ZERO, this bit causes the DLC transmitter to continuously transmit the Mark Idle pattern when not In-frame.

Bit 4 CRC Check Enable (Default=1)

When set to ONE, this bit allows the output of the CRC Check result generated by CRC checker 222 to be transferred to the CRC Error bit (bit 2) in the Receive Frame Status Register. When this bit is cleared to ZERO, the CRC Error bit in the Receive Frame Status Register is never set.

Bit 5 CRC Generate Enable (Default=1)

When set to ONE, this bit causes the transmit CRC generated by CRC generator 120 (which is always being calculated) to be transmitted following transmission of the byte tagged as End-of-Frame (EOF) in the DLC Transmit FIFO 100 (FIG. 4). When this bit is cleared to ZERO, a Closing Flag is generated by FLAG, ABORT INSERTION generator 134 and transmitted immediately following the byte tagged as EOF, and the FCS is not sent.

Bit 6 DLC Reset (Default=0)

This bit, when set to ONE, resets the DLC FIFOs 100 and 106 and DLC 52 and SBP 104 logic. All latches, status and control bits in the DLC status and control registers 112, 212 are forced to their default values.

Bit 7 FCS Pass-through Enable (Default=0)

When set to ONE, this bit allows the FCS bytes to be loaded into the FIFO 106 as data (receive side). When cleared to ZERO, the FCS is discarded.

DLC ADDRESS CONTROL REGISTER is an eight-bit register. All bits in this register are set and cleared by software except when initialized to default values as a result of the DLC Reset described in connection with DLC Command/Control Register or IDPC Reset Pin. This register can be written and read by the microprocessor 18. When all Link Address Enable bits (bits 0-3) and the Broadcast Enable bit (bit 4) are cleared to ZERO, the DLC will perform no address detection and pass all received frame bytes (assuming more than two frame bytes are received) to the DLC Receive FIFO 106 (FIG. 10). In this case, bits 5, 6 and 7 of this register are ignored.

If one or more of bits 0-4 are set to one, then a successful link address compare described in connection with Address Detection Unit 226 (FIG. 16) must occur before any frame bytes can be transferred to the DLC Receive FIFO 106.

DLC ADDRESS CONTROL REGISTER

| 7 | 6 | 5 | 4 | 3 | 2 | 1 | 0 |
|---|---|---|---|---|---|---|---|
| First/Second byte selection | C/R Addr. Enable | Address Size | Broadcast Address Enable | Address Reg. 3 Enable | Address Reg. 2 Enable | Address Reg. 1 Enable | Address Reg. 0 Enable |

Bit 0 Link Address 0 Enable (Default = 0)
Bit 1 Link Address 1 Enable (Default = 0)
Bit 2 Link Address 2 Enable (Default = 0)
Bit 3 Link Address 3 Enable (Default = 0)

When set to ONE, bits 0 through 3 enable comparison of a received frame address with the contents of DLC Link Address Recognition Register 0 through 3, respectively, of blocks 278, 280, 282 and 284 (FIG. 17). The contents of a given Link Address Recognition Register should have been written by software before software sets the corresponding Link Address Enable bit in this register. The comparison of a received frame address with the contents of all enabled Address Recognition Registers is conditioned by bits 5 and 6 of this register as described hereinbelow.

Bit 4 Broadcast Address Enable (Default=1)

When set to ONE, this bit enables comparison by comparators of blocks 278, 280, 282 and 284 of a received frame address with an all 1's address. The comparison is conditioned by bits 5 and 6 of this register as described hereinbelow. When cleared to ZERO along with bits 0-3 of this register, the DLC performs no address detection. If cleared to ZERO and one or more bits of 0-3 are set to ONE, then the all 1's pattern address is ignored.

Bit 5 Address size 1-2 (Default=0)

At least one of the bits 0-4 in this register must be set to ONE for this bit to have any effect on DLC operation. Given that, if this bit is cleared to ZERO, two frame address bytes must compare for address recognition to occur in block 226. If this bit is set to ONE, only the first frame address byte must compare for address recognition to occur by address detection unit 226. Bit 7 specifies whether the first or second byte is the one that is compared.

Bit 6 C/R Address Enable (Default=0)

At least one of the bits 0-4 in this register must be set to ONE for this bit to have any effect on DLC operation. Given that, if this bit is cleared to ZERO, then bit 1 of the first address byte of each received frame will be ignored for the purposes of address recognition by clock 226. If this bit is set to ONE, then bit 1 of the first received frame address byte must compare successfully along with the other address bits for address recognition to occur by address detection unit 226.

Bit 7 First/Second Byte Selection (Default=0)

This bit only has effect when one-byte addressing is selected when set to ONE the address recognition block 226 examines only the second byte of the address, i.e., the first eight bits are don't care. When cleared to ZERO, only the first byte is examined.

LINK ADDRESS RECOGNITION REGISTERS within blocks 278, 280, 282 and 284 (FIG. 17).

Link Address Recognition Register 0 (278) (Default=Hex 0000)
Link Address Recognition Register 1 (280) (Default=Hex 0000)
Link Address Recognition Register 2 (282) (Default=Hex 0000)
Link Address Recognition Register 3 (284) (Default=Hex 0000)

All bits in these registers are set and cleared by software except when initialized to default values as a result of DLC Reset or IDPC Reset pin. These registers can be written and read by the local microprocessor 18.

Link address recognition is defined in connection with FIG. 17. Each of these four registers has a corresponding enable bit (bits 0-3) in the DLC Address Control Register. If the corresponding enable bit is set, a given Link Address Recognition Register is conditioned by bits 5 and 6 of DLC Address Control Register as described hereinabove.

SERIAL BUS Port (SBP) CONTROL REGISTER is an eight-bit register. All bits in this register are set and cleared by software except when initialized to default values as a result of DLC Reset or IDPC Reset Pin. This register can be written and read by the local microprocessor 18.

SERIAL BUS PORT CONTROL REGISTER

| 7 | 6 | 5 | 4 | 3 | 2 | 1 | 0 |
|---|---|---|---|---|---|---|---|
| Remote Loopback Enable | Local Loopback Enable | | | Channel Select | | | Invert |

Bit 0 Invert (Default=0)

When this bit is set to ONE, the transmitted serial bit stream is inverted by XOR 200 (FIG. 8) as the last step following all other DLC transmitter processing but before SBP channel multiplexing (block 196) (see bits 1-2 below). The one exception to this rule is when the DLC transmitter is transmitting the Mark Idle data pattern; in this case, no inversion is performed because Mark Idle is inserted by OR 202 past the inverter 200.

When this bit is set to ONE, the received serial bit stream is inverted by XOR 238 (FIG. 11) as the first step following de-multiplexing (block 232) (see bits 1-2 below) and Mark Idle detection. If Mark Idle is detected, inversion continues to take place but no data enters the DLC receiver Serial to Parallel Shift Register 212.

If this bit is cleared to ZERO, no data inversion takes place in either the transmit or receive direction.

Bits 1-5 Channel Select (Default=00000)

Select SBP time slot for multiplexing transmitted serial bit stream by time slot multiplexer 196 and de-multiplexing received serial bit stream by time-slot de-multiplexer 232.

| Bit 54321 | Selection |
|---|---|
| 00000 | Channel 0 (Bd)* |
| 00001 | Channel 1 (Be)* |
| 00010 | Channel 2 (Bf)* |
| . | . |
| . | . |
| 11110 | Channel 30 |
| 11111 | Non-multiplexed — single channel with receiver clocked by SCLK pin and transmitter clocked by SFS/XMIT Clock pin. |

For all bit settings except non-multiplexed, both receiver and transmitter are clocked by SCLK pin.
* = terminology employed in the cross-referenced application entitled "Digital Subscriber Controller"

Bit 6 Local Loopback Enable (Default=0)

When set to ONE this bit causes the transmit data path (SBOUT) to be connected internally to the receive data path (SBIN). The selected transmit clock (either the SCLK or the SFS/XMITCLK clock) is used for both the transmit and receive clock. The Local Loopback mode, when selected, operates regardless of the setting of the Transmit Enable and Receive Enable bits (bits 1 and 2 of the Command/Control Register). Setting of this bit to a ONE also prevents data from being placed on the SBOUT pin or incoming data (from SBIN) from being received. Clearing this bit to a ZERO disables Local Loopback.

Bit 7 Remote Loopback Enable (Default=0)

This bit when set to ONE, connects the SBIN pin to the SBOUT pin. Incoming data is therefore presented immediately to SBOUT as transmit data. In this mode the appropriate receive clock is the SCLK. Receive data may be presented to the DLC receive logic or not depending upon the setting of Receive Enable. Data from the transmit logic is prevented from being sent out on SBOUT while in this mode. Clearing of this bit to ZERO disables Remote Loopback.

MINIMUM RECEIVE PACKET SIZE REGISTER is an eight-bit register (264) FIG. 15. Default-=Hex 5. Bits 0-3 of this register are set and cleared by software except when initialized to the default value of 5 as a result of DLC Reset or IDPC Reset pin. Bits 4-7 are not used. This register can be written and read by the local microprocessor 18.

This register indicates the minimum length packet (exclusive of Opening and Closing Flags) that can be received by the DLC without generating a "Short Frame" error in the Receive Frame Status Register.

At the time that the Short Frame Interrupt is generated, the contents of the Receive Byte Count Register reflects the number of bytes in the Short Frame.

| Value | Count |
|---|---|
| 1 | 0001 |
| . | . |
| . | . |
| 15 | 1111 |
| 16 | 0000 |

MINIMUM RECEIVE PACKET SIZE REGISTER

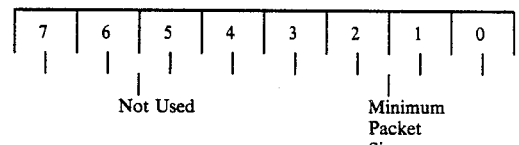

MAXIMUM RECEIVE PACKET SIZE REGISTER is a 16-bit register. Default=Hex 0000.

The 16 bits of this register are set and cleared by software except when initialized to the default value as a result of DLC Reset or IDPC Reset pin. This register can be written and read by the local microprocessor 18.

This register indicates the maximum length packet (exclusive of Opening and Closing Flags) that can be received by the DLC without generating a "Long Frame" error in the Receive Frame Status Register. As each packet byte is received, the contents of the Maximum Receive Packet Size Register are compared with the Receive Byte Counter 292 (FIG. 18). If the maximum packet size is exceeded in the Receive Byte Counter, a "Long Frame" error is generated in the Receive Frame Status Register. At this point, the received byte that caused the Receive Byte Counter 292 to exceed the maximum length is tagged as the End-of-Frame (EOF) byte and the DLC receiver enters receiver state 0 (Hunt for Flag).

| Value | Count |
|---|---|
| 1 | 0000000000000001 |
| . | . |
| . | . |
| 65.535K | 1111111111111111 |
| 65.536K | 0000000000000000 |

MAXIMUM RECEIVE PACKET SIZE REGISTER

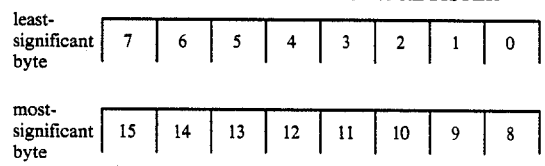

DLC INTERRUPT ENABLE REGISTERS

| Interrupt Source Interrupt Enable Register | (Default = Hex 0000) |
|---|---|
| Receive Frame Interrupt Enable Register | (Default = Hex 0000) |

| -continued | |
|---|---|
| Receive Link Interrupt Enable Register | (Default = Hex 0000) |
| FIFO Status Interrupt Enable Register | (Default = Hex 0000) |

All bits in these registers are set and cleared by software except when initialized to default values as a result of DLC Reset or IDPC Reset Pin. These registers can be written and read by the local microprocessor 18.

The last three enable registers are bit-for-bit images of the corresponding Receive Frame Status Register, Receive Link Status Register, and FIFO Status Register, respectively, described hereinbelow. The Interrupt Source Interrupt Enable Register is an image of the corresponding Interrupt Source Register described hereinbelow except for bits 0-2, which have no interrupts associated with them.

The last three enable registers form the lower level of a two-level interrupt enable mechanism used for the corresponding three status registers. The three bits in the Interrupt Source Interrupt Enable Register that correspond to these three status registers from the higher level of the two-level enable mechanism. For example, in order for the Short Frame error interrupt to be enabled, the Short Frame bit must be set to one in the Receive Frame Interrupt Enable Register (lower-level enable) AND the Receive Frame Status bit must be set to one in the Interrupt Source Interrupt Enable Register (higher-level enable).

When an event occurs that causes a bit to be set in one of the three status registers (reference the descriptions of the three status registers) and both levels of status interrupt enable are set to ONE, the DLC interrupt is generated and the bit for that register is set to ONE in the DLC Interrupt Source Register. If the status register bit is set to ONE and either interrupt enable level is not enabled, no interrupt is generated and the Interrupt Source Register bit for that status register is not set to ONE. *The Transmit Threshold Reached interrupt described in connection with FIG. 5 (bit 2 in the FIFO Status and Enable Registers) described hereinbelow, differs in the following way. The threshold reached bit reflects the actual real time condition of the FIFO (above, equal to or below the threshold). The interrupt, however, is generated only when the level in the FIFO falls to the threshold level. This prevents the generation of an interrupt when the FIFO is empty because the transmitter is not in use.

A software read of any of the three status registers clears the status register to ZERO and clears the interrupt condition caused by bits being set to ONE in that status register. A DLC Reset or activation of the IDPC Reset Pin also has this effect.

In contrast to the interrupt enable mechanism used for the three status registers, the Valid Packet Received and Valid Packet Sent bits in the Interrupt Source Register can generate an interrupt through a single level interrupt enable mechanism. When an event occurs that causes either of these bits to be set in the Interrupt Source Register, if the corresponding Interrupt Source Interrupt Enable Register bit has been set to one, the DLC interrupt is generated. When either of these two Interrupt Source Register bits is set to one and the corresponding interrupt enable register bit is not set to one, no interrupt is generated.

INTERRUPT SOURCE INTERRUPT ENABLE REGISTER

| 7 | 6 | 5 | 4 | 3 | 2 | 1 | 0 |
|---|---|---|---|---|---|---|---|
| Enable Recv. Link Status Interrupt | | Enable Recv. Frame Interrupt | | Enable Valid Packet Received Interrupt | | | Not Used |
| | Enable FIFO Status Interrupt | | | Enable Valid Packet Sent Interrupt | | | |

RECEIVE FRAME INTERRUPT ENABLE REGISTER

| 7 | 6 | 5 | 4 | 3 | 2 | 1 | 0 |
|---|---|---|---|---|---|---|---|
| Not Used | | Enable Long Frame Error Interrupt | | Enable CRC Error Interrupt | | | Enable Abort Recvd Interrupt |
| | Enable Overrun Error Interrupt | | Enable Short Frame Error Interrupt | | Enable Non-Integer # Bytes Recvd Interrupt | | |

RECEIVE LINK INTERRUPT ENABLE REGISTER

| 7 | 6 | 5 | 4 | 3 | 2 | 1 | 0 |
|---|---|---|---|---|---|---|---|
| Not Used | | | | Enable In-Frame Interrupt | | Enable Mark Idle Recvd Interrupt | |
| | | | | | Enable Flag Idle Recvd Interrupt | | |

FIFO STATUS INTERRUPT ENABLE REGISTER

| 7 | 6 | 5 | 4 | 3 | 2 | 1 | 0 |
|---|---|---|---|---|---|---|---|
| Not Used | | | Enable Transmit Underrun Interrupt | | Enable Transmit Threshold Reached Interrupt | | Enable Recvd. Threshold Reached Interrupt |
| | | EOP in Receive FIFO Interrupt | | Enable XMIT Buffer Available Interrupt | | Enable Recvd FIFO DATA Available Interrupt | |

TRANSMIT BYTE COUNT REGISTER (152) is a 16-bit register.

Default=0

Bits 0-15 of this register are set and cleared by software except when initialized to the default value as a result of DLC Reset, IDPC Reset Pin or when an Abort is issued by Flag/Abort Insertion Unit 134 and conducted via signal line 164 (FIG. 5). This register can be written or read by the local processor 18.

Software writes this register with the count of bytes to be transmitted in each frame. NOT including Opening Flag, Closing Flag, and FCS (CRC) bytes. Software only writes this register when the count of bytes to be transmitted is different from the count currently in this register.

The contents of this register are transferred to the Transmit Byte Counter 154 (FIG. 5) whenever software writes this register (if the transmitter is out-of-frame) or when an End-of-Frame (EOF) tagged byte is loaded from the transmit FIFO 100 into the Parallel to Serial Shift Register 110. If software is writing this register when the EOF-tagged byte is loaded, the transfer to the Transmit Byte Counter is delayed until the software write is complete.

| Value | Count |
|---|---|
| 1 | 0000000000000001 |
| . | . |
| . | . |
| . | . |
| 65.535K | 1111111111111111 |
| 65.536K | 0000000000000000 |

TRANSMIT BYTE COUNT REGISTER

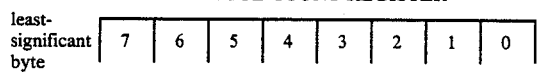
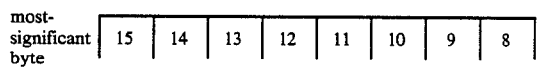

FIFO THRESHOLD REGISTER is an eight-bit register. The 8 bits of this register are set and cleared by software except when initialized to the default value as a result of DLC Reset or IDPC Reset. This register can be written or read by the processor 18.

FIFO THRESHOLD REGISTER

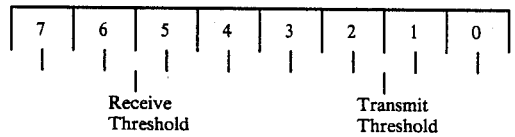

Bits 0-3 Transmit FIFO Threshold (Default=Hex 8)

As each byte of a packet being transmitted is transferred to the DLC transmitter Parallel to Serial Shift Register 110, the contents of the Transmit FIFO Threshold bit field are compared by threshold comparison logic 185 with the count of bytes still present in the transmit FIFO 150. The results of this comparison and their effect on Transmit Threshold Reached are discussed hereinbelow in connection with FIFO Status Register.

The Transmit Threshold Reached signal is also used to condition the DLC transmit DMA Data Request signal.

| VALUE | COUNT |
|---|---|
| 0 | 0000 |
| . | . |
| . | . |
| 15 | 1111 |

Bits 4-7 Receive FIFO Threshold (Default=Hex 8)

As each byte of a packet being received is transferred from the DLC receiver Serial to Parallel Shift Register 212 to the Receive FIFO 106, the contents of the Receive FIFO Threshold bit field are compared with the count of bytes still present in the Receive FIFO by block 296 (FIG. 18). The results of this comparison and their effect on Receive Threshold Reached are discussed in detail in hereinbelow in connection with the FIFO Status Register.

The receive FIFO threshold block 296 counts by two instead of by one, as in the Transmit FIFO threshold. This is because the receive FIFO is 32 bytes deep, while the threshold bit field in the threshold register is only four bits long.

| VALUE | COUNT |
|---|---|
| 2 | 0001 |
| . | . |
| . | . |
| 30 | 1111 |
| 32 | 0000 |

INTERRUPT SOURCE REGISTER (620) is an eight-bit register. The Interrupt Source Register contains the status information most important to the user during normal operation. The intent of this register is to narrow down what caused a DLC interrupt in as few steps as possible. This register is a read only register.

This register is initialized to the default value shown below for each individual bit and bit field as a result of DLC Reset or IDPC Reset Pin.

Note: Bit 3 and Bit 5 are a special case of the four stage status reporting mechanism described in connection with FIG. 27. These two bits do not need to be implemented in Stages 1, 2, and 3; instead, they can be generated in Stage 4 from other Stage 4 bits as follows:

Bit 5 (Receive Frame Status) can be updated by DLC hardware as the logical OR of the six bits of the Stage 4 Receive Frame Status Register described hereinbelow. Bit 3 (Valid Packet Received) can be updated as the logical NOT of bit 5 at the same time bit 5 is updated.

INTERRUPT SOURCE REGISTER

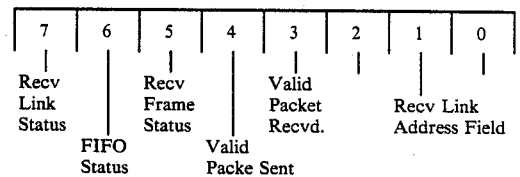

Bits 0-2 Receive Link Address Field (Default=110 with LSB=0)

The Receive Link Address bit field is determined by DLC, address detection unit 226 whenever a frame is received (with or without errors). This bit field is one of the unique Four Stage Status Registers and Bit Field entities described in connection with FIG. 27.

This bit field is Stage 4 hardware and is therefore loaded (except during DLC Reset or IDPC Reset) only when both of the following events have occurred:

(1) Stage 4 is cleared by software read of this Interrupt Source Register and (2) The End-of-Frame (EOF) tagged byte is read from the receive FIFO 290 (by DMA or software).

The following table indicates which value is loaded into the Receive Link Address bit field as Stage 3 status is being loaded into Stage 4:

| Bit | | | |
|---|---|---|---|
| 2 | 1 | 0 | Meaning |
| 0 | 0 | 0 | Contents of Link Address Register 0 recognized |
| 0 | 0 | 1 | Contents of Link Address Register 1 recognized |
| 0 | 1 | 0 | Contents of Link Address Register 2 recognized |
| 0 | 1 | 1 | Contents of Link Address Register 3 recognized |
| 1 | 0 | 0 | Broadcast Link Address (all 1's) recognized |
| 1 | 0 | 1 | Not used |
| 1 | 1 | 0 | Default Value — No Packet received |
| 1 | 1 | 1 | Packet received with no address recognition enabled (i.e., bits 0–4 of DLC Address Control Register all cleared to zero) |

The Receive Link Address bit field is reset to its default value when DLC Reset is executed or the IDPC Reset pin is activated.

Bit 3 Valid Packet Received (Default=0)

The Valid Packet Received bit is set to ONE by the Receive FIFO 106 when the End-of-Frame (EOF) tagged byte is read from the Receive FIFO Data Register 298 (i.e., all packet bytes transferred to memory) and none of the receive errors described in connection with FIG. 20 has been detected for that packet. This bit is gated when Stage 3 status is actually transferred to Stage 4 of the Four Stage Receive Status Registers and Bit Field.

This bit is cleared to ZERO when this register is read by software, DLC Reset executed, or IDPC Reset pin activated.

Bit 4 Valid Packet Sent (Default=0)

This bit is set to ONE when the last bit before the Closing Flag has been transmitted by the DLC transmitter 102 (i.e., Transmit Byte Counter=0 and no Underrun and transmitter Out of Frame).

This bit is cleared to ZERO when this register is read by software, DLC Reset executed or IDPC Reset pin activated.

Bit 5 Receive Frame Status (Default=0)

This bit is set to ONE when any bit in the Receive Frame Status Register 64 described hereinbelow is set and BOTH the corresponding bit set in the Receive Frame Interrupt Enable Register AND the Receive Frame Status bit set in the Interrupt Source Interrupt Enable Register.

This bit is gated when Stage 3 status is actually transferred to Stage 4 as shown in FIG. 27.

This bit is cleared to ZERO when the Receive Frame Status Register is read by software, DLC Reset executed, or IDPC pin is activated.

Bit 6 FIFO Status (Default=0)

This bit is set to one when any bit in the FIFO Status Register described hereinbelow is set with BOTH the corresponding bit set in the FIFO Status Interrupt Enable Register AND the FIFO Status bit is set in the Interrupt Source Interrupt Enable Register.

This bit is cleared to ZERO when the FIFO Status Register is read by software, DLC Reset executed, or IDPC Reset pin activated.

Bit 7 Received Link Status (Default=0)

This bit is set to one when any bit in the Receive Link Status Register described hereinbelow is set with BOTH the corresponding bit set in the Receive Link Interrupt Enable Register AND the Receive Link Status bit set in the Interrupt Source Interrupt Enable Register.

This bit is cleared to ZERO when the Receive Link Status Register is read by software, DLC Reset executed, or IDPC Reset pin activated.

RECEIVE BYTE COUNT REGISTER (294) is a 16-bit register. Default=0

This 16 bit register indicates the number of bytes received in a packet (i.e., between but not including Opening and Closing Flags) whether the packet was received in error or not. The receive byte counter 292 is incremented when a byte of data is placed into the receive FIFO 290. The Receive Byte Counter register is one of the unique Four Stage Status Registers and Bit Field entities described in connection with FIG. 27. This register is a Stage 4 register and is therefore loaded with a valid byte count only when both of the following events have occurred:

(1) Stage 4 is cleared by a software read of this Receive Byte Count Register and (2) The End-of-Frame (EOF) tagged byte is read from the receive FIFO 290 (by DMA or software).

This register is reset to its default value of 0 when DLC Reset is executed or the IDPC Reset pin is activated. This register is a read only register from the local processor 18.

RECEIVE BYTE COUNT REGISTER

| least-significant byte | 7 | 6 | 5 | 4 | 3 | 2 | 1 | 0 |
|---|---|---|---|---|---|---|---|---|

| most-significant byte | 15 | 14 | 13 | 12 | 11 | 10 | 9 | 8 |
|---|---|---|---|---|---|---|---|---|

RECEIVE FRAME STATUS REGISTER is an eight-bit register. The bits of this register are set to ONE as described below. Bits 6 and 7 are not used. This register is a read only register for local processor 18.

The setting of any bit in the Receive Frame Status register will set bit 5 of the Interrupt Source Register if the corresponding enable bit is set in the Receive Frame Interrupt Enable Register and the Receive Frame Status bit is set in the Interrupt Source Interrupt Enable Register as described hereinbelow in connection with the Interrupt Source Register 620.

The bits of the Receive Frame Status register are all cleared to ZERO (default bit settings) when DLC Reset is executed, the IDPC Reset pin is activated or the register is read and the hardware condition that set the bit no longer exists.

The register indicates which error or exception condition has occurred during the reception of a frame. This register is one of the unique "Four Stage Status Registers and Bit Field" entities described in connection with FIG. 27. This register is a Stage 4 register and is therefore loaded (except during DLC Reset or IDPC Reset) only when both of the following events have occurred:

1. Stage 4 is cleared by software read of this Receive Frame Status Register and
2. The End-of-Frame (EOF) tagged byte is read from the receive FIFO 290 (by DMA or software).

The Receive Frame Interrupt Enable Register is a bit-for-bit image of the Receive Frame Status register.

RECEIVE FRAME STATUS REGISTER

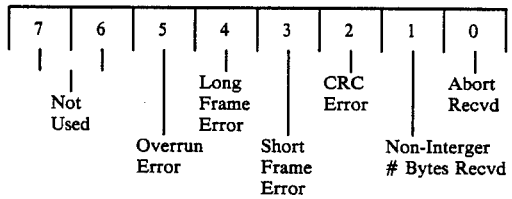

The setting of a bit in the Receive Frame Status register is established at Stage 1 and propagates through to this Stage 4 register. The table below indicates the precedence of the various errors and exception conditions flagged by this register, listed in descending order of precedence:

| Bit | Name |
|-----|------|
| 0 | Abort Received |
| 5 | Overrun |
| 3 | Short Frame |
| 4 | Long Frame |
| 1 | Non-Integer Number of Bytes |
| 2 | CRC Error |

If, following a read to the Interrupt Source Register, the Receive Frame Status Register is not read, and it is not normally read for a valid packet, before the LSB of the Receive Byte Count Register, reading the Receive Byte Counter Register will clear the Receive Frame Synchronization Register. This maintains synchronization of the register stack, i.e., stages 1-4.

Bit 0 Abort Received (Default=0)
This bit is set to ONE in Stage 1 (and eventually propagated to Stage 4) as a result of the DLC receiver Abort Detector 214 detecting an Abort character (7 ones while In-frame) while the DLC receiver is In-Frame and at least 3 bytes have been received.

Bit 1 Non-Integer Number of Bytes Received (Default=0)
This bit is set to ONE as a result of the DLC receiver Flag Detector 214 detecting a Closing Flag character with at least 3 bytes received when a non-integer number of bytes has been received in a non-Short Frame (i.e., at least one but less than eight bits were received after Zero Bit Deletion in the byte immediately preceding the Closing Flag).

Bit 2 CRC Error (Default=0)
This bit is set to ONE as a result of the DLC CRC Checker 222 detecting an error when CRC Check is enabled in the DLC Command/Control Register.

Bit 3 Short Frame Error (Default=0)
This bit is set to ONE as a result off the DLC receiver detecting a Short Frame error by short frame byte counter 260.

Bit 4 Long Frame Error (Default=0)
This bit is set to ONE as a result of the DLC receiver detecting a Long Frame error by the Receive Byte Counter 292 in conjunction with the Maximum Receive Packet Size REgister described hereinabove.

Bit 5 Overrun Error (Default=0)
This bit is set to ONE as a result of the DLC receive FIFO 290 detecting an Overrun condition described in connection with FIG. 16, i.e., the receive FIFO 290 contains 16 bytes when received data needs to move into the FIFO from the Serial to Parallel Shift Register.

RECEIVE LINK STATUS REGISTER. Each of the bits in this register are individually set to ONE or cleared to ZERO by the DLC to indicate the real-time state of the various status conditions they represent. Bits 3-7 are not used. Setting any bit in this register will set bit 7 of the Interrupt Source Register if the corresponding enable bit is set in the Receive Link Enable Register and the Receive Link Status bit is set in the Interrupt Source Interrupt Enable Register. Upon completion of the DLC Reset or IDPC Reset, the bits in the Receive Link Status register will be set/cleared to their default condition as a result of the Resetting of the portion of the DLC that they monitor.

The Receive Link Interrupt Enable Register described hereinabove is a bit-for-bit image of this register.

RECEIVE LINK STATUS REGISTER

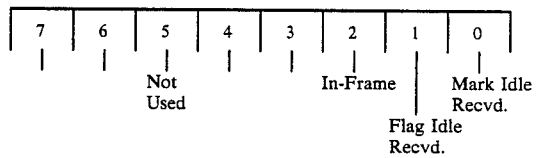

Bit 0 Mark Idle (Default=0)
This bit is set to ONE when the DLC receiver Mark Idle Detector senses a Mark Idle data pattern (15 ones). This bit is cleared to 0 when the first 0 bit is detected on the receive data link.

Bit 1 Flag Idle (Default=0)
This bit is set to ONE when the DLC receiver Flag-/Abort Detector 214 senses two or more Flag characters when not In-frame. It is cleared to ZERO when the first non-Flag character is detected by block 214.

Bit 2 In-Frame (Default=0)
This bit is set to ONE when the Flag/Abort Detection Unit 214 of the DLC receiver 108 detects an Opening Flag followed by a non-Flag, non-Abort character. This bit is cleared upon receipt of a Closing Flag (Flag received while In-frame) or any exception condition that terminates the frame abnormally.

FIFO STATUS REGISTER. Each of the bits in the FIFO Status register are set to ONE or cleared to ZERO by the DLC to indicate the real-time state of the various status conditions they represent. Bits 5-7 are not used.

Upon completion of DLC Reset or IDPC Reset pin, the bits in this register will be set cleared to their default condition as a result of the Resetting of the portion of the DLC that they monitor.

The FIFO Status Interrupt Enable Register described hereinabove is a bit-for-bit image of the FIFO Status register. Setting any bit in the FIFO Status register will set bit 6 of the Interrupt Source Register if the corresponding enable bit is set in the FIFO Status Interrupt Register and the FIFO Status bit is set in the Interrupt Source Interrupt Enable Register.

FIFO STATUS REGISTER

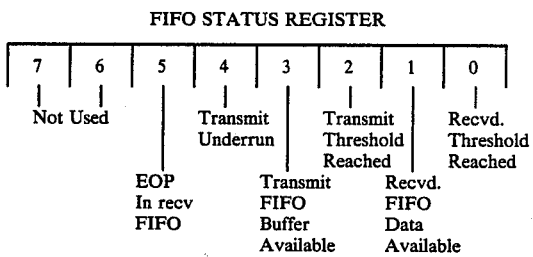

| 7 | 6 | 5 | 4 | 3 | 2 | 1 | 0 |

Not Used — Transmit Underrun — Transmit Threshold Reached — Recvd. Threshold Reached EOP In recv FIFO — Transmit FIFO Buffer Available — Recvd. FIFO Data Available Bit 0 Receive Threshold Reached (Default=0)
This bit is set to ONE when the number of bytes in the DLC receive FIFO 290 becomes greater than or equal to the count in the Receive FIFO Threshold bit field of the DLC FIFO Threshold Reached Logic 296. This bit is cleared to ZERO when the count of bytes in the receive FIFO becomes less than the Receive FIFO Threshold bit field.

Bit 1 Receive FIFO Data Available (Default=0)
This bit is set to ONE whenever there is a byte available to be read from the DLC Receive FIFO Data Register 298 as indicated by the Data Available signal generated thereby. This bit is cleared to ZERO when a byte is read from the Receive FIFO Data Register 298 and the FIFO buffer 290 location just above the Data Register is empty. The bit is cleared when the last byte of a packet is read from the Receive FIFO 290. It is not re-enabled until the user reads the LSB of the Receive Byte Count Register. This provides an indication of when the last byte of a packet has been read.

Bit 2 Transmit Threshold Reached (Default=0)
This bit is set to ONE when the number of bytes in the DLC transmit FIFO 100 as monitored by Transmit Byte Counter 154 becomes less than or equal to the count in the Transmit FIFO Threshold bit field of the DLC FIFO Threshold Register. This bit is cleared to ZERO when the count of bytes in the transmit FIFO becomes greater than the Transmit FIFO Threshold bit field.

Bit 3 FIFO Buffer Available (Default=1)
This bit is set to ONE whenever the DLC Transmit FIFO Data Register is empty (i.e., available to be written). On a write, this bit will remain active if the FIFO transmit buffer 150 location directly above the data register 160 is empty. The bit is cleared when the last byte of a packet is in the FIFO 150 (EOP tag). This prevents multiple packets from existing in the FIFO at the same time.

Bit 4 Transmitter Underrun (Default=0)
This bit is set to ONE if the output location of the Transmit FIFO buffer 150 (opposite end of the FIFO from the FIFO Data Register 160) is empty when a transmitter Parallel to Serial Shift Register 110 load is attempted. The Transmit Byte Counter 154 is implicitly nonzero for this load to be attempted. A discussion in connection with FIG. 5 is related to the Transmit Byte Count Register 152.

Bit 5 EOP In Receive FIFO (Default=0)
This bit, when set to ONE, indicates that the last byte of a packet has been loaded into the receive FIFO 290. The bit remains set until there are no EOP tags in the FIFO 290.

Bits 6–7 Not Used 4.4.1.15
DLC FIFO DATA REGISTERS
DLC Receive FIFO Data Register 298.
DLC Transmit FIFO Data Register 160.
Each of these registers is eight bits long.
The Receive FIFO Data Register 298 is read by DMA or software to remove one byte from the Receive FIFO 290.
The Transmit FIFO Data Register 160 is written by DMA or software to load one byte to the Transmit FIFO 150.

RECEIVE FIFO DATA REGISTER

| 7 | 6 | 5 | 4 | 3 | 2 | 1 | 0 |

TRANSMIT FIFO DATA REGISTER

| 7 | 6 | 5 | 4 | 3 | 2 | 1 | 0 |

RESIDUAL BIT CONTROL/STATUS REGISTER

| 7 | 6 | 5 | 4 | 3 | 2 | 1 | 0 |

Not Used — Transmitter Residue Bit Count — Received Bit Residue

Bits 2-0
The three Received Bit Residue bits form a read only field that indicates the number of received residue bits in the packet. The default at Reset is all zeros. This field is cleared on either a read of the register, or a read of the LSB of the Receive Byte Counter

| CODE | BITS RECEIVED |
|------|---------------|
| 000 | 8 |
| 001 | 1 |
| . | . |
| . | . |
| . | . |
| 111 | 7 |

Bits 5-3
The Transmit Residue Bit Count field allows the user to specify the number of bits to be transmitted in the last byte of the packet (data is loaded into the transmit FIFO in byte quantities). This is a read/write field, that is cleared by software, and defaults to all zeros at Reset.

| CODE | BITS TRANSMITTED |
|------|------------------|
| 000 | 8 |

| CODE | BITS TRANSMITTED |
|---|---|
| 001 | 1 |
| . | . |
| . | . |
| . | . |
| 111 | 7 |

APPENDIX B with the 16-bit value stored in the Baud Rate Divisor Registers.

INTERRUPT ENABLE REGISTER. The Interrupt Enable Register is an eight-bit read/write register used to enable specific interrupt sources. Setting a specific bit to ONE enables its corresponding interrupt. The default value at Reset is all ZEROs. Resetting a bit to ZERO disables the interrupt and resets the interrupt pin if the corresponding condition is present.

| 7 | 6 | 5 | 4 | 3 | 2 | 1 | 0 |
|---|---|---|---|---|---|---|---|
| NOT USED | XMIT* LINE STATUS | SPCL* CHAR RECVD | RECV* FIFO TIMEOUT | MODEM STATUS | RECV LINE STATUS | XMIT FIFO TR | RECV FIFO TR |

| BIT | INTERRUPT SOURCE |
|---|---|
| 0 | Receive FIFO 404 threshold reached |
| 1 | Transmit FIFO 424 threshold reached |
| 2 | Receiver line status: overrun, parity, break, framing (412) |
| 3 | Modem status: CTS, DSR |
| 4 | UART status: receive FIFO timeout |
| 5 | UART status: Special character received (412) |
| 6 | Transmit line status: transmit shift register 420 empty |
| 7 | Not Used |

*Not present in the 8250

UART 54 Status/Control Registers (408)

RECEIVE FIFO DATA REGISTER 404a. The receive FIFO Data Register 404a (FIG. 21) (read only) is the output side of the receive FIFO. Data received by the UART 54 is read from the Receive FIFO 404, by the processor 18. The register is eight bits wide. Bit 0 corresponds to the least significant data bit, which is the first bit to be transmitted or received. The default value at Reset is all ZEROs.

TRANSMIT FIFO DATA REGISTER 424a. The Transmit FIFO Data Register 424a (FIG. 21) is a write only input to the transmit FIFO 424. Data placed in this eight bit wide register is transmitted out of the transmit FIFO 424 least significant bit first (bit 0). The default value at Reset is all ZEROs.

BAUD RATE DIVISOR LEAST-SIGNIFICANT BYTE AND MOST-SIGNIFICANT BYTE REGISTERS. These two eight-bit registers contain the low order and high order eight bits of the number by which the UART clock input (UARTCLK) is to be divided by Baud Rate Generator 414. Bit 0 of each register is the least significant bit of each byte. The default value at Reset is all ZEROs. When the two registers are combined the divisor is as follows:

```
0000000000000001 = DIVIDE BY 1
          .
          .
1111111111111111 = DIVIDE BY 65535
0000000000000000 = DIVIDE BY 65536
```

Divide by 1 passes the UARTCLK through unaffected. This allows the receiver and transmitter to operate off of separate external clocks.

Any write to either the MSB or LSB Divisor Registers causes the baud rate generator 414 to be loaded INTERRUPT IDENTIFICATION REGISTER. This is a four-bit read-only register used to identify which UART status register contains an interrupting condition. Unused bit positions (7-4) contain ZEROs when this register is read.

| BITS 7-4 | BITS 3-1 | BIT 0 |
|---|---|---|
| NOT USED | INTERRUPT SOURCE | INTERRUPT PENDING |

BIT 0: The interrupt pending bit is cleared to ZERO if any interrupt is pending. The default value at Reset is ONE. BITS 3-1: This field identifies the highest priority source of all interrupts. The default value at Reset is all ZEROs.

| BIT 3 2 1 | PRIORITY | SOURCE | RESET BY |
|---|---|---|---|
| 0 0 0 | Fourth | CTS, or DSR | Reading the Modem Status Register |
| 0 0 1 | Third | Transmit FIFO 424 Threshold Reached | Reading this register AND int. source = 001 |
| 0 1 0 | Second | Receive FIFO 404 Threshold Reached | Reading this register AND int. source = 010 |
| 0 1 1 | First** | Overrun, Parity, Special Character Received, Framing, or Break | Reading Line Status Register |
| 1 0 0 | Fifth* | Reveive FIFO 404 Timeout | Reading UART Status Register |
| 1 0 1 | Sixth* | Transmit shift register 420 Empty | Reading this register AND int. source = 101 |

BITS 7-4 Not used = 0

*Not present in the 8250
**Simultaneous receipt of a special character or a character with a parity error, and a threshold reached condition must cause the interrupt request to be generated for the special character or parity error prior to the generation of the threshold reached interrupt.

LINE CONTROL REGISTER. The eight-bit Line Control Register is used to allow microprocessor 18 to program the serial interface parameters, as well as to request that a break condition be transmitted. The default value at Reset is all ZEROs.

LINE STATUS REGISTER. The eight bit Line Status Register contains flag bits, that when set, indicate the presence of a condition that when ANDed with the appropriate interrupt enable bits of the Interrupt Identification Register can generate a line status interrupt.

| 7 | 6 | 5 | 4 | 3 | 2 | 1,0 |
|---|---|---|---|---|---|---|
| DLAB | BREAK | STICK PARITY | EVEN PARITY SET | PARITY ENABLE | # OF STOP BITS | CHARACTER LENGTH |

BIT:

1,0 Bits 0 and 1 define the character length.
BIT 1 0    LENGTH
    0 0        5
    0 1        6
    1 0        7
    1 1        8

2   Bit 2 defines the number of stop bits. A 0 selects one stop bit, a 1 selects either 1.5 stop bits for five bit characters, or 2 stop bits for six, seven, or eight bit characters.
3   Bit 3 enables parity generation and checking, when set.
4   Bit 4 selects between even and odd parity; even, when set.
5   When bits 5 and 3 are set, parity is transmitted in the state opposite that indicated by bit 4.
6   Bit 6 is used to request that a break condition be sent. The UART will send the break pattern whenever bit 48 6 is set (sent after current character has been transmitted). The shift register and transmit FIFO contents are also discarded. The line will return to normal operation when the bit is cleared.
'   The Divisor Latch Access Bit must be set in order to access the Baud Rate Divisor Registers, and cleared to access the Receive and Transmit FIFO Data Registers, and the Interrupt Enable Register MODEM CONTROL REGISTER. The five bit Modem Control Register allows the CPU to mainpulate the link handshake signals. Additionally, the UART can be placed in a Loop Back mode for testing. Unused bits (7-5) should be ZEROs when the register is read. The default value at Reset is all ZEROs.

Bits 1, 2, 3, 4, and 7 are cleared by reading the Line Status register. Bit 5 is cleared when the condition goes away, but the interrupt is cleared by reading the Interrupt Identification Register (when the identification register is reporting this interrupt). Bits 0, and 6 are cleared when the causing condition is no longer present.

| 7 | 6 | 5 | 4 | 3 | 2 | 1 | 0 |
|---|---|---|---|---|---|---|---|
| N.U. | N.U. | N.U. | LOOP | OUT2/* | OUT1/* | RTS/ | DTR/ |

BIT FUNCTION

0   Places DTR/ in its active state (low) when set.
1   Places RTR/ in its active state (low) when set.
2   Places Output1/ in its active state (low) when set. This is a general purpose control pin.
3   Places Output2/ in its active state (low) when set. This is a general purpose control pin.
4   Places the UART in a Local Loop Back condition.
5   Not used = 0
6   Not used = 0
7   Not used = 0

*These bits may be read and written in the IDPC, but do not affect the state of any pins. They must be labeles "RESERVED" in the IDPC data sheet since they are not pinned out.

The default values at Reset are shown below.

| 7 | 6 | 5 | 4 | 3 | 2 | 1 | 0 |
|---|---|---|---|---|---|---|---|
| SPCL* CHAR RECV | XMIT S.R. EMPTY | XMIT FIFO TR | BREAK | FRAME ERROR | PARITY ERROR | RECV BUFF OVERRUN | RECV DATA AVAIL |

BIT FUNCTION

0   Receive data available in Receive FIFO Data Register 404a. Cleared when receive FIFO 404 empty. Default = 0
1   Overrun error from Receive FIFO 404 (receive data lost). Default = 0
2   Receive Parity error detected by block 412. Default = 0
3   Framing error (invalid stop bit) detected by block 412. Character with framing error is not loaded into the receive FIFO 404. Default = 0

-continued

| 7 | 6 | 5 | 4 | 3 | 2 | 1 | 0 |
|---|---|---|---|---|---|---|---|
| SPCL* CHAR RECV | XMIT S.R. EMPTY | XMIT FIFO TR | BREAK | FRAME ERROR | PARITY ERROR | RECV BUFF OVERRUN | RECV DATA AVAIL |

| BIT | FUNCTION |
|---|---|
| 4 | Break condition detected by block 412. Default = 0 |
| 5 | Transmit FIFO 424 threshold reached. Cleared when FIFO level rises above threshold. Default = 1 |
| 6 | Transmit shift register 420 empty (last character sent). Cleared when FIFO 424 and shift register 420 are no longer empty. Default = 1 |
| 7 | Special character received detect by block 412. Set when special character is loaded into the FIFO 404, cleared when Line Status Register is read. Default = 0 |

*Not present in the 8250

MODEM STATUS REGISTER. The eight-bit Modem Status Register is used to indicate the condition of the link handshake input signals, as well as the presence of a change in their status. Bits 3-0 default to 0 on Reset, bits 7-4 reflect the input status.

UART STATUS REGISTER. The five-bit UART Status Register reports status conditions that do not occur in an 8250 UART. Additionally, the "character with parity error available" bit is located in this register. The default value at Reset is all ZEROs, except bit 4

| 7 | 6 | 5 | 4 | 3 | 2 | 1 | 0 |
|---|---|---|---|---|---|---|---|
| RLSD/* | RI/* | DSR/ STATUS | CTS/ STATUS | DELTA RLSD* | RI TRAIL EDGE* | DELTA DSR | DELTA CTS |

| BIT | FUNCTION |
|---|---|
| 0 | Set if CTS/ has changed since this register was last read. |
| 1 | Set if DSR/ has changed since this register was last read. |
| 2 | Set by the trailing edge of Ring Indicate (RI/ on to off transition). |
| 3 | Set if Receive Line Signal Detect has changed since this register was last read. |
| 4 | Status of the CTS/ line (set if active - low). |
| 5 | Status of the DSR/ line (set if active - low). |
| 6 | Status of the RI/ line (set if active - low). |
| 7 | Status of the RLSD/ line (set if active - low). |

*Must be non-asserted in hardware in the IDPC. THese bits must be labled "RESERVED" in the IDPC dtat sheet since they are not pinned out.

UART CONTROL REGISTER. The eight bit UART Control Register is used to control non-8250 like functions. Additionally, the UART software Reset bit is located here.

which is a ONE. Bit zero is cleared when the register is read. Bits 1-4 are cleared when the corresponding condition is no longer present.

| 7 | 6,5 | 4,3 | 2 | 1 | 0 |
|---|---|---|---|---|---|
| RESET | TRANSMIT FIFO THRESHOLD | RECEIVE FIFO THRESHOLD | SYNC SELECT | XMIT CLOCK SOURCE | RECV CLOCK SOURCE |

| BIT | FUNCTION |
|---|---|
| 0 | Receive clock MUX 410 select: set for internal baud rate generator 414, clear for external (RXCLK). Default at Reset = 0. |
| 1 | Transmit clock MUX 418 select : set for internal baud rate generator 414, clear for external (RXCLK). Default at Reset = 0. |
| 2 | Sync select: Set for synchronous, clear for asynchronous. Default at Reset = 0. |
| 3,4 | Receiver FIFO 404 threshold reached is set when the number of bytes in the FIFO is equal to or greater than this level. Default at Reset = 11.<br>01 = 1<br>10 = 2<br>11 = 3<br>00 = 4 |
| 5,6 | Transmit FIFO 424 threshold reached is set when the number of bytes in the FIFO is less than or equal to this level. Default at Reset = 00.<br>00 = 0<br>01 = 1<br>10 = 2<br>11 = 3 |
| 7 | The UART 54 is Reset to its default condition when this bit is set by software. The Reset operation is identical to a hardware Reset viathe RST pin. This bit is cleared by the Reset operation. Default = 0. |

| 7 | 6 | 5 | 4 | 3 | 2 | 1 | 0 |
|---|---|---|---|---|---|---|---|
| N.U. | N.U. | N.U. | XMIT BUF AVAIL | RECV FIFO TR | SPECIAL CHAR AVAIL | CHAR W/ Parity AVAIL | RECV FIFO TIMEOUT |

| BIT | FUNCTION |
|---|---|
| 0 | Receive FIFO 404 timeout occurred, cleared when register read. |
| 1 | Character with parity error detected by block 412 is available, set when a character with a parity error reaches the output of the receive FIFO 404a, cleared when a character is read from the FIFO. |
| 2 | Special character detected by block 412 is available, set when special character is at FIFO 412 is available, cleared when character read from FIFO. |
| 3 | Receive FIFO 404 Threshold Reached. Cleared when the number of bytes in the receive FIFO falls below the threshold level. |
| 4 | This bit is set whenever the transmit FIFO Data Register 424a is empty. This condition does not generate an interrupt. Default = 1 |
| 5-7 | Not used. |

What is claimed is:

1. A dual-port timing controller (DPTC) connected to a source of clock signals receiving control signals from a local processor including a local data transmit/receive (LDT-R) signal and a local processor access request (LREQ) signal and control signals from a host processor including a host data transmit/receive (HDT-R) signal and a host processor access request (HREQ) signal and generating signals to a shared random access memory (RAM) (22a) and to arbitration means (502, 504, 506, 508, 510, 512) responsive to a plurality of arbitration control signals, for arbitrating and establishing read/write access to said shared RAM by said local and said hot processor, said DPTC providing said read/write access to said shared RAM by said local and said host processor, said DPTC comprising:

means (520) connected to said source of clock signals for synchronizing said host request signal to said clock signals and generating a synchronous host request signal;

means (522) connected to said source of clock signals responsive to said local request signal and said synchronous host request signal for generating a host memory cycle timing (HCYCLE) signal and a local memory cycle timing (LCYCLE) signal, and a memory access enable (GO) signal, therefrom, implementing predetermined cycle arbitration procedures;

means (524) connected to said source of clock signals receiving said LDT-R and HDT-R signals for generating a plurality of control signals conducted to said shared RAM and generating a memory access disable (STOP) signal; and means (526, 528, 530, 532) connected to said source of clock signals receiving said LCYCLE and HCYCLE signals, said STOP signal and said HDT-R signal for generating a plurality of control signals to said arbitration means.

2. A data protocol controller fabricated as a single integrated circuit including a dual-port timing controller (DPTC) connected to a source of clock signals receiving control signals from a local processor including a local data transmit/receive (LDT-R) signal and a local processor access request (LREQ) signal and control signals from a host processor including a host data transmit/receive (HDT-R) signal and a host processor access request (HREQ) signal and generating signals to a shared random access memory (RAM) (22a) and to arbitration means (502, 504, 506, 508, 510, 512), responsive to a plurality of arbitration control signals, for arbitrating and establishing read/write access to said shared RAM by said local and said host processor, said DPTC providing said read/write access to said shared RAM by said local and said host processor, said DPTC comprising:

means (520) connected to said source of clock signals for synchronizing said host request signal to said clock signals and generating a synchronous host request signal;

means (522) connected to said source of clock signals responsive to said local request signal, said synchronous host request signal for generating a host memory cycle timing (HCYCLE) signal and a local memory cycle timing (LCYCLE) signal, and a memory access enable (GO) signal, therefrom, implementing predetermined cycle arbitration procedures;

means (524) connected to said source of clock signals receiving said LDT-R and HDT-R signals for generating a plurality of control signals conducted to said shared RAM and generating a memory access disable (STOP) signal; and means (526, 528, 530, 532) connected to said source of clock signals receiving said LCYCLE and HCYCLE signals, said STOP signal and said HDT-R signal for generating a plurality of control signals to said arbitration means;

wherein said control signals received from said host processor further includes a host interrupt request (HINTIN) signal and a host interrupt acknowledge (HINTACK) signal and wherein said control signals received from said local processor further include a local interrupt request (LINTIN) signal and a local interrupt clear (LINCTCLR) signal, said data protocol controller further including interprocessor interrupt (IPI) means (596) connected to said host processor and said local processor receiving said LINTIN, HINTACK, LINTIN and LINTCLR signals for generating a host interrupt out (HINTOUT) signal and a local interrupt out (LINTOUT) signal, whereby said local processor and said host processor communicate messages placed in said shared RAM through a predetermined sequence of said host interrupt signals and said local interrupt signals.

* * * * *